United States Patent [19]
Tamai et al.

[11] Patent Number: 5,459,233
[45] Date of Patent: * Oct. 17, 1995

[54] POLYIMIDES, PROCESS FOR THE PREPARATION THEREOF AND POLYIMIDE RESIN COMPOSITIONS

[75] Inventors: Shoji Tamai; Masahiro Ohta, both of Yokohama; Saburo Kawashima, Yokosuka; Katsuaki Iiyama, Odawara; Hideaki Oikawa, Yokohama; Akihiro Yamaguchi, Kamakura, all of Japan

[73] Assignee: Mitsui Toatsu Chemicals, Incorporated, Tokyo, Japan

[ * ] Notice: The portion of the term of this patent subsequent to Feb. 22, 2011 has been disclaimed.

[21] Appl. No.: 143,148

[22] Filed: Dec. 7, 1993

Related U.S. Application Data

[63] Continuation of Ser. No. 608,727, Nov. 5, 1990, Pat. No. 5,288,843, which is a continuation-in-part of Ser. No. 196,492, May 20, 1988, abandoned, Ser. No. 199,918, May 27, 1988, abandoned, Ser. No. 202,031, Jun. 3, 1988, abandoned, and a continuation-in-part of Ser. No. 551,314, Jul. 12, 1990, abandoned, which is a continuation of Ser. No. 426,715, Oct. 26, 1989, abandoned.

[30] Foreign Application Priority Data

| May 20, 1987 | [JP] | Japan | 62-126320 |
|---|---|---|---|
| Jun. 1, 1987 | [JP] | Japan | 62-134830 |
| Jun. 1, 1987 | [JP] | Japan | 62-134831 |
| Jun. 3, 1987 | [JP] | Japan | 62-138203 |
| Jun. 3, 1987 | [JP] | Japan | 62-138204 |
| Jun. 5, 1987 | [JP] | Japan | 62-140041 |
| Dec. 16, 1987 | [JP] | Japan | 62-316101 |
| Dec. 25, 1987 | [JP] | Japan | 62-327206 |
| Oct. 28, 1988 | [JP] | Japan | 63-270778 |
| Apr. 12, 1989 | [JP] | Japan | 1-090674 |

[51] Int. Cl.$^6$ .......................... C08G 73/10; C08G 69/26
[52] U.S. Cl. ...................... 528/353; 528/125; 528/128; 528/170; 528/172; 528/173; 528/176; 528/185; 528/188; 528/220; 528/229; 528/350
[58] Field of Search .................... 528/353, 125, 528/128, 170, 172, 173, 176, 185, 188, 220, 229, 350

[56] References Cited

U.S. PATENT DOCUMENTS

| 4,196,144 | 4/1980 | Darms | 528/125 |
|---|---|---|---|
| 4,384,061 | 5/1983 | Reiter et al. | 528/353 |
| 4,413,117 | 11/1983 | Reiter et al. | 528/353 |
| 4,725,642 | 2/1988 | Gannett et al. | 528/353 |
| 4,742,153 | 5/1988 | Sutton, Jr. | 528/353 |
| 4,795,798 | 1/1989 | Tamai et al. | 528/185 |
| 4,847,311 | 7/1989 | Yamaya et al. | 528/185 |
| 4,847,349 | 7/1989 | Ohta et al. | 528/125 |
| 5,286,840 | 2/1994 | Oikawa et al. | 528/353 |
| 5,288,843 | 2/1994 | Tamai et al. | 528/353 |

FOREIGN PATENT DOCUMENTS

| 243507 | 11/1987 | European Pat. Off. . |
|---|---|---|
| 62-205124 | 9/1987 | Japan . |

OTHER PUBLICATIONS

Sampe Journal, Jul./Aug. 1988, "Adhesive Properties of LARC–CPI, a New Semi–Journal of Polymer Science", Polymer Chemistry Edition, vol. 15, 1977, pp. 13–19.

Primary Examiner—P. Hampton-Hightower
Attorney, Agent, or Firm—Burns, Doane, Swecker & Mathis

[57] ABSTRACT

In one aspect, the present invention relates to polyimides having excellent thermal resistance and process for preparing the same comprising carrying out condensation of 4,4'-bis(3-aminophenoxy)biphenyl with pyromellitic dianhydride in the presence of a different diamine compound and optionally with a different tetracarboxylic acid dianhydride.

In a second aspect, the present invention relates to a heat resistant resin composition consisting essentially of an aromatic polyetherimide and a defined polyimide.

In a third aspect, the present invention relates to a polyimide resin composition comprised on a defined polyimide and a separate high-temperature engineering polymer.

In a fourth aspect, the present invention relates to a resin composition comprised of a defined polyimide and an aromatic polyamideimide.

11 Claims, 3 Drawing Sheets

POLYIMIDES, PROCESS FOR THE PREPARATION THEREOF AND POLYIMIDE RESIN COMPOSITIONS

CROSS-REFERENCE TO RELATED APPLICATIONS

This application is a continuation of allowed application Ser. No. 07/608,727, filed Nov. 5, 1990, now U.S. Pat. No. 5,288,843 which is a continuation-in-part of application Ser. No. 196,492, filed on May 20, 1988, application Ser. No. 199,918, filed on May 27, 1988, application Ser. No. 202,031, filed on Jun. 3, 1988, and application Ser. No. 551,314 filed Jul. 12, 1990 which is a continuation of application Ser. No. 426,715, filed on Oct. 26, 1989, all of these latter applications now being abandoned.

BACKGROUND OF THE INVENTION

1. Field of the Invention

In one aspect, the present invention relates to polyimides that exhibit excellent thermal resistance and processability, and to a process for preparing the polyimides. In this aspect, the invention relates to a process for preparing crystalline polyimides by controlling the rate of crystallization without varying the substantial crystallinity of the polyimides, to a process for preparing non-crystalline polyimides having outstanding processability and thermal resistance, and to the polyimides prepared by these processes.

In other aspects, the invention relates to polyimide resin compositions having advantageous properties, such as heat and chemical resistance, mechanical strength and moldability.

2. Description of the Related Art

Polyimides prepared by reacting tetracarboxylic dianhydride and a diamine compound exhibit excellent mechanical strength, dimensional stability, high thermal resistance, flame retardance and electrical insulation properties. Hence polyimides have conventionally been used in various fields such as electrical and electronic instruments, aerospace and aircraft equipment, and transport machinery. These types of polyimides are expected to be useful in applications in which thermal resistance is required. Thus, various types of polyimides having the above characteristics have been developed.

Some of the polyimides, however, do not exhibit definite glass transition temperatures, although they exhibit excellent heat resistance, and hence must be processed by such means as sinter molding to be useful for molding purposes. Other polyimides have low glass transition temperatures and are soluble in halogenated hydrocarbons, although they exhibit excellent processability, and hence are unsatisfactory in view of their thermal and solvent resistances.

In order to obtain polyimides having the above desired properties, crystalline polyimides have also been developed.

For example, polyimides derived from 4,4'-bis(3,4-dicarboxyphenoxy)diphenyl sulfide dianhydride and p-phenylenediamine have a crystal structure (T. L. St. Clair et al, J. Polym. Sci., Polym. Chem. ed. 1977, vol. 15, No. 6, p. 1529) as do polyimides derived from 3,3',4,4'-benzophenonetetracarboxylic dianhydride and 1,3-bis[4'-(3-aminophenoxy)benzoyl] benzene, which have a semi-crystalline structure (P. M. Hergenrother et al, SAMPE Journal, July/August 1988, p. 13).

Although the above crystalline polyimides exhibit superior thermal resistance as compared to non-crystalline polyimides, their crystalline structure causes difficulty in processing and thus their applications are limited.

No process has previously been known which can improve the processability of crystalline polyimides without impairing their essential property, i.e., thermal resistance.

It has previously been found that polyimides obtained by condensation of 4,4'-bis(3-aminophenoxy)biphenyl with pyromellitic dianhydride, containing recurring structural units represented by the formula (VI):

(VI)

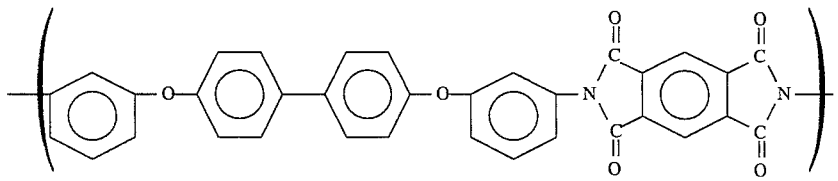

have a glass transition temperature (hereinafter referred to as Tg) of 260° C., a crystallization temperature (hereinafter referred to as Tc) of from 310° to 340° C. and a crystalline melting point (hereinafter referred to as Tm) of from 367° to 390° C., and that such polyimides are crystalline polyimides that can be melt-processed and exhibit excellent chemical resistance [Japanese patent Laid-Open No. 62-205124 (U.S. Pat. No. 4,847,349)].

The polyimide has a much higher Tg of 260° C. as compared with a Tg of 140° C. of polyetherether ketone (Trade Mark; VICTREX PEEK, a product of ICI), a crystalline engineering plastic and a Tg of 225° C. of aromatic polysulfone (Trade Mark; VICTREX PES, a product of ICI), a non-crystalline engineering plastic. Consequently, the above polyimide is an excellent engineering plastic material in view of its thermal resistance.

The above polyimide, however, has a high Tm of from 367° to 390° C. and must be molded at a high temperature of about 400° C., which temperature causes processing problems. Further improvement of processability has been required for the above polyimide.

When a crystalline resin and a non-crystalline resin having the same level of glass transition temperature are compared in view of engineering plastics having high thermal resistance, the crystalline resin is generally excellent in chemical resistance and mechanical properties such as elastic modulus whereas the non-crystalline resin is outstanding in processability. Thus, crystalline resins and non-crystalline resins, respectively, have both advantages and drawbacks.

In consideration of the above circumstances, engineering plastics having good processability, excellent chemical resistance, high elastic modulus and good thermal resistance can be obtained, when the substantially excellent thermal resistance of crystalline polyimides consisting of recurring structural units represented by the above formula (VI) is maintained and processability is improved; for example, when processability is improved under the non-crystalline state in the processing step and polyimides having excellent thermal resistance can be subsequently obtained by converting to the crystalline state after processing. The same effect can also be obtained, when processability is improved by holding the non-crystalline state during and after processing step and the non-crystalline polyimide thus obtained has high thermal resistance.

It is expected that an essentially crystalline polymer would improve processability and to extend utilization to various fields of applications if a method is developed for freely controlling the crystallization rate of the polymer.

Investigations on the rate of crystallization and the method for controlling the rate have never been carried out on the crystalline polyimide.

Other polyimides also have been difficult to process or have other disadvantages. For example, polyimide consisting of a polymer chain represented by the following formula:

In spite of imide linkages in the molecule similar to conventional polyimide, the polyetherimide can be fusion molded and is excellent in mechanical strength, flame retardance, electrical property and molding ability, thereby having a wide field of use. Said aromatic polyetherimide, however, has a low heat distortion temperature of about 200° C. as compared with that of conventional polyimide of 280° C. Accordingly, reduction of mechanical and abrasion properties at high temperatures has caused problems on the development of its application. In order to improve these disadvantages solid lubricants such as graphite, fluororesin, titanium oxide and molybdenum disulfide are added to the aromatic polyetherimide in combination with or separately from inorganic fillers such as glass fibers and carbon fibers. However, the addition of inorganic fillers leads to lower abrasion resistance and that of solid lubricants tends to cause a marked reduction in mechanical strength.

A method for the simultaneous use of aromatic polyetherimide and another resin such as aromatic polyamideimide has also been developed. Even in such a case, however, retention of mechanical strength, particularly impact and abrasion resistances has been still unsatisfactory.

Other polyimides have a repeating unit represented by the formula:

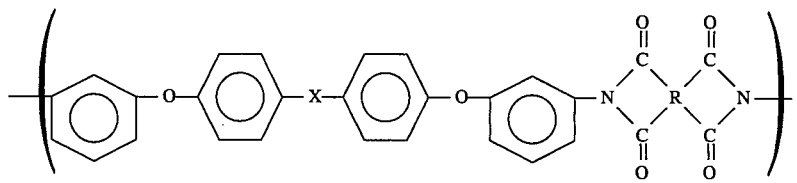

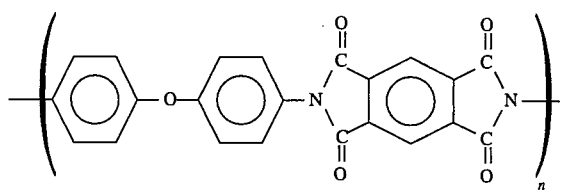

(Trade Mark; KAPTON and VESPEL, products of E. I. du Pont de Nemours and Co.) indicates no distinct glass transition temperature and has an excellent heat resistance. The polyimide, however, is difficult to process by hot molding.

An aromatic polyetherimide (Trade Mark; ULTEM, a product of General Electric Co.) has been known to be capable of improving the processability of conventional polyimide. The typical aromatic polyetherimide is represented by the following formula:

where X indicates a direct bond or is a radical selected from the group consisting of divalent hydrocarbon radicals having carbon atoms of 1 to 10, isopropylidene hexafluoride radical, carbonyl, thio, and sulfonyl, and R is a tetravalent radical selected from the group consisting of aliphatic radicals having at least 2 carbon atoms, alicyclic radicals, monocyclic aromatic radicals and fused polycyclic aromatic radicals, and polycyclic aromatic radicals including aromatic radicals interconnected directly or through a cross-linkage as for example, disclosed in Japanese Laid-Open Patent Nos. 143478/1986, 68817/1987, 86021/1987, and 50372/1987, and in Japanese Patent Application Nos. 076475/1986 and 274206/1986.

Within this definition can be obtained a thermoplastic polyimide having fluidity at high temperatures in addition to excellent mechanical, thermal and electrical properties which are substantial in polyimide. Compared to ordinary engineering polymers represented by polyethylene tereph-

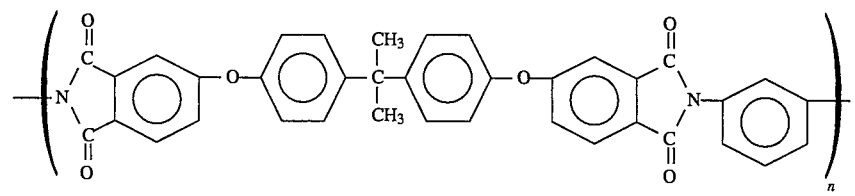

thalate, polybutylene terephthalate, polysulfone and polyphenylene sulfide, the polyimide is much superior in high-temperature resistance and other properties. On the other hand, the processing ability of the polyimide is still inferior to these polymers.

Further polyimides having excellent mechanical, thermal, electrical characteristics and solvent resistance and having heat resistance, have a repeating unit represented by the formula:

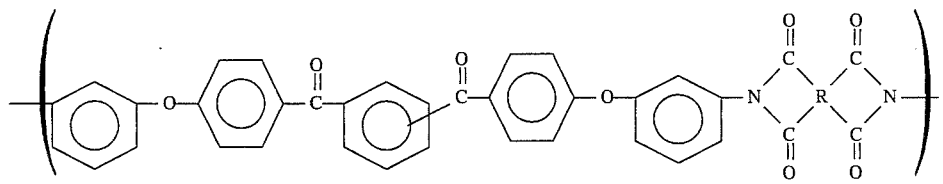

where R is a tetravalent radical selected from the group consisting of aliphatic radicals having at least 2 carbon atoms, alicyclic radicals, monocyclic aromatic radicals and fused polycyclic aromatic radicals, and polycyclic aromatic radicals including aromatic radicals interconnected directly or through a cross-linkage (for example, Japanese Laid-Open Patent No. 50372/1987).

On the other hand, in the electronic field, there is required higher heat resistance with increasing integration in appliances and instruments.

Also, the aerospace material industry requires reduction in weight and improved strength of aircrafts with higher speed and larger amounts of transportation, reflecting the requirement for materials having high heat resistance and good strength compared with conventional thermoplastic resins.

SUMMARY OF THE INVENTION

Among its various aspects, the present invention overcomes the problems and disadvantages of the prior art by providing polyimides that exhibit excellent thermal resistance and processability.

It is an object of a first aspect of the invention to provide a polyimide having high thermal resistance and excellent processability.

It is a further object of the first aspect of the invention to provide a non-crystalline polyimide having excellent processability and high heat resistance.

It is an additional object of the first aspect of the invention to provide a process for preparing a crystalline polyimide by favorably and freely controlling the rate of crystallization in the processing of polyimide as a means for utilizing the essential high heat resistance while improving processability of the above crystalline polyimide.

It is an object of a second aspect of the invention to provide a heat resistant resin composition having mechanical strength, particularly impact and abrasion resistances at high temperatures, while maintaining excellent properties such as flame retardance, electrical properties, mechanical strength and moldability which are essential characteristics of aromatic polyetherimide.

It is an object of a third aspect of the invention to provide a molding resin composition containing polyimide which has a very excellent melt flowability without adverse effects on the essential properties of the polyimide.

It is an object of a fourth aspect of the invention to provide a polyimide resin composition having improved heat resistance and/or mechanical strength in addition to its intrinsic favorable properties.

Additional objects and advantages of the various aspects of the invention will be set forth in part in the description which follows, and in part will be obvious from the description, or may be learned by practice of the invention. The objects and advantages of the invention will be realized and attained by means of the instrumentalities and combinations, particularly pointed out in the appended claims.

To achieve the objects in accordance with the purpose of the invention, as embodied and broadly described herein, a first aspect of the invention provides a process for preparing a polyimide comprising carrying out condensation of 4,4'-bis(3-aminophenoxy)biphenyl of the formula (I):

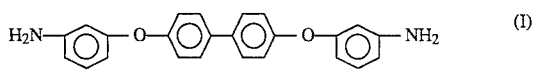

with a pyromellitic dianhydride of the formula (II):

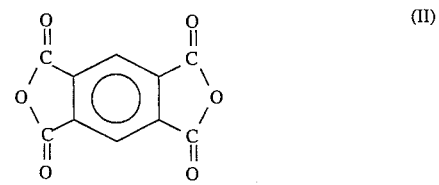

in the presence of at least one diamine compound selected from a defined list and optionally with a further tetracarboxylic acid dianhydride represented by the formula (IV)

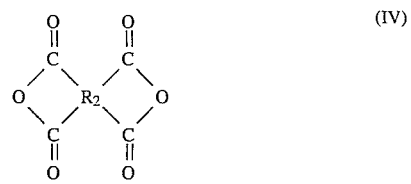

wherein $R_2$ is a tetravalent group selected from the group consisting of an aliphatic group, an alicyclic group, a monocyclic aromatic group, a fused polycyclic aromatic group and a polycyclic aromatic group combined with a direct bond or via a bridge member.

Applicants have found that the essentially crystalline polyimide can be obtained in the form of noncrystalline polyimide by the process of the first aspect of the invention.

By the process of the first aspect of the invention, the rate of crystallization can be controlled, and processability can be improved without impairing the essential thermal resistance of the polyimide and without an adverse effect on the essential characteristics of the polyimide.

The polyimides prepared by the process of the first aspect of the invention exhibit excellent thermal resistance and processability and are useful in numerous applications such as molded articles and heat resistant films.

The accompanying drawings, which are incorporated in and constitute a part of this application, illustrate several exemplary embodiments of the first aspect of the invention and together with the description, serve to explain the principles of this aspect of the invention.

In a second aspect, the present invention relates to a resin composition consisting essentially of 95–5 wt. % of aromatic polyetherimide and 5–95 wt. % of a polyimide composed of recurring units represented by the formula

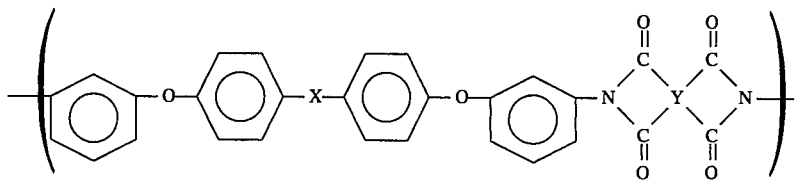

wherein X is a direct bond or —S—, and Y is a tetravalent group selected from the group consisting of an aliphatic group having at least two carbon atoms, alicyclic group, a monocyclic aromatic group, a fused polycyclic aromatic group and a polycyclic aromatic group where aromatic groups are connected to each other with a direct bond or via a bridge member.

In a third aspect, the present invention relates to a polyimide resin composition comprised of 99.9 to 50% by weight of polyimide which has recurring units of the formula:

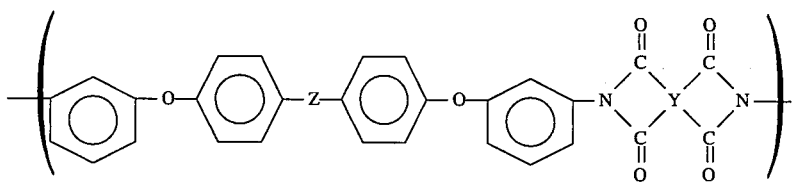

wherein Z is a direct bond, thio radical or a phenylene dicarbonyl radical where two carbonyl radicals are meta or para located on the benzene ring and Y is a tetravalent group selected from the group consisting of an aliphatic group having at least 2 carbon atoms, an alicyclic group, a monocyclic aromatic group, a fused polycyclic aromatic group and a polycyclic aromatic group where aromatic groups are linked to one another directly or via a bridge member, and 0.1 to 50% by weight of high-temperature engineering polymer selected from the group consisting of polyphenylene sulfide, aromatic polysulfone and aromatic polyetherimide, and where said high temperature engineering polymer is polyphenylene sulfide or aromatic polysulfone when Z is the direct bond or thio radical.

In a fourth aspect, the present invention provides a resin composition which comprises 99.9 to 50% by weight of a polyimide having a recurring unit represented by the general formula:

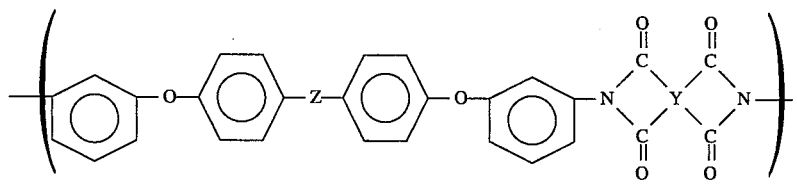

wherein Z is a direct bond or is

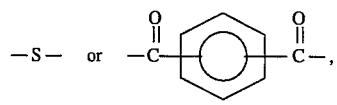

and Y is a tetravalent group selected from the group consisting of an aliphatic group having at least 2 carbon atoms, an alicyclic group, a monocyclic aromatic group, a fused polycyclic aromatic group, and a polycyclic aromatic group where the aromatic groups are connected directly or via a bridge member and 0.1 to 50% by weight of an aromatic polyamide imide.

Figure 1:
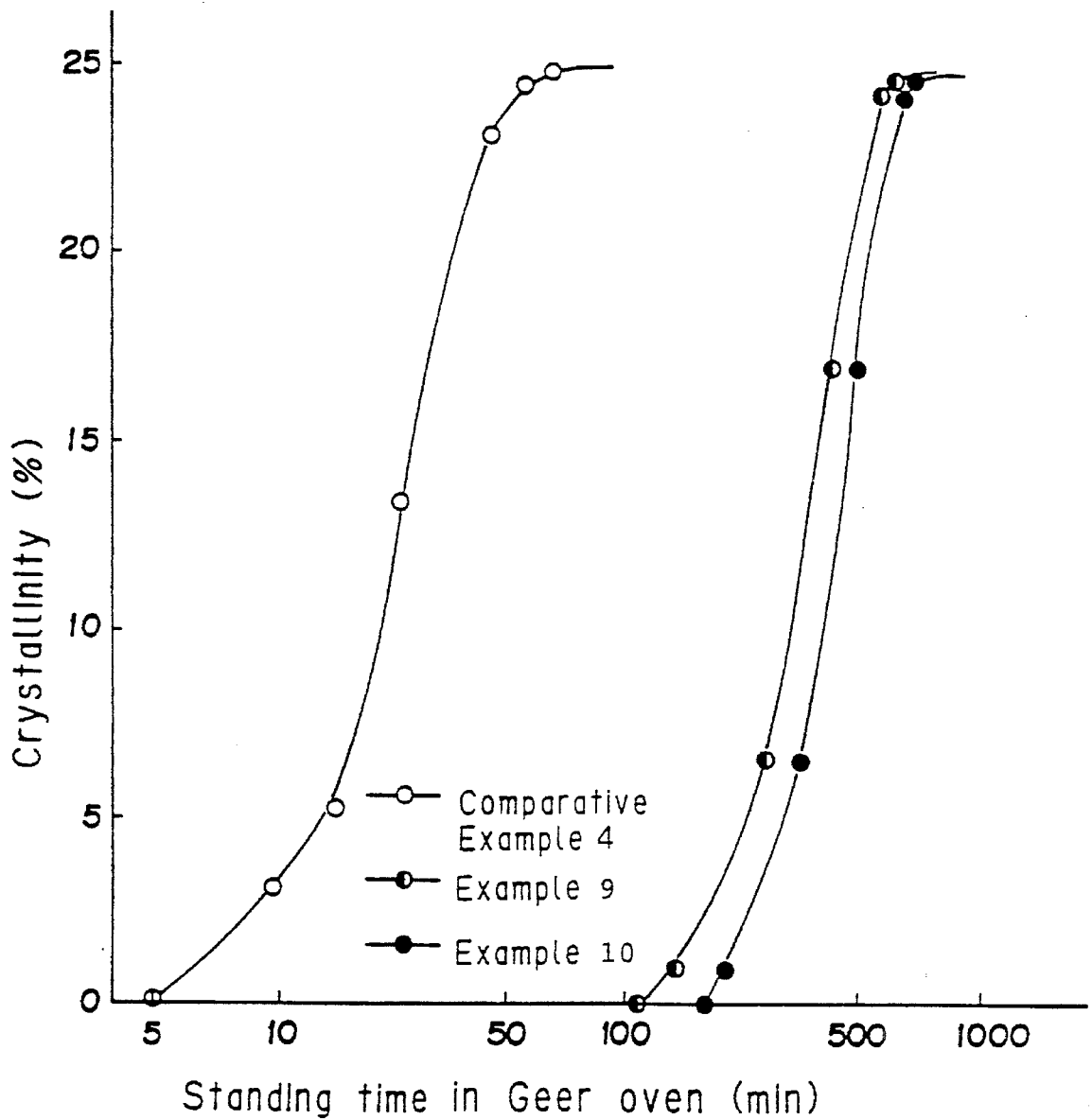
FIG. 1 illustrates the relationship of crystallinity with time in a Geer oven at 300° C. in Example 9, 10 and Comparative Example 4.

The molding stability was compared by changing the dwell time of the polyimide in the cylinder of a flow tester at a cylinder temperature of 420° C. and under a pressure of 100 kg/cm$^2$.

DETAILED DESCRIPTION OF THE PREFERRED EMBODIMENTS

Reference will now be made in detail to the present preferred embodiments of the various aspects of the invention.

In the process of the first aspect of the invention, the diamine compound and the tetracarboxylic acid dianhydride are preferably employed in an amount of from about 1 to about 100% by mole of 4,4'-bis(3-aminophenoxy)biphenyl and/or pyromellitic dianhydride. More preferably, the diamine compound and/or tetracarboxylic acid dianhydride are each employed in an amount of from about 1 to about 30% by mole. In such amounts, the rate of crystallization can be reduced to a desired level corresponding to the amount used and a crystalline polyimide can still be obtained. The polyimide powder thus obtained has improved processability due to its non-crystalline structure and can also be converted to a crystalline structure in the processing step to provide molded articles of polyimide having excellent thermal resistance.

When employed in an amount of from about 30 to about 100% by mole, the crystallization rate becomes extremely slow and a polyimide of substantially crystalline structure cannot be formed under typical processing conditions. Consequently, the resulting polyimide has a non-crystalline structure.

The non-crystalline polyimide thus obtained has improved processability and almost no loss is found in the high thermal resistance which is an essential characteristic of crystalline polyimide.

Suitable diamine compounds used to prepare the polyimides of this aspect of the invention include the compounds of the formula (III):

H$_2$N–R$_1$–NH$_2$ wherein R$_1$ is a divalent group selected from the group consisting of an aliphatic group, an alicyclic group, a monocyclic aromatic group, a fused polycyclic aromatic group and polycyclic aromatic group combined with a member selected from the group consisting of a direct bond and a bridge member and said diamine compound is selected from at least one of m-aminobenzylamine and p-aminobenzylamine and ethylenediamine; 1,4-diaminocyclohexane; m-phenylenediamine, o-phenylenediamine and p-phenylenediamine; diaminonaphthalenes such as 2,6-diaminonaphthalene; 4,4'-diaminobiphenyl; 3,4'-diaminobiphenyl and 3,3'-diaminobiphenyl; and bis(3-aminophenyl) ether, (3-aminophenyl) (4-aminophenyl) ether, bis(3-aminophenyl) sulfide, (3-aminophenyl)(4-aminophenyl) sulfide, bis(4-aminophenyl) sulfide, bis(3-aminophenyl) sulfoxide, (3-aminophenyl)(4-aminophenyl) sulfoxide, bis(4-aminophenyl) sulfoxide, bis (3-aminophenyl) sulfone, (3-aminophenyl)(4-aminophenyl) sulfone, bis(4-aminophenyl) sulfone, 3,3'-diaminobenzophenone, 3,4'-diaminobenzophenone, 4,4'-diaminobenzophenone, 3,3'-diaminodiphenylmethane, 3,4'-diaminodiphenylmethane, 4,4'-diaminodiphenylmethane, bis[4-(4-aminophenoxy)phenyl]methane, 1,1-bis[ 4-(4-aminophenoxy)phenyl]ethane, 1,2-bis[4-(4-aminophenoxy)phenyl] ethane, 2,2-bis[4-(4-aminophenoxy)phenyl]propane, 2,2-bis[4-(4-aminophenoxy)phenyl]butane, 2,2-bis[4-(4-aminophenoxy)phenyl] -1,1,1,3,3,3-hexafluoropropane, 1,3-bis(3-aminophenoxy)benzene, 1,3-bis(4-aminophenoxy)benzene, 1,4-bis( 3-aminophenoxy)benzene, 1,4-bis(4-aminophenoxy)benzene, bis[4-(4-aminophenoxy)phenyl]ketone, bis [4-(4-aminophenoxy)phenyl] sulfide, bis[4-(4-aminophenoxy)phenyl]sulfoxide, bis[4-( 4-aminophenoxy)phenyl] sulfone, bis[4-(4-aminophenoxy)phenylether, 1,4-bis[4-(3-aminophenoxy)benzoyl]benzene, 1,3-bis[4-( 3-aminophenoxy)benzoyl]benzene, 4,4'-bis[3-(4-aminophenoxy)benzoyl] diphenyl ether, 4,4'-bis[3-(3-aminophenoxy)benzoyl]diphenyl ether, 4,4'bis[4-(4-amino-α,α-dimethylbenzyl)phenoxy]benzophenone, 4,4'bis[4-(4-amino-α,α-dimethylbenzyl)phenoxy]diphenyl sulfone and bis[4-(4-(4-aminophenoxy)phenoxy)phenyl] sulfone. The above compounds may be used singly or in combination. It will be noted that the diamine compound used in this aspect of the invention does not include 4,4'-bis(3-aminophenoxy)biphenyl.

The diamine compounds may be also at least one diamine compound selected from the group consisting of:

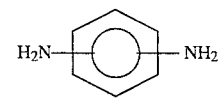
(a)

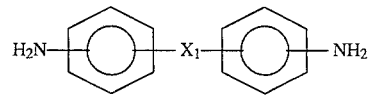
(b)

wherein X$_1$ is a direct bond, O, CO, SO$_2$, SO, S, or CH$_2$ with the proviso that the diamine compound is not 4,4'diaminodiphenyl ether

(c)

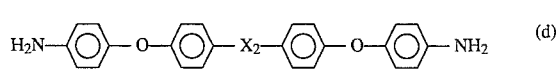
(d)

wherein X$_2$ is a direct bond, CO, SO$_2$, SO, S,

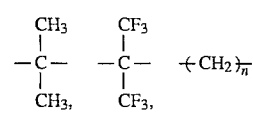

wherein n is 1–4, and

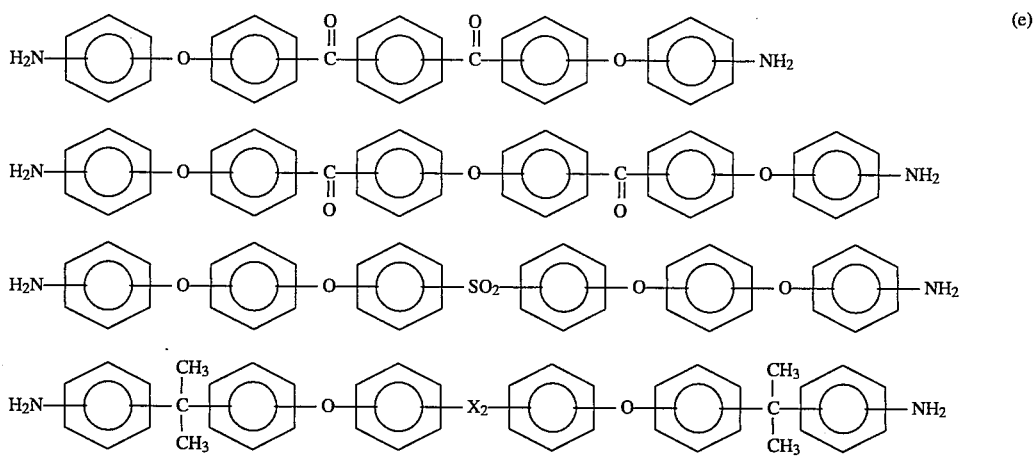

wherein $X_2$ is defined above.

Among the above diamine compounds exemplary preferred compounds include m-phenylenediamine, p-phenylenediamine, bis(3-aminophenyl) ether, (3-aminophenyl)(4-aminophenyl) ether, 1,3-bis(3-aminophenoxy)benzene, 1,3-bis(4-aminophenoxy)benzene, 1,4-bis(3-aminophenoxy)benzene and 1,4-bis(4-aminophenoxy)benzene.

Exemplary suitable tetracarboxylic acid dianhydrides of the formula (IV) which may be used to prepare the polyimides of this aspect of the invention include dianhydrides wherein $R_2$ is an aliphatic group, such as ethylenetetracarboxylic dianhydride and butanetetracarboxylic dianhydride; dianhydrides wherein $R_2$ is an alicyclic group, such as cyclopentanetetracarboxylic dianhydride; dianhydrides wherein $R_2$ is a monocyclic aromatic group, such as 1,2,3,4-benzenetetracarboxylic dianhydride; dianhydrides wherein $R_2$ is a fused polycyclic aromatic group, such as 2,3,6,7-naphthalenetetracarboxylic dianhydride, 1,4,5,8-naphthalenetetracarboxylic dianhydride, 1,2,5,6-naphthalenetetracarboxylic dianhydride, 3,4,9,10-perylenetetracarboxylic dianhydride, 2,3,6,7-anthracenetetracarboxylic dianhydride, and 1,2,7,8-phenanthrenetetracarboxylic dianhydride; dianhydrides wherein $R_2$ is a polycyclic aromatic group combined with a direct bond, such as 3,3'4,4'-biphenyltetracarboxylic dianhydride and 2,2'3,3'-biphenyltetracarboxylic dianhydride; and dianhydrides wherein $R_2$ is a polycyclic aromatic group combined via a bridge member, such as 3,3',4,4'-benzophenonetetracarboxylic dianhydride, 2,2',3,3'-benzophenonetetracarboxylic dianhydride, 2,2'-bis(3,4-dicarboxyphenyl)propane dianhydride, bis(3,4-dicarboxyphenyl) ether dianhydride, bis(2,3-dicarboxyphenyl) ether dianhydride, bis(3,4-dicarboxyphenyl) sulfone dianhydride, bis(2,3-dicarboxyphenyl) sulfone dianhydride, 2,2-bis(3,4-dicarboxyphenyl) 1,1,1,3,3,3-hexafluoropropane dianhydride, 2,2-bis(3,4-dicarboxyphenyl)1,1,1, 3,3,3-hexachloropropane dianhydride, 1,1-bis( 2,3-dicarboxyphenyl)ethane dianhydride, bis(2,3-dicarboxyphenyl)methane dianhydride, bis(3,4-dicarboxyphenyl)methane dianhydride, 4,4'-(p-phenylenedioxy)diphthalic dianhydride and 4,4'-(m-phenylenedioxy)diphthalic dianhydride. The dianhydride compound may be used singly or in combination. Numerous tetracarboxylic acid dianhydrides may be used except pyromellitic dianhydride.

Among the above tetracarboxylic acid dianhydrides of the formula (IV), the compounds wherein $R_2$ is a polycyclic aromatic group combined with a direct bond or via a bridge member are preferably used. Exemplary preferred compounds include 3,3'4,4'-benzophenonetetracarboxylic dianhydride, 3,3'4,4'-biphenyltetracarboxylic dianhydride, bis(3,4-dicarboxyphenyl)ether dianhydride and 4,4'-(p-phenylenedioxy)diphthalic dianhydride. More preferably, 3,3'4,4'-biphenyltetracarboxylic dianhydride is employed.

The diamine compound and optionally the tetracarboxylic acid dianhydride of the formula (IV) are incorporated into the reaction system as auxiliary materials in the process of the first aspect of this invention. Reaction of the main materials in the presence of these auxiliary materials forms several kinds of imide units which are derived from the diamine ingredient containing 4,4'-bis(3-aminophenoxy)biphenyl and the diamine compound and the dianhydride ingredient containing pyromellitic dianhydride and the tetracarboxylic acid dianhydride of the formula (IV). These new types of units are thought to cut in the chain of essential recurring structural units of the formula (VI) derived from the main materials, i.e., 4,4'-bis(3-aminophenoxy)biphenyl and pyromellitic dianhydride, and to form a complex polymer chain of polyimide.

It is difficult to identify the structure of these polyimide linkages. In practice, however, crystalline polyimide or non-crystalline polyimide can be obtained by adjusting the amounts of the diamine compound and/or tetracarboxylic acid dianhydride for auxiliary use in the above-mentioned range.

The diamine compound and the tetracarboxylic acid dianhydride represented by the formula (IV) may be used singly or as a mixture in a suitable proportion.

Preferably the diamine compound and tetracarboxylic acid dianhydride of the formula (IV) is employed in an amount of from about 1 to about 100% by mole of the main monomer, i.e., 4,4'-bis(3-aminophenoxy)biphenyl and/or pyromellitic dianhydride. Use in an amount less than about 1% by mole leads to a rapid rate of crystallization of the polyimide composed of the recurring structural units represented by the formula (VI). The resulting polyimide is rapidly converted to a crystalline polyimide and is unfavorable for improving processability. On the other hand, use in an amount exceeding 100% by mole results in an adverse effect on the excellent characteristics of the polyimide. Most preferably, the diamine compound and the tetracarboxylic acid dianhydride of the formula (IV) is employed in an amount of from about 5 to about 50% by mole of 4,4'-bis(3-aminophenoxy)biphenyl and/or pyromellitic dianhydride.

In the case where a non-crystalline polyimide is prepared from bis (4-aminophenyl)ether as the most preferable diamine compound selected from the formula (III), bis(4-aminophenyl)ether is employed in an amount of from about 2 to about 30% by mole of 4,4'-bis(3-aminophenoxy)biphenyl.

A part of the bis(4-amino-phenoxy)ether may be replaced by other diamines without adverse effect on the beneficial properties of the polyimide. Exemplary suitable diamines to be used for the partial replacement have been set forth above.

A non-crystalline polyimide can be obtained by using the above amount. When used in an amount of about 30% by mole or less, the crystallization rate can be controlled to a desired level by selecting the treating conditions and a crystalline polyimide can also be prepared. In the same range of amount for use, it is also possible to prepare a non-crystalline polyimide and to convert the resultant non-crystalline polyimide to crystalline polyimide under selected processing conditions. In these cases, the amount of the diamine compound and tetracarboxylic acid dianhydride of the formula (IV) for auxiliary use is about 30% by mole or less, preferably from about 2 to about 30% by mole of the main monomer materials, i.e., 4,4'-bis(3-aminophenoxy)biphenyl and/or pyromellitic dianhydride. When an amount exceeding about 30% by mole is employed, it is difficult to give a substantially crystalline polyimide. The use of an amount in large excess of about 30% by mole can already provide a non-crystalline polyimide. Consequently, a crystalline polyimide can be arbitrarily obtained at a certain temperature at a desired rate of crystallization by selecting the amount of auxiliary monomer in the range of 30% by mole or less of 4,4'-bis(3-aminophenoxy)biphenyl and/or pyromellitic dianhydride, which means that processability can be improved and molded products having excellent thermal resistance can be simultaneously obtained.

In the process for preparing the polyimide of this invention, polyamic acid is prepared by reacting 4,4'-bis(3-aminophenoxy)biphenyl with pyromellitic dianhydride in the presence of the diamine compound and/or a tetracarboxylic acid dianhydride of the formula (IV).

No particular restriction is imposed on the method of reaction. However, organic solvents are preferably used for the reaction. Exemplary suitable organic solvents include N,N-dimethylformamide, N,N-dimethylacetamide, N,N-diethylacetamide, N,N-dimethylmethoxyacetamide, N-methyl-2-pyrrolidone, 1,3-dimethyl-2-imidazolidinone, N-methylcaprolactam, 1,2-dimethoxyethanebis(2-methoxyethyl)ether, 1,2-bis(2-methoxyethoxy)ethane, bis[2-(2-methoxyethoxy)ethyl]ether, tetrahydrofuran, 1,3-dioxane, 1,4-dioxane, pyridine, picoline, dimethyl sulfoxide, dimethyl sulfone, tetramethylurea, hexamethylphosphoramide, phenol, o-cresol, m-cresol, m-cresylic acid, p-cresol, p-chlorophenol and anisol. These organic solvents may be used singly or in combination.

A reaction temperature of about 250° C. or less is preferably employed, more preferably a temperature of about 50° C. or less is employed. No particular limitation is placed upon the pressure and the reaction can be satisfactorily carried out at atmospheric pressure. Reaction time is different depending upon the solvent and reaction temperature. A reaction time of from about 4 to about 24 hours is usually sufficient.

The polyamic acid thus obtained is further imidized by heating at from about 100° to about 400° C. or chemically imidized with an imidizing agent such as acetic anhydride, to obtain a polyimide having recurring units corresponding to the polyamic acid.

Alternatively, 4,4'-bis(3-aminophenoxy)biphenyl and pyromellitic dianhydride may be suspended or dissolved in an organic solvent together with the diamine compound and optionally the tetracarboxylic acid dianhydride of the above formula (IV). Then, the resulting mixture is heated to carry out formation of a polyamic acid precursor and simultaneous imidization. The polyimide can thus be prepared.

The above reactions are in some cases carried out in the presence of phthalic anhydride.

Preferably, phthalic anhydride is employed in an amount of from about 0.001 to about 1.0 mole per mole of the total diamine compounds used as the main and auxiliary materials. If employed in an amount less than about 0.001 mole, the phthalic anhydride does not provide thermal resistance of the polyimide at high temperatures, whereas an amount exceeding 1.0 mole lowers the mechanical strengths of the polyimide. Most preferably, the phthalic anhydride is employed in an amount of from about 0.001 to about 0.5 mole.

The reaction in the presence of phthalic anhydride may be carried out by any of the following methods.

(A) Reacting pyromellitic dianhydride with 4,4'-bis(3-aminophenoxy)biphenyl in the presence of the diamine compound and, when used, the tetracarboxylic acid dianhydride of the formula (IV) and successively continuing the reaction after adding phthalic anhydride.

(B) Carrying out the reaction of 4,4'-bis(3-aminophenoxy)biphenyl and the diamine compound with phthalic anhydride and successively continuing the reaction after adding pyromellitic dianhydride and, when used, the tetracarboxylic acid dianhydride of the formula (IV).

(C) Carrying out the reaction after simultaneously mixing pyromellitic dianhydride, 4,4'-bis(3-aminophenoxy)biphenyl, phthalic anhydride, the diamine compound and, when used, the tetracarboxylic acid dianhydride of the formula (IV).

The polyimide can also be prepared by suspending or dissolving 4,4'-bis(3-aminophenoxy)biphenyl, pyromellitic dianhydride, phthalic anhydride and the diamine compound and, when used, the tetracarboxylic acid dianhydride of the formula (IV) in an organic solvent and successively heating to carry out formation of a polyamic acid precursor and simultaneous imidization.

Films or powders of polyimides can be prepared by known methods.

The 4,4'-diaminodiphenyl ether is preferably employed an amount of from about 2 to about 30% by mole per mole of 4,4-bis(3-aminophenoxy)biphenyl. When employed in an amount less than about 2% by mole, the processability is about the same as that of a polyimide consisting of recurring structural units of the formula (VI), and hence no improvement is observed. On the other hand, when employed in an amount greater than about 30% by mole, thermoplasticity is drastically impaired, which is an essential characteristic of the polyimide consisting of the recurring structural units of the formula (VI).

More preferably, the 4,4'-diaminodiphenyl ether is employed in an amount of from about 5 to about 20% by mole of 4,4'-bis(3-aminophenoxy)biphenyl.

In this embodiment of the first aspect, the invention is carried out in the presence of phthalic anhydride. A part of the phthalic anhydride may be replaced by other dicarboxylic acid anhydrides so long as no adverse effect on the good properties of polyimide is observed.

Exemplary suitable dicarboxylic anhydrides for use in partial replacement include 2,3-benzophenonedicarboxylic anhydride, 3,4-benzophenonedicarboxylic anhydride, 2,3-dicarboxyphenylphenylether anhydride, 3,4-dicarboxyphenylphenylether anhydride, 2,3-biphenyldicarboxylic anhydride, 3,4-biphenyldicarboxylic anhydride, 2,3-dicarboxyphenylphenylsulfone anhydride, 3,4-dicarboxyphenylphenylsulfone anhydride, 2,3-dicarboxyphenylphenylsulfide anhydride, 3,4-dicarboxyphenylphenylsulfide anhydride, 1,2-naphthalenedicarboxylic anhydride, 2,3-naphthalenedicarboxylic anhydride, 1,8-naphthalenedicarboxylic anhydride, 1,2-anthracenedicarboxylic anhydride, 2,3-anthracenedicarboxylic anhydride and 1,9-anthracenedicarboxylic anhydride.

Preferably, phthalic anhydride is employed in an amount of from about 0.001 to about 1.0 mole per mole of the total diamine ingredients, i.e., the sum of 4,4'-bis(3-aminophenoxy)biphenyl of the formula (I) and 4,4'-diaminodiphenyl ether. When used in an amount less than about 0.001 mole, thermal stability at high temperatures can not be achieved, which is the object of this aspect of the invention. When used in an amount exceeding about 1.0 mole, a decrease in mechanical properties of the polyimide results. Most preferably, the phthalic anhydride is employed in an amount of from about 0.01 to about 0.5 mole per mole of the total diamine ingredients.

It is particularly preferred to carry out the above reaction in an organic solvent. Exemplary suitable organic solvents are set forth above. The organic solvent may be used singly or as a mixture.

The reaction may be carried out in the organic solvent by any of the following methods.

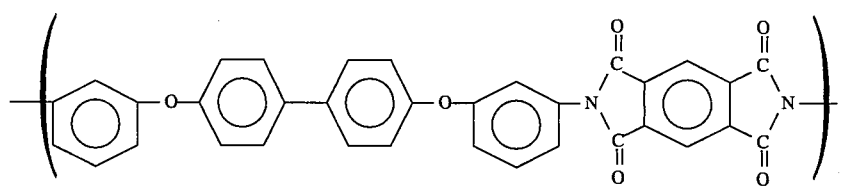

(A) Reacting pyromellitic dianhydride with 4,4'-bis(3-aminophenoxy)biphenyl and 4,4'-diaminodiphenyl ether, and successively continuing the reaction after adding phthalic anhydride.

(B) Reacting 4,4'-bis(3-aminophenoxy)biphenyl and 4,4'-diaminodiphenyl ether with phthalic anhydride, and successively continuing the reaction after adding pyromellitic dianhydride.

(C) Simultaneously reacting pyromellitic dianhydride, 4,4'-bis(3-aminophenoxy)biphenyl, 4,4'-diaminodiphenyl ether and phthalic anhydride.

The reaction temperature is preferably about 250° C. or less, more preferably about 50° C. or less. No particular limitation is placed on the reaction pressure and the reaction can be sufficiently carried out at atmospheric pressure. The reaction time differs depending upon the solvent and reaction temperature. A reaction time of from about 4 to about 24 hours is usually satisfactory.

The polyamic acid thus obtained is imidized by heating at from about 100° to about 400° C. or chemically imidized with an imidizing agent such as acetic anhydride to obtain a polyimide having recurring structural units corresponding to the polyamic acid.

The polyimide can also be obtained by suspending or dissolving 4,4'-bis(3-aminophenoxy)biphenyl, pyromellitic dianhydride, 4,4'-diaminodiphenyl ether and phthalic anhydride in an organic solvent and successively heating the resultant mixture to carry out formation of a polyamic acid precursor and simultaneous imidization.

The polyimide of the first aspect of this invention obtained by the above process contains two and more recurring structural units represented by the formula (V):

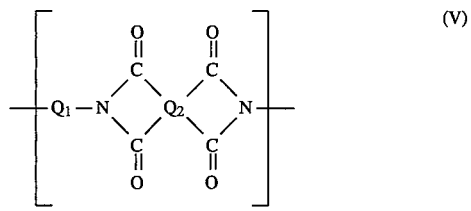

wherein $Q_1$ and $Q_2$ are groups selected from the group consisting of an aliphatic group, an alicyclic group, a monocyclic aromatic group, a fused polycyclic aromatic group and a polycyclic aromatic group combined with a direct bond or via a bridge member, $Q_1$ is a divalent group and $Q_2$ is a tetravalent group. The recurring structural units of the formula (V) contains about 50% by mole or more of the recurring structural units of the formula (VI):

and from about 0.5 to about 50% by mole of at least one recurring structural unit of the formula (VII):

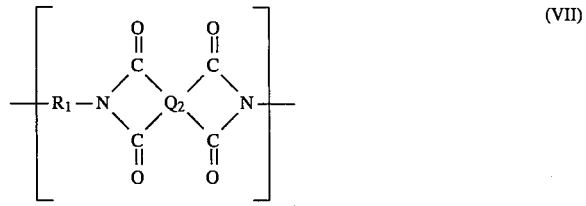

wherein $Q_2$ is defined above and $R_1$ is a divalent group derived from at least one of said diamine compounds.

When the recurring structural units of the formula (VI) are present in an amount of about 50 to about 85% by mole and the amount of the recurring structural units of the formula (VII) is from about 15 to about 50% by mole, a non-crystalline polyimide is obtained.

When the recurring structural units of the formula (VI) are present in an amount of about 85% by mole or more, and the amount of the recurring structural units of the formula (VII) is from about 0.5 to about 15% by mole, a crystalline or non-crystalline polyimide can be obtained by controlling the rate of crystallization.

The constitution of the above recurring structural units in the polyimide obtained by the process of this invention cannot be identified as mentioned above. In practice, characteristic polyimide containing the above recurring structural units can be obtained.

Physical properties were measured on several kinds of non-crystalline polyimides obtained by the process of the first aspect of this invention. Ranges of the properties measured were Tg of 255° to 272° C., 5% weight loss temperature of 539° to 556° C. and heat distortion temperature of the molded specimen of 240° to 255° C. On the other hand, crystalline polyimides consisting of the recurring structural units of the formula (VI) exhibited corresponding properties of respectively 260° C., 545° C. and 245° C. These results illustrate that these polyimides are almost equal in heat resistance. The non-crystalline polyimides obtained in this aspect of the invention had a melt viscosity of 10800 to 40000 poises at 380° C. However, polyimides consisting of the recurring structural units of the formula (VI) did not flow at 380° C. The polyimide of this aspect of the invention has a melt flow initiation temperature of 322° to 328° C., whereas the crystalline polyimide of the formula (VI) has a considerably high initiation temperature of 374° C. The non-crystalline polyimides of the first aspect of the invention maintain high thermal resistance and have improved processability.

In the melt processing of polyimides obtained by the first aspect of the invention, a suitable amount of other thermoplastic resins may be blended depending upon the object for use, so long as there is no adverse effect on the objects of this aspect of the invention. Exemplary suitable thermoplastic resins include polyethylene, polypropylene, polycarbonate, polyallylate, polyamide, polysulfone, polyether sulfone, polyether ketone, polyphenylene sulfide, polyamideimide, polyetherimide and modified polyphenylene oxide.

Fillers which are used for common resin compositions may be added in an amount which do not cause any adverse effect on the objects of the first aspect of the invention. Exemplary suitable fillers include wear resistance improvers such as graphite, carborundum, silica powder, molybdenum disulfide and fluoro resins; reinforcing materials such as glass fibers, carbon fibers, boron fibers, silicon carbide fibers, carbon whiskers, asbestos, metallic fibers and ceramic fibers; flame retardance improvers such as antimony trioxide, magnesium carbonate and calcium carbonate; electrical property improvers such as clay and mica; tracking resistance improvers such as asbestos, silica and graphite; acid resistance improvers such as barium sulfate, silica and calcium metasilicate; thermal conductivity improvers such as iron powder, zinc powder, aluminum powder and copper powder; and other miscellaneous materials such as glass beads, glass balloons, talc, diatomaceous earth, alumina, silicate balloons, hydrated alumina, metal oxides and colorants.

The first aspect of the present invention provides non-crystalline polyimides having improved processability without decreasing the thermal resistance of essentially crystalline polyimides, having melt viscosities lower than that of conventionally known polyimide resins, and which have excellent melt flow-stability.

The polyimides of this aspect of the invention are useful in precision molded products and thermal resistant films and as a non-crystalline engineering plastic having outstanding thermal resistance.

The first aspect of the present invention also provides a method for preparing molded articles from noncrystalline to crystalline polyimide base resins by arbitrarily adjusting the rate of crystallization. Hence, this aspect of the invention can provide excellent polyimide resin having remarkably improved processability and thermal resistance, and is an industrially valuable invention.

In the second aspect of the present invention, the aromatic polyetherimide which is used is described in Polymer Preprint 24, (2), 312–313 (1983). The polyetherimide is a polymer consisting of ether and imide linkages as a required bonding unit and is substantially composed of recurring units which are represented by the following formula:

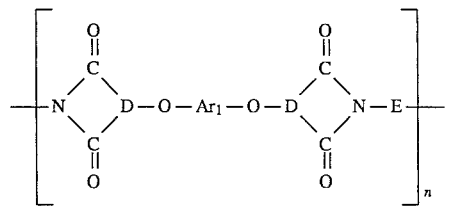

wherein D is a trifunctional aromatic group where two functional groups out of three are connected with adjacent carbon atoms, both E and $Ar_1$ are residue of divalent aromatic groups. Representative examples of aromatic polyetherimide include the compounds represented by the following formulas:

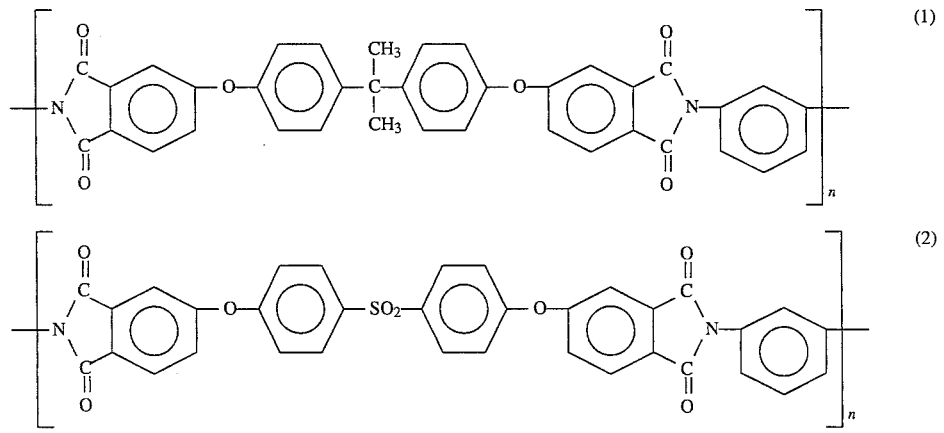

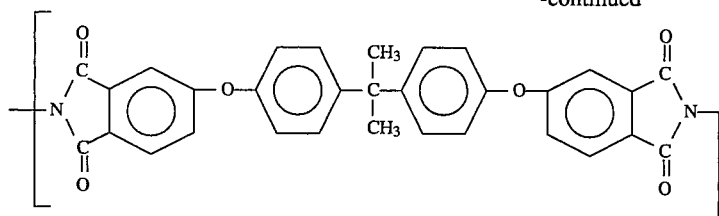
(3)
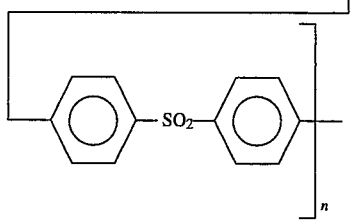
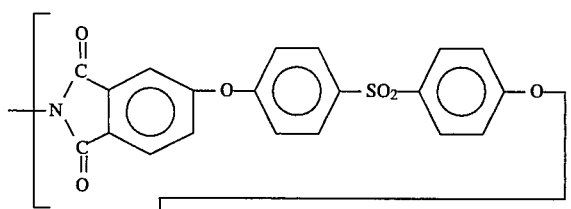
(4)
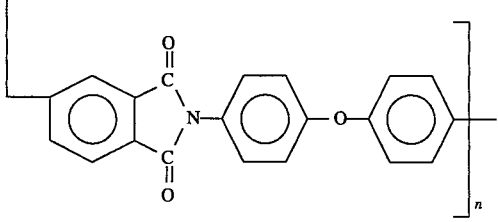
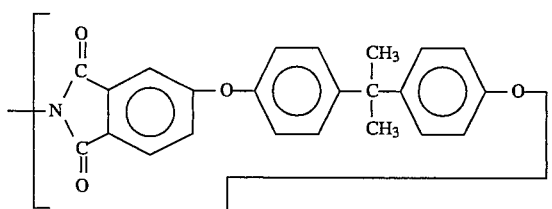
(5)
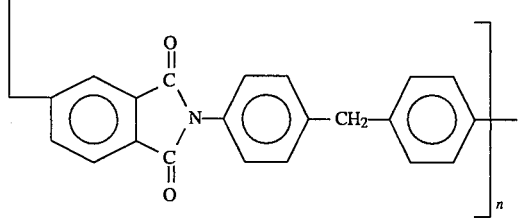
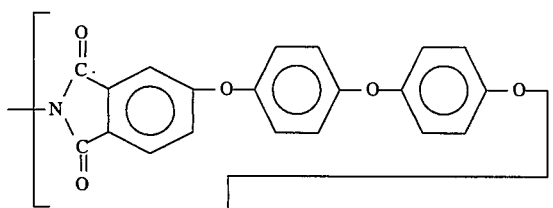
(6)
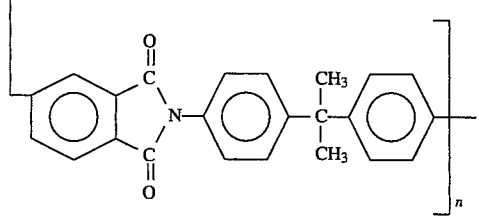

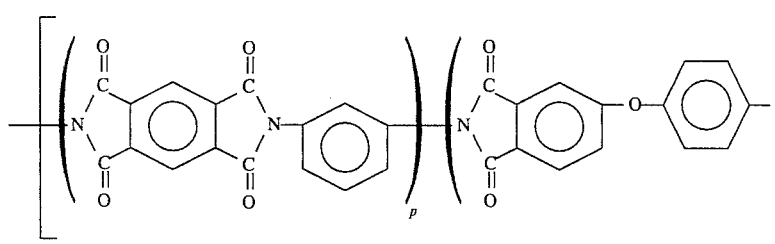

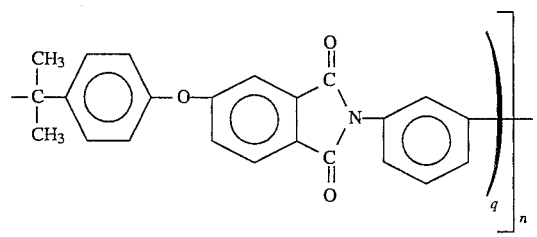

(7)

$(p = 0.1 \sim 0.3, q = 0.9 \sim 0.7)$

Some of the above aromatic polyetherimide are commercially available from General Electric Co. with Trade Marks such as ULTEM-1000, ULTEM-4000 and ULTEM-6000.

The polyimide which is used in the second aspect of the invention is a compound consisting of recurring units represented by the formula:

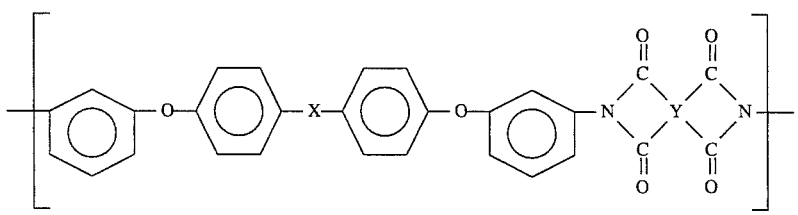

wherein X is a direct bond or —S—, and Y is a tetravalent group selected from the group consisting of an aliphatic group having at least 2 carbon atoms, an alicyclic group, monocyclic aromatic group, a fused polycyclic aromatic group and a polycyclic aromatic group where aromatic groups are connected to each other with a direct bond or via a bridge member.

As a diamine component of the polyimide, etherdiamine used is represented by the formula:

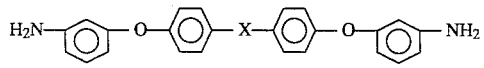

wherein X is direct bond or —S—.

The etherdiamine is reacted with at least one tetracarboxylic acid dianhydride, and the resulting polyamic acid is subjected to dehydrating condensation to obtain polyimide.

Examples of the etherdiamine used in the second aspect of the invention include 4,4'-bis(3-aminophenoxy)biphenyl and bis[4-(3-aminophenoxy)phenyl]sulfide. The diamines may be used alone or as a mixture.

In addition, other diamines can be used in combination with the etherdiamine in a range which causes no adverse effect on the flowability of the molten polyimide. Diamines which may be used in admixture with etherdiamine include, for example, m-aminobenzylamine, p-aminobenzylamine, 3,3'-diaminodiphenyl ether, 3,4'-diaminodiphenyl ether, 4,4'-diaminodiphenylether, 3,3'-diaminodiphenyl sulfide, 3,4'-diaminodiphenyl sulfide, 4,4'-diaminodiphenyl sulfide, 3,3'-diaminodiphenyl sulfone, 3,4'-diamino-diphenyl sulfone, 4,4'-diaminodiphenyl sulfone, 3,3'-diaminobenzophenone, 3,4'-diaminobenzophenone, 4,4'-diaminobenzophenone, 1,3-bis(3-aminophenoxy)benzene, 1,3-bis(4-aminophenoxy)benzene, 1,4-bis(3-amino-phenoxy)benzene, 1,4-bis(4-aminophenoxy)benzene, 2,2-bis[4-(4-aminophenoxy)phenyl propane, 4,4'-bis(4-aminophenoxy)biphenyl, 4,4'-bis(4-aminophenoxy)ketone, bis[4-(4-aminophenoxy)phenyl]sulfide, bis[4-(4-aminophenoxy)phenyl]sulfone, bis[4-(3-aminophenoxy)phenyl] methane, 1,1-bis[4-(3-aminophenoxy)phenyl]-ethane, 1,2-bis[ 4-(3-aminophenoxy)phenyl]ethane, 2,2-bis[4-(3-aminophenoxy)phenyl]propane, 2-[4-(3-aminophenoxy)phenyl]-2-[4-(3-aminophenoxy)- 3-methylphenyl]propane, 2,2-bis[4-(3-aminophenoxy)- 3-methylphenyl]propane, 2-[4-(3-aminophenoxy)phenyl]- 2-[4-(3-aminophenoxy)-3,5-dimethylphenyl]propane, 2,2-bis[4-(3-aminophenoxy)- 3,5-dimethylphenyl]propane, 2,2-bis[4-(3-aminophenoxy)phenyl] butane, 2,2-bis[4-(3-aminophenoxy)phenyl]-1,1,1, 3,3,3-hexafluoropropane, 4,4'-bis(3-aminophenoxy)biphenyl, 4,4'-bis(3-aminophenoxy)-3-methylbiphenyl, 4,4'-bis( 3-aminophenoxy)-3,3'-dimethylbiphenyl, 4,4'-bis(3-aminophenoxy)- 3,5-dimethylbiphenyl, 4,4'-bis(3-aminophenoxy)- 3,3',5,5'-tetramethylbiphenyl, bis[4-(3-aminophenoxy)phenyl] ketone, bis[4-(3-aminophenoxy)phenyl]sulfide and bis[4-(3-aminophenoxy)phenyl] sulfone. These diamines are used in admixture with etherdiamine of the above formula in an amount of normally not more than 30 wt. %, and preferably not more than 5 wt. %.

The polyimide used in the second aspect of the present invention can be prepared by reacting the diamine with tetracarboxylic acid dianhydride in an organic solvent and followed by conducting dehydrating condensation.

The tetracarboxylic acid dianhydride used in this aspect of the invention has the following formula:

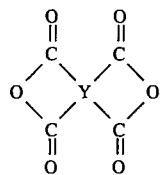

where Y is the same as above. Representative examples of these tetracarboxylic acid dianhydrides include ethylenetetracarboxylic acid dianhydride, 1,2,3,4-butanetetracarboxylic acid dianhydride, cyclopentanetetracarboxylic acid dianhydride, pyromellitic dianhydride, 3,3'4,4'-benzophenonetetracarboxylic acid dianhydride, 2,2'3,3'-benzophenonetetracarboxylic acid dianhydride, 3,3'4,4'-biphenyltetracarboxylic acid dianhydride, 2,2'3,3'-biphenyltetracarboxylic acid dianhydride, bis (3,4-dicarboxyphenyl) ether dianhydride, bis (3,4-dicarboxyphenyl) sulfone dianhydride, 1,1-bis(2,3-dicarboxyphenyl)ethane dianhydride, bis (2,3-dicarboxyphenyl) methane dianhydride, bis(3,4-dicarboxyphenyl)methane dianhydride, 2,3,6,7-naphthalenetetracarboxylic acid dianhydride, 1,4,5,8-naphthalenetetracarboxylic acid dianhydride, 1,2,5,6-naphthalenetetracarboxylic acid dianhydride, 1,2,3,4-benzenetetracarboxylic acid dianhydride, 3,4,9,10-perylenetetracarboxylic acid dianhydride, 2,3,6,7-anthracenetetracarboxylic acid dianhydride, 1,2,7,8-phenanthrenetetracarboxylic acid dianhydride, 4,4'-(p-phenylenedioxy)diphthalic acid dianhydride and 4,4'-(m-phenylenedioxy)diphthalic acid dianhydride. Among these acid dianhydrides, pyromellitic dianhydride, 3,3'4,4'-benzophenonetetracarboxylic acid dianhydride, 3,3'4,4'-biphenyltetracarboxylic acid dianhydride and 2,2-bis (3,4-dicarboxyphenyl) 1,1,3,3,3-hexafluoropropane dianhydride are particularly preferred.

The tetracarboxylic acid dianhydrides can be used alone or as a mixture of two or more.

The heat resistant resin composition of the second aspect of the invention consists essentially of 95-5 wt. % of aromatic polyetherimide and 5-95 wt. % of polyimide. A preferred composition consists of 90-10 wt. % of aromatic polyetherimide and 10-90 wt. % of polyimide. A more preferred composition consists of 80-20 wt. % of aromatic polyetherimide and 20-80 wt. % of polyimide. When the content of aromatic polyetherimide or polyimide is above 95 wt % or below 5 wt %, the composition of this aspect of the invention cannot provide a combination of excellent characteristics such as flowability, mechanical strength and particularly impact and abrasion resistances. That is, the second aspect of the present invention provides the essential flowability of aromatic polyetherimide with good mechanical strength and abrasion resistance of polyimide.

The composition of the second aspect of the invention may contain fillers used in known resin compositions in an amount which has no adverse effect on the object of this aspect of the invention. The fillers include abrasion resistance improvers such graphite, carborundum, silica powder, molybdenum disulfide and fluororesin; reinforcing materials such as glass fibers, carbon fibers, boron fibers, silicon carbide fibers, carbon whiskers, asbestos and metal fibers; flame retardance improvers such as antimony trioxide, magnesium carbonate and calcium carbonate; electrical property improvers such as clay and mica; tracking resistance improvers such as asbestos, silica and graphite; acid resistance improvers such as barium sulfate, silica and calcium metasilicate; thermal conductivity improvers such as iron powder, zinc powder, aluminum powder and copper powder; and other miscellaneous additives such as glass beads, glass spheres, talc, diatomaceous earth, alumina, silicate balloons, hydrated alumina, metal oxides, coloring agents and materials which are stable above 300° C.

These raw materials are used by mixing in advance. The mixing may be carried out by feeding each raw material separately to fusion mixing equipment or by mixing these materials in a general purpose mixer such as Henschel mixer, ball mixer and ribbon blender prior to feeding the materials to the fusion mixer.

Any procedure used for known resin compositions may be selected. The temperature of the fusion mixer is normally 250°-400° C. and preferably 300°-380° C. Any molding process including compression molding, Sinter molding, injection molding and extrusion molding may be employed. Injection molding and extrusion molding are recommended from the viewpoints of the formation of a uniformly fused blend and high productivity.

In the third aspect of the invention, the polyimide is derived from etherdiamine of the following formula:

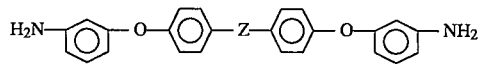

wherein Z is a direct bond, thio radical or a phenylene dicarbonyl radical where two carbonyl radicals are meta or para located on the benzene ring.

The etherdiamine is 4,4'-bis(3-aminophenoxy)biphenyl, bis[4-(3-aminophenoxy)phenyl] sulfide, 1,3-bis[4-(3-aminophenoxy)benzoyl] benzene or 1,4-bis[4-(3-aminophenoxy)benzoyl] benzene.

These etherdiamines have the following formulae respectively:

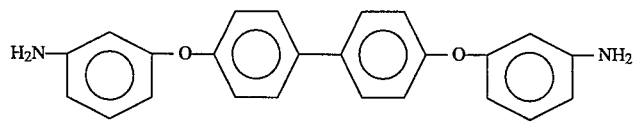

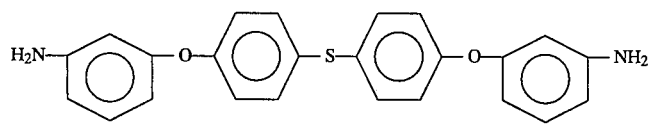

-continued

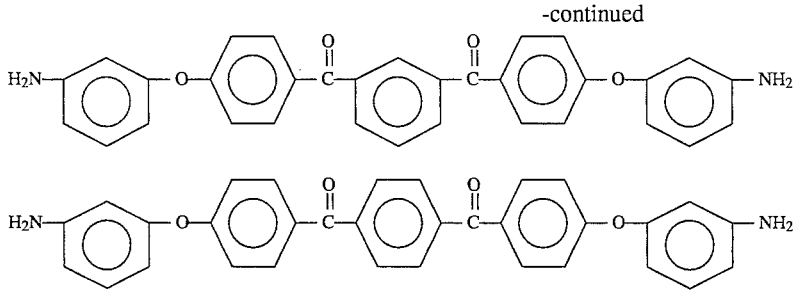

The etherdiamine is reacted with at least one tetracarboxylic acid dianhydride in an organic solvent.

The tetracarboxylic acid dianhydride used in the above reaction is an anhydride of the formula:

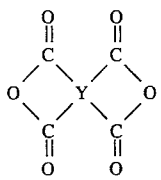

where Y is a tetravalent group selected from the group consisting of an aliphatic group having at least two carbon atoms, alicyclic group, a monocyclic aromatic group, a fused polycyclic aromatic group and a polycyclic aromatic group where aromatic groups are connected to each other with a direct bond or via a bridge member.

The tetracarboxylic acid dianhydride used in the method includes, for example, ethylenetetracarboxylic dianhydride, butanetetracarboxylic dianhydride, cyclopentanetetracarboxylic dianhydride, pyromellitic dianhydride, 3,3',4,4'-benzophenonetetracarboxylic dianhydride, 2,2',3,3'-benzophenonetetracarboxylic dianhydride, 3,3'4,4'-biphenyltetracarboxylic dianhydride, 2,2'3,3'-biphenyltetracarboxylic dianhydride, 2,2-bis(3,4-dicarboxyphenyl)propane dianhydride, 2,2-bis(2,3-dicarboxyphenyl)propane dianhydride, bis(3,4-dicarboxyphenyl) ether dianhydride, bis(3,4-dicarboxyphenyl)sulfone dianhydride, 1,1-bis-(2,3-dicarboxyphenyl)ethane dianhydride, bis(2,3-dicarboxyphenyl)methane dianhydride, bis(3,4-dicarboxyphenyl)methane dianhydride, 4,4'-(p-phenylenedioxy)diphthalic dianhydride, 4,4'-(m-phenylenedioxy)diphthalic dianhydride, 2,3,6,7-naphthalenetetracarboxylic dianhydride, 1,4,5,8-naphthalenetetracarboxylic dianhydride, 1,4,5,8-naphthalenetetracarboxylic dianhydride, 1,2,5,6-naphthalenetetracarboxylic dianhydride, 1,2,3,4-benzenetetracarboxylic dianhydride, 3,4,9,10-perylenetetracarboxylic dianhydride, 2,3,6,7-anthracenetetracarboxylic dianhydride and 1,2,7,8-phenanthrenetetracarboxylic dianhydride and 2,2-bis (3,4-dicarboxyphenyl)- 1,1,1,3,3,3-hexafluoropropane dianhydride.

Particularly preferred tetracarboxylic acid dianhydrides are pyromellitic dianhydride, 3,3'4,4'-biphenyltetracarboxylic dianhydride, 3,3',4,4'-benzophenonetetracarboxylic dianhydride and bis(3,4-dicarboxyphenyl)ether.

The tetracarboxylic acid dianhydride can be used alone or in the mixtures of two or more.

The polyimide which is used in the composition of the third aspect of the invention is prepared by using the above stated etherdiamine as a raw material. In order to obtain the composition of this aspect of the invention, other diamines can also be used in combination with the etherdiamine within the range which has no adverse effect on the good properties of the polyimide.

Examples of the diamines which may be used in admixture with the etherdiamine include, m-phenylenediamine, o-phenylenediamine, p-phenylenediamine, m-aminobenzylamine, p-aminobenzylamine, bis (3-aminophenyl) ether, (3-aminophenyl) (4-aminophenyl) ether, bis (4-aminophenyl) ether, bis (3-aminophenyl)sulfide, (3-aminophenyl) (4-aminophenyl) sulfide, bis (4-aminophenyl) sulfide, bis (3-aminophenyl) sulfoxide, (3-aminophenyl) (4-aminophenyl) sulfoxide, bis (4-aminophenyl) sulfoxide, bis (3-aminophenyl)sulfone, (3-aminophenyl)(4-aminophenyl)sulfone, bis(4-aminophenyl)sulfone, 3,3'-diaminobenzophenone, 3,4'-diaminobenzophenone, 4,4'-diaminobenzophenone, bis[4-(4-aminophenoxy)phenyl] methane, 1,1-bis[4-(4-aminophenoxy)phenyl]ethane, 1,2-bis [4-(4-aminophenoxy)phenyl]ethane, 2,2-bis[4-(4-aminophenoxy)phenyl] propane, 2,2-bis[4-(4-aminophenoxy)phenyl] butane, 2,2-bis(4-(4-aminophenoxy)phenyl-1,1,1, 3,3,3-hexafluoropropane, 1,3-bis(3-aminophenoxy)benzene, 1,3-bis(4-aminophenoxy)benzene, 1,4-bis(3-aminophenoxy)benzene, 1,4-bis( 4-aminophenoxy)benzene, 4,4'-bis(4-aminophenoxy)biphenyl, bis[4-(4-aminophenoxy)phenyl]ketone, bis[4-(4-aminophenoxy)phenyl] sulfide, bis[4-(4-aminophenoxy)phenyl]sulfoxide, bis[4-( 4-aminophenoxy)phenyl]sulfone and bis[4-(4-aminophenoxy)phenyl] ether.

The high temperature engineering polymer which is used in the third aspect of the present invention includes, for example, polyphenylene sulfide, aromatic polysulfone and aromatic polyetherimide. However, aromatic polyetherimide is excluded when Z is a direct bond or thio radical in the formula of the polyimide used in this aspect of the invention.

Polyphenylene sulfide is a resin having recurring units of the formula:

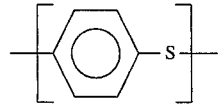

The preparation process of the resin is disclosed, for example in U.S. Pat. No. 3,354,129 and Japanese Patent Publication TOKKOSHO 45-3368 (1970). The resin can be commercially available, for example, as RYTON (Trade Mark of Phillips Petroleum Co. in U.S.A.). According to the patent disclosure, polyphenylene sulfide is produced by reacting p-chlorobenzene with sodium sulfide monohydrate at 160°–250° C. under pressure in N-methylpyrrolidone solvent. Polyphenylene sulfide includes various grades such as from non-crosslinked to partially crosslinked polymers and polymers having different polymerization degrees.

These grades can be easily produced by conducting a post-treatment process and are also available in the market. Therefore grades having suitable melt viscosity for the desired polymer blend can be optionally prepared or purchased in the market.

Aromatic polysulfone is a well known high temperature engineering polymer having a polymer chain represented by the formula:

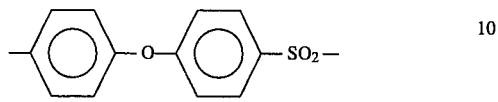

and described, for example, by V. J. Leslie et al, in CHEMITECH, July 1975, 426–432.

Representative examples of the recurring units constituting aromatic polysulfone of this aspect of the invention include:

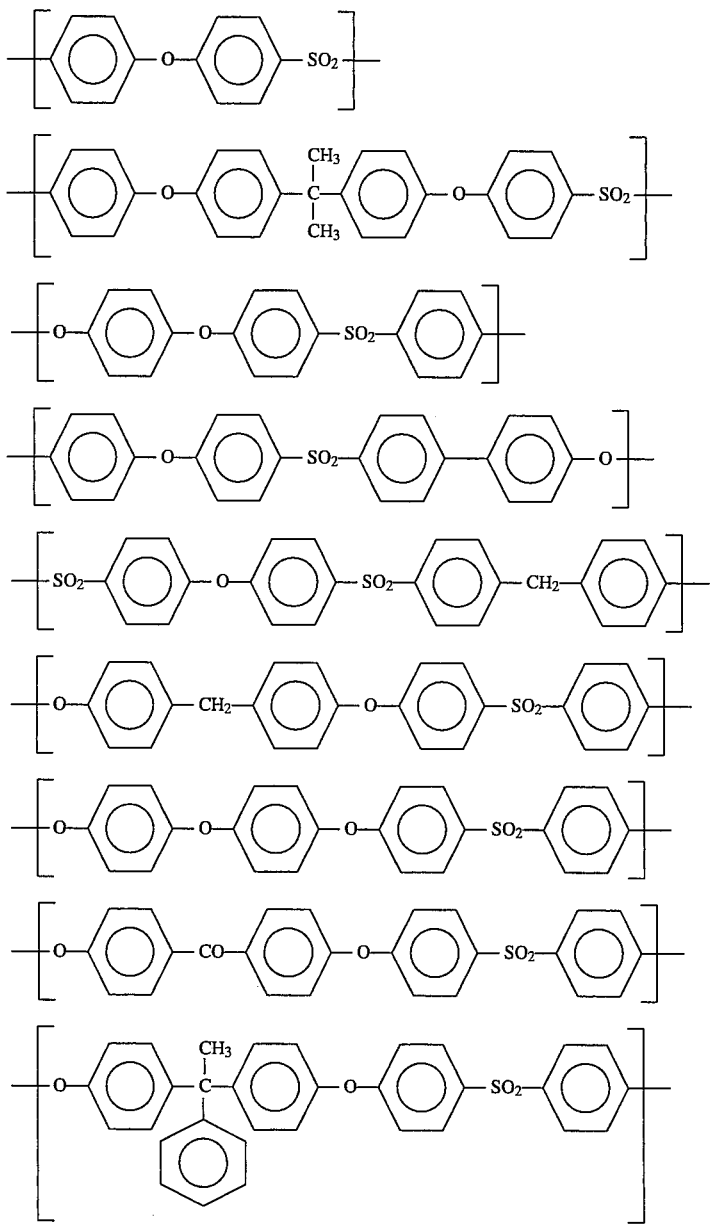

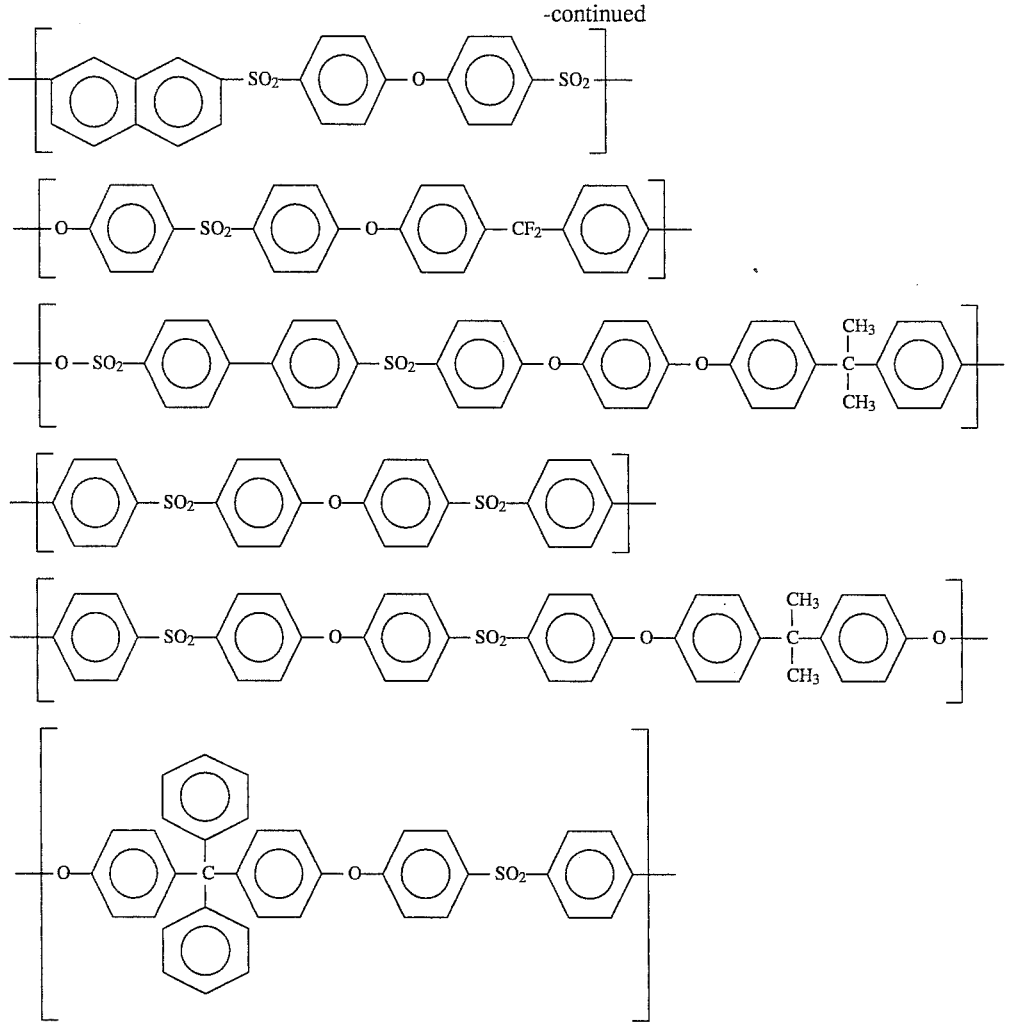

Typical aromatic polysulfones include, for example, polysulfone consisting of recurring units represented by the formula:

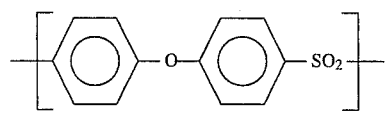

(Trade Mark; VICTREX PES, commercially available from Imperial Chemical Industries in Britain) and polysulfone consisting of recurring units represented by the formula:

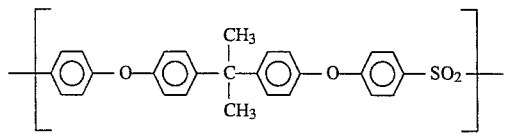

(Trade mark; UDEL POLYSULFONE, commercially available from Union Carbide Corp, in U.S.A.).

Grades of aromatic polysulfone having various polymerization degrees can be easily produced. Therefore grades having suitable melt viscosity for the desired polymer blend can be optionally selected.

Aromatic polyetherimide is a polymer having both ether and imide linkages as a required bonding unit and is substantially composed of recurring units of the following formula:

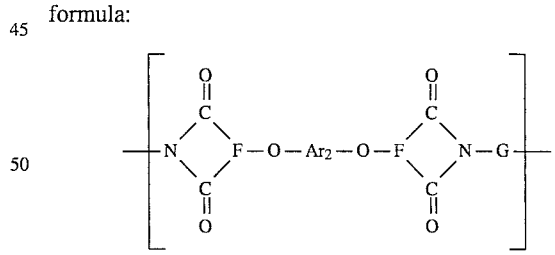

wherein F is a trivalent aromatic radical where two valences out of three are connected with two adjacent carbon atoms, and $Ar_2$ and G are respectively a divalent monoaromatic group and a divalent polycyclic aromatic group connected with a bridge member.

This polyetherimide is also a well known high temperature engineering polymer and is described, for example, by Takekoshi et al in Polymer Preprint 24,(2), 312–313 (1983).

Suitable examples of recurring units constituting aromatic polyetherimide of this invention include:

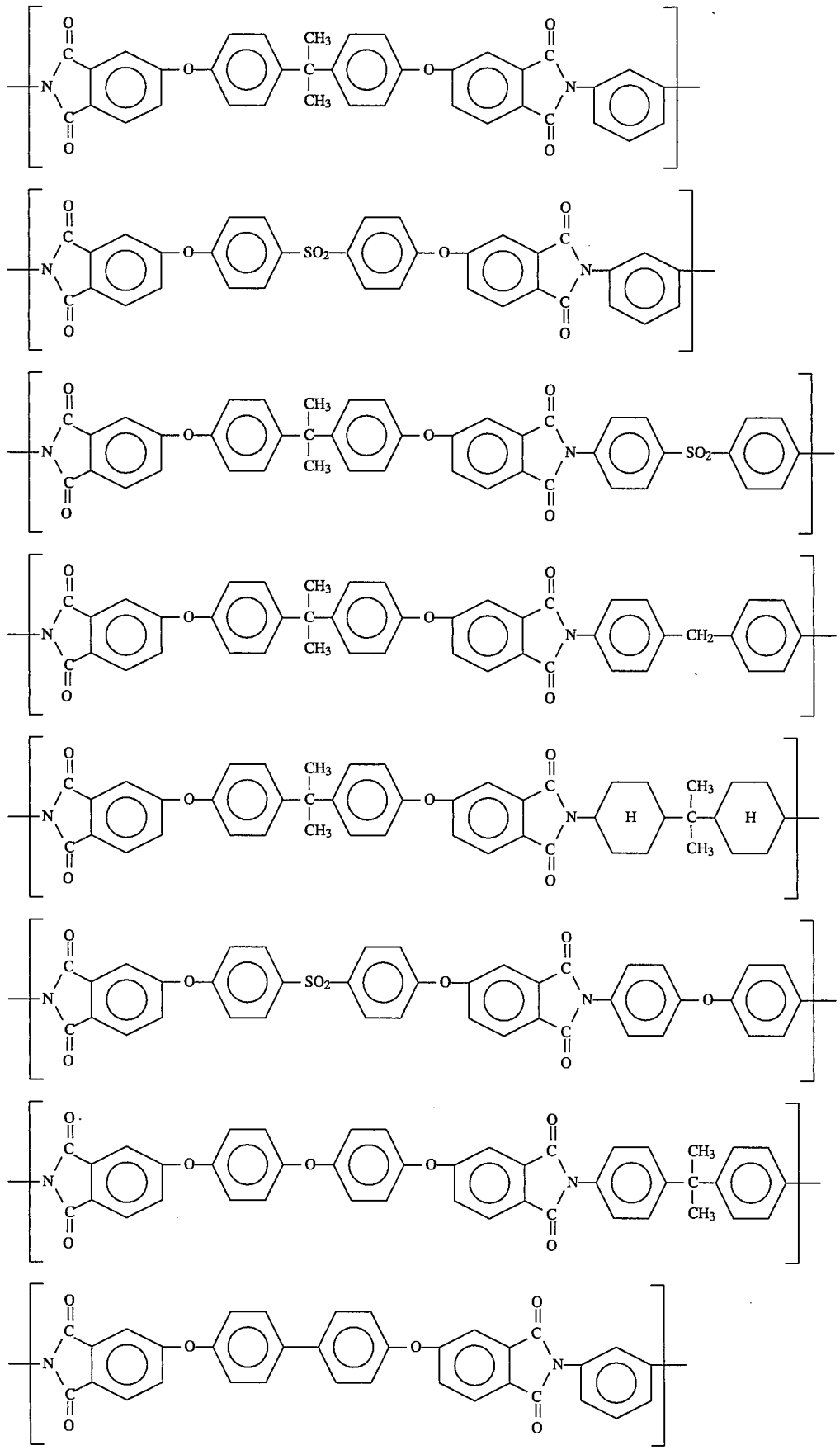

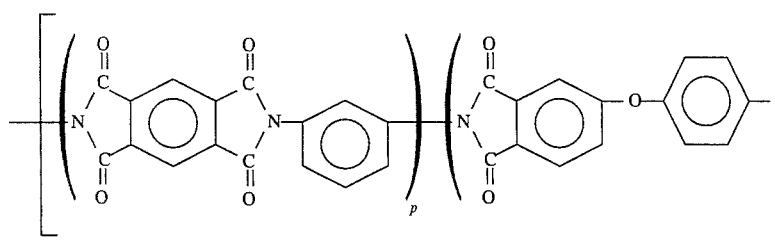

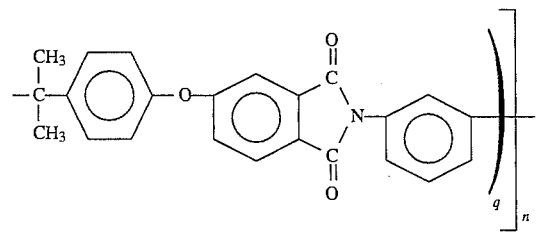

(p = 0.1~0.3, q = 0.9~0.7)

Aromatic polyetherimide is commercially available from General Electric Co. in U.S.A. with the Trade Marks of ULTEM-1000, ULTEM-4000 and ULTEM-6000.

Aromatic polyetherimide particularly consisting of recurring units of the formula:

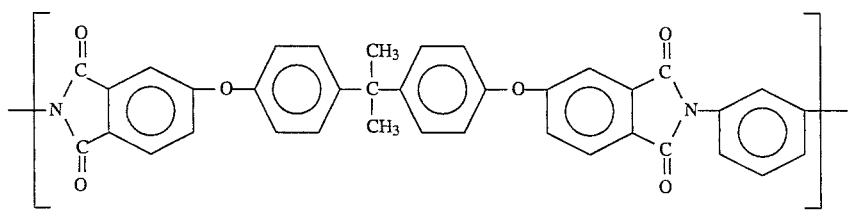

is commercially available from General Electric Co. with the Trade Mark of ULTEM-1000.

Grades of aromatic polyetherimide having various polymerization degrees can be easily produced. Therefore grades having suitable melt viscosity for the desired polymer blend can be optionally selected.

The molding composition of resin in the third aspect of the invention is prepared so as to comprise the above mentioned polyimide in the range of 99.9 to 50% by weight and the high-temperature engineering polymer in the range of 0.1 to 50% by weight.

The resin of the third aspect of the invention based on polyimide/polyphenylene sulfide exhibits remarkably low melt viscosity in a high temperature region above 350° C. The good fluidization effect of polyphenylene sulfide can be found even in a small amount. The lower limit of the amount in the composition is 0.1% by weight. The preferred amount is not less than 0.5% by weight.

Polyphenylene sulfide is excellent in chemical resistance, water absorption and flame retardance among the high-temperature stable resins. It, however, is inferior particularly in elongation at break and impact resistance. Therefore, too much polyphenylene sulfide in the above composition is unfavorable because the essential mechanical strength of polyimide can not be maintained. The amount of polyphenylene sulfide in the composition has an upper limit and is preferably 50% by weight or less.

The resin composition of this aspect of the invention based on polyimide/aromatic polysulfone exhibits remarkably low melt viscosity in a high temperature region such as above 350° C. The good fluidization effect of aromatic polysulfone can be found even in a small amount. The lower limit of amount in the composition is 0.1% by weight. The preferred amount is not less than 0.5% by weight.

Aromatic polysulfone is excellent in mechanical strength at high temperatures among the high-temperature stable resins. It, however, is inferior to polyimide in mechanical strength, izod impact strength in particular. Therefore, too much aromatic polysulfone in the above composition is unfavorable because the essential mechanical strength of polyimide cannot be maintained. The amount of aromatic polysulfone in the composition has an upper limit and is preferably 50% by weight or less.

The resin composition of this aspect of the invention based on polyimide/aromatic polyetherimide exhibits remarkably low melt viscosity as compared with polyimide alone in a high temperature region, above 360° C. in particular. The effect can be found even in a small amount of aromatic polyetherimide. The lower limit in the composition is 0.1% by weight. The preferred amount is not less than 0.5% by weight.

Aromatic polyetherimide is excellent in mechanical strength at high temperatures among the high-temperature stable resins. It, however, is inferior to polyimide in mechanical strength, izod impact strength in particular. Therefore, too much aromatic polyetherimide is unfavorable because the essential mechanical strength of polyimide cannot be maintained.

Aromatic polyetherimide is easily soluble in halogenated hydrocarbons such as methylene chloride and chloroform as well as amide type solvents such as dimethyl acetamide and N-methyl-pyrrolidone. Therefore, too much aromatic polyetherimide in the composition is unfavorable because the essential solvent resistance of polyimide cannot be maintained.

For these reasons, the amount of aromatic polyetherimide has an upper limit in the composition and is preferably 50% by weight or less.

In the preparation of the composition in the third aspect of the invention, common known methods can be employed and, for example, the below described methods are preferred.

(1) Polyimide powder and high-temperature engineering polymer powder are pre-mixed to prepare a uniform mixture of powder by using a blender such as a mortar, Henschel mixer, drum blender, tumbler blender, ball mill or ribbon blender.

(2) Polyimide powder is previously dissolved or suspended in an organic solvent. High-temperature engineering polymer is added to the resulting solution or suspension and dispersed uniformly, followed by removing the solvent to give a powdered mixture.

(3) High-temperature engineering polymer is suspended in an organic solvent solution of polyamic acid which is the precursor of polyimide in this invention. The resultant suspension is imidized by heat treatment at 100°–400° C. or by chemical imidization with a conventional imidizing agent, followed by removing the solvent to give a powdered mixture.

The powdered resin composition of polyimide thus obtained can be used as is for various molding applications such as injection molding, compression molding, transfer molding and extrusion molding. A more preferred method is blending of fused resin prior to molding.

Fusion blending of polyimide and high-temperature engineering polymer in the forms of, respectively, powder and powder, pellet and pellet, or powder and pellet is also a simple and effective method.

Fusion blending can be carried out by using fusion blending equipment for usual rubber and plastics, for example, hot rolls, Banbury mixer, Brabender and extruder. The fusion temperature is set above the fusion temperature of the formulated system and below the initiation temperature of its decomposition. The temperature for blending polyimide with polyphenylene sulfide is normally in the range of 300°–420° C. and preferably in the range of 320°–400° C. The blending of polyimide with aromatic polysulfone or aromatic polyetherimide is carried out normally in the range of 280°–420° C. and preferably in the range of 300°–400° C.

As to the method of molding the resin composition in this aspect of the invention, injection and extrusion molding are suitable because these methods form a uniform blend of fused polymers and have a high productivity. Other processing methods such as transfer molding, compression molding and sinter molding may also be applied.

In addition, the resin composition of the third aspect of the invention may contain at least one solid lubricant such as molybdenum disulfide, graphite, boron nitride, lead monoxide and lead powder. The composition may also contain at least one reinforcing material such as glass fibers, carbon fibers, aromatic polyamide fibers, potassium titanate fibers and glass beads.

The resin composition of this aspect of the invention may also contain at least one commonly used additive within the range which has no adverse effect on the object of this invention. Such additives include, for example, antioxidants, heat stabilizers, ultraviolet ray absorbers, flame retardants, auxiliary flame retardants, antistatic agents, lubricants and coloring agents.

In the fourth aspect of the invention, the polyimides may be prepared by the process disclosed in the above-mentioned Japanese Laid-open Patent No. 143478/1986, which comprises reacting an ether diamine represented by the formula:

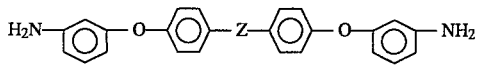

where Z is a direct bond or is

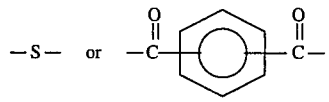

Examples of diamines for use in the invention are 4,4'-bis(3-aminophenoxy)biphenyl; bis[4-(3-aminophenoxy)phenyl] sulfide; 1,4-bis[4-(3-aminophenoxy)benzoyl]benzene; and 1,3-bis[4-(3-aminophenoxy)benzoyl]benzene.

Any diamine other than the above-mentioned ether diamines, can be used in mixture therewith within such a range that good physical properties of the polyimide is not impaired. Examples of such a diamine are as follows: m-phenylenediamine, o-phenylenediamine, p-phenylenediamine, m-aminobenzylamine, p-aminobenzylamine, bis(3-aminophenyl)ether, (3-aminophenyl)(4-aminophenyl)ether, bis(4-aminophenyl)ether, bis(3-aminophenyl)sulfide, (3-aminophenyl) (4-aminophenyl) sulfide, bis (4-aminophenyl) sulfide, bis(4-aminophenyl) sulfide, bis (3-aminophenyl) sulfoxide, (3-aminophenyl) (4-aminophenyl) sulfoxide, bis (4-aminophenyl)sulfoxide, bis(3-aminophenyl)sulfone, (3-aminophenyl)( 4-aminophenyl)sulfone, bis(4-aminophenyl)sulfone, 3,3'-diaminobenzophenone, 3,4'-diaminobenzophenone, 4,4'-diaminobenzophenone, bis[4-(3-aminophenoxy)phenyl]methane, bis[4-(4-aminophenoxy)phenyl] methane, 1,1-bis[4-(3-aminophenoxy)phenyl]ethane, 1,1-bis[4-(4-aminophenoxy)phenyl]ethane, 1,2-bis[4-(3-aminophenoxy)phenyl] ethane, 1,2-bis[4-(4-aminophenoxy)phenyl]ethane, 2,2-bis[4-(3-aminophenoxy)phenyl] propane, 2,2-bis[4-( 4-aminophenoxy)phenyl]propane, 2,2-bis[4-(3-aminophenoxy)phenyl] butane, 2,2-bis[4-(4-aminophenoxy)phenyl]butane, 2,2-bis[ 4-(3-aminophenoxy)phenyl]-1,1,1,3,3,3-hexafluoropropane, 2,2-bis[4-(4-aminophenoxy)phenyl]-1,1,13,3,3-hexafluoropropane, 1,3-bis(3-aminophenoxy)benzene, 1,3-bis(4-aminophenoxy)benzene, 1,4-bis(3-aminophenoxy)benzene, 1,4-bis(4-aminophenoxy)benzene, 4,4'-bis(4-aminophenoxy)biphenyl, bis(4-(3-aminophenoxy)phenyl] ketone, bis[4-(4-aminophenoxy)phenyl]ketone, bis[4-(4-aminophenoxy)phenyl] sulfide, bis[4-(4-aminophenoxy)phenyl]sulfoxide, bis[4-(4-aminophenoxy)phenyl]sulfone, bis[4-(4-aminophenoxy)phenyl] sulfone, bis[4-(3-aminophenoxy)phenyl]ether, bis[4-(4-aminophenoxy)phenyl] ether, etc.

Tetracarboxylic dianhydrides for use in preparation of polyimides of the fourth aspect of the invention are represented by the formula:

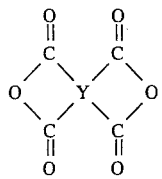

where Y is a tetravalent group selected from the group consisting of an aliphatic group having at least 2 carbon atoms, an alicyclic group, a monocyclic aromatic group, a fused polycyclic aromatic group, and a polycyclic aromatic group where the aromatic groups are connected directly or via a bridge member and typical examples of these are ethylenetetracarboxylic acid dianhydride, butanetetracarboxylic acid dianhydride, cyclopentanetetracarboxylic acid dianhydride, pyromellitic dianhydride, 3,3,-4,4'-benzophenonetetracarboxylic acid dianhydride, 2,2'3,3'-benzophenonetetracarboxylic acid dianhydride, 3,3'4,4'-biphenyltetracarboxylic dianhydride, 2,2'3,3'-biphenyltetracarboxylic acid dianhydride, 2,2-bis(3,4-dicarboxyphenyl)propane dianhydride, 2,2-bis(2,3-dicarboxyphenyl)propane dianhydride, bis(3,4-dicarboxyphenylether dianhydride, bis(3,4-dicarboxyphenyl)sulfone dianhydride, 1,1-bis(3,4-dicarboxyphenyl)ethane dianhydride, bis(2,3-dicarboxyphenyl)methane dianhydride, bis(3,4-dicarboxyphenyl)methane dianhydride, 4,4'-(p-phenylenedioxy)diphthalic acid dianhydride, 4,4'-(m-phenylenedioxy)diphthalic acid dianhydride, 2,3,6,7-naphthalenetetracarboxylic acid dianhydride, 1,4,5,8-naphthalenetetracarboxylic acid dianhydride, 1,2,5,6-naphthalenetetracarboxylic acid dianhydride, 1,2,3,4-benzenetetracarboxylic acid dianhydride, 3,4,9,10-perylenetetracarboxylic acid dianhydride, 2,3,6,7-anthracenetetracarboxylic acid dianhydride, and 1,2,7,8-phenanthrenetetracarboxylic acid dianhydride and 2,2-bis(3,4-dicarboxyphenyl) 1,1,1,3,3,3-hexafluoropropane dianhydride. These may be used alone or in combination of at least two.

Particularly preferred radicals in the Y defined above are tetravalent radicals represented in the formulas:

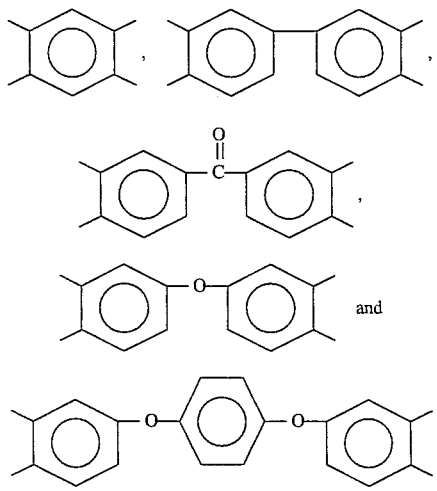

Aromatic polyamideimides suitable for use in the fourth aspect of the invention are polymers having as a repeating unit in the main chain a condensation product of imide and amide interconnected, which is represented by formula:

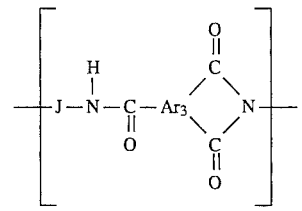

where $Ar_3$ is a trivalent aromatic radical having at least one benzene ring, and J is a divalent organic radical.

Particularly preferred aromatic polyamideimides are the condensation polymers having a repeating unit represented by the following formulas:

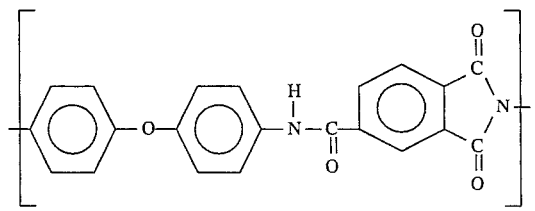

and

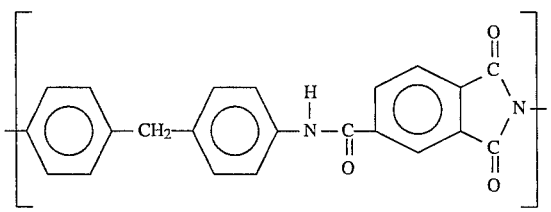

An example of aromatic polyamideimide is commercially available under the trade name, TORLON® (Amoco Chemicals Corp., USA).

The resin composition to be molded according to the fourth aspect of the invention is composed of the above-mentioned polyimide of 99.9 to 50% by weight, and the aromatic polyamideimide of 0.1 to 50% by weight, the sum amounting to 100% by weight.

The resin composition according to the fourth aspect of the invention consisting of the polyimide and the aromatic polyamideimide may be affected with even a small content of the latter with improvement in heat resistance and/or mechanical strength. The lower limit of the latter is 0.1% by weight, preferably 0.5% by weight.

Aromatic polyamideimides have very high melt viscosity compared with conventional thermoplastic resins, and therefore, too much aromatic polyamideimide in the resin composition produces unfavorable results, i.e., their moldability falls to an insufficient level, together with a drop in elongation at break. Thus the maximum content of aromatic polyamideimide is limited, and is preferably 50% by weight or less.

The resin composition according to the fourth aspect of the invention can usually be prepared by known methods, for example:

(1) A polyimide powder and an aromatic polyamideimide powder treated by mixing and/or kneading by means of a mortar, Henschel mixer, drum blender, tumbler blender, ball mill or ribbon blender to obtain the desired powder.

(2) A polyimide powder is dissolved or suspended in an organic solvent. To the solution or suspension, an aromatic polyamideimide is added, and made to be uniformly dispersed or dissolved. Then the solvent is removed to obtain the desired powder.

(3) An aromatic polyamideimide is dissolved or suspended in a solution of a polyamide acid in an organic solvent, which is the precursor of the polyimide according to this aspect of the invention, and then converted into an imide by heating to 100° to 400° C. or in the presence of a usual imidization agent. Then the solvent is removed to obtain the desired powder.

The thus-obtained powdery polyimide composition is subjected, preferably after melt-blending, to various processes, for example, injection, compression, transfer or extrusion molding. Especially, in the preparation of the resin composition, a simple and effective method is to melt-blend both components in the form of powders or pellets or one component of powders and the other component of pellets.

The melt-blending can be accomplished by usual means for blending rubbers or plastics, such as a hot roll, Banbury mixer, Brabender or extruder. The melting temperature may be set within the temperature range where the mixture can be caused to melt without thermal decomposition, usually 280° to 420° C., preferably 300° to 400° C.

For molding the resin composition of the fourth aspect of the invention, injection and extrusion moldings permitting formation of a uniform melt-blend with high productivity are preferred. Additionally, transfer, compression or sintering molding, or film extrusion may be applied.

The resin composition of the fourth aspect of the invention may contain as additives at least one solid lubricant selected from molybdenum disulfide, graphite, boron nitride, lead monoxide, lead powder, etc. and at least one reinforcing material selected from glass fibers, carbon fibers, aromatic polyamide fibers, silicon carbide fibers, potassium titanate fibers, glass beads, etc.

In addition, the resin composition may contain at least one additive selected from antioxidants, thermal stabilizers, ultraviolet ray absorbers, fire retardants, fire-retardant-activity enhancing agents, antistatic agents, lubricants, coloring agents, etc.

The invention will be further clarified by the following examples which are intended to be purely exemplary of the various aspects of the present invention wherein Examples 1–23 and Comparative Examples 1–9 relate to the first aspect of the invention, Examples 24–41 and Comparative Examples 10–14 relate to the second aspect of the invention, Examples 42–106 and Comparative Examples 15–39 relate to the third aspect of the invention, and Examples 107–131 and Comparative Examples 40–49 relate to the fourth aspect of the invention.

In the examples related to the first aspect of the invention, the properties in the examples and comparative examples were measured by the following methods.

Inherent Viscosity: After dissolving 0.50 g of polyimide powder in 100 ml of a solvent mixture of p-chlorophenol/phenol (9/1 weight ratio) by heating, the viscosity was measured at 35° C.

Tg, Tm and Tc: DSC (Shimadzu DT-40 series, DSC 41M) was used for the measurement.

Crystallinity: XRD (Rikadenki RAD-RVC Series, X-ray diffractometer) was used for the measurement.

Heat distortion temperature: ASTM, D-648I was used for the measurement.

Melt Viscosity: Shimadzu KOKA-model Flow Tester, CFT 500A was used under 100 kg load for the measurement.

Melt flow initiation temperature: Shimadzu KOKA-model Flow Tester, CFR 500A was used, and the melt flow initiation temperature was measured under 100 kg load.

5% Weight-Loss Temperature: Shimadzu DTA-TG was used in air for the measurement.

EXAMPLE 1

Into a reaction vessel equipped with a stirrer, reflux condenser, water separator and nitrogen inlet tube, 1.9872 kg (5.4 moles) of 4,4'-bis(3-aminophenoxy)biphenyl, 0.12 kg (0.6 mole) of 4,4'-diaminodiphenyl ether, 1.2426 kg (5.7 moles of pyromellitic dianhydride, 0.0888 kg (0.6 mole) of phthalic anhydride and 13.4 kg of cresylic acid were charged. The mixture obtained was heated to 145° C. with stirring in a nitrogen atmosphere while distilling off about 200 cc of water. The reaction was continued for 4 hours at 145° C.

After the reaction mixture was cooled to room temperature, about 7 kg of methyl ethyl ketone were charged and filtered to obtain polyimide as a yellow powder. The polyimide powder was washed with methyl ethyl ketone and dried at 180° C. for 24 hours under reduced pressure to obtain 3.16 kg of the product. The yield was 98%. The polyimide powder had an inherent viscosity of 0.50 dl/g and a glass transition temperture of 259° C. Tc and Tm were not observed. Melt viscosity was 14000 poise at 380° C. and 7000 poise at 400° C.

Comparative Example 1

Into the same reaction vessel as described in Example 1, 2.208 kg (6 moles) of 4,4'-bis(3-aminophenoxy)biphenyl, 1.2426 kg (5.7 moles) of pyromellitic dianhydride, 0.0888 kg (0.6 mole) of phthalic anhydride and 13.4 kg of cresylic acid were charged. The same procedures as described in Example 1 were carried out and 3.27 kg of polyimide were obtained as yellow powder. The yield was 98.5%. The polyimide powder obtained had an inherent viscosity of 0.50 dl/g, a Tg of 260° C., a Tc of 332° C. and a Tm of 384° C. The polyimide had a melt viscosity of 7500 poise at 400° C. and did not flow at all at 380° C.

EXAMPLE 2

Into the same reaction vessel as described in Example 1, 2.208 kg (6 moles) of 4,4'-bis(3-aminophenoxy)biphenyl, 1.1183 kg (5.13 moles) of pyromellitic dianhydride, 0.1676 kg (0.57 mole) of 3,3',4,4'-biphenyltetracarboxylic dianhydride, 0.0888 kg (0.6 mole) of phthalic anhydride and 13.4 kg of cresylic acid were charged. The same procedures as described in Example 1 were carried out and 3.3 kg of yellow polyimide powder were obtained. The yield was 98%. The polyimide powder had an inherent viscosity of 0.48 dl/g and a Tg of 255° C. Tc and Tm were not observed. The melt viscosity was 16000 poise at 380° C.

EXAMPLE 3

Into the same reaction vessel as described in Example 1, 3.312 kg (9 moles) of 4,4'-bis(3-aminophenoxy)biphenyl, 0.2 kg (1 mole) of 4,4'-diaminodiphenyl ether and 17.58 kg of N,N-dimethylacetamide were charged. To the solution obtained, 2.126 kg (9.75 moles) of pyromellitic dianhydride were added by portions in a nitrogen atmosphere at room temperature with caution to inhibit temperature rise of the solution. The resulting mixture was stirred for about 20 hours at room temperature. A part of the polyamide acid solution thus obtained was cast on a glass plate and heated for each for 1 hour at 100° C., 200° C. and 300° C. to obtain a transparent light yellow polyimide film having a thickness of 25 μm. The polyimide film had a tensile strength of 16.5 kg/mm², elongation of 80% in accordance with ASTM D-882, and 5% weight loss temperature of 550° C. by DTA-TG.

EXAMPLES 4 TO 8 AND COMPARATIVE EXAMPLES 2 AND 3

The same reaction vessel as described in Example 1 and the procedures of Example 1 were repeated except that the diamines employed the amounts thereof were changed as illustrated in Table 1. The results are summarized in Table 1.

Tg, 5% weight loss temperature, melt viscosity, melt flow initiation temperature and heat distortion temperature of molded specimen are summarized in Table 2 for Examples 1, 2, 4 to 8 and Comparative Examples 1 and 2.

a nitrogen atmosphere while distilling out about 350 cc of water. The reaction was continued for 4 hours at 145° C. After the reaction mixture was cooled to room temperature, 10.8 kg of methyl ethyl ketone were charged and filtered. The yellow polyimide powder obtained was washed with methyl ethyl ketone and dried at 180° C. for 24 hours. The amount obtained was 5.26 kg (98% yield). The polyimide powder had an inherent viscosity of 0.50 dl/g and a glass transition temperature (Tg) of 260° C. The polyimide powder was extruded to 400° C. with a Takayasu model extruder having a diameter of 25 mm to obtain red brown transparent pellets. The pellets were further extruded to obtain a red brown transparent flexible film having a width of 50 mm and a thickness of 100 μm.

The rate of crystallization was measured on the polyimide film thus obtained by changing the standing time in a Geer oven at 300° C. The results are illustrated in FIG. 1. No crystallization was found at all until a standing time of 100 minutes in the Geer oven and 25% crystallinity was observed after 400 minutes.

TABLE 1

| Example or Comparative Example | Tetracarboxylic acid dianhydride kg(mole) | 4,4'-bis(3-aminoph-enoxy)biphenyl kg(mole) | Auxiliary diamine kg(mole) | Yield (%) | Inherent viscosity (η) (dl/g) | Tg (°C.) | Tc (°C.) | Tm (°C.) | Melt viscosity (poise/ 380° C.) |
|---|---|---|---|---|---|---|---|---|---|
| Ex. 4 | Pyromellitic dianhydride 1.2496 (5.7) | 1.9872 (5.4) | 3,4'-diaminodiphenyl ether 0.12 (0.6) | 98 | 0.481 | 260 | No | No | 10800 |
| Ex. 5 | ↑ | ↑ | 3,3'-diaminodiphenyl ether 0.12 (0.6) | 98 | 0.478 | 258 | ↑ | ↑ | 11600 |
| Comp. Ex. 3 | ↑ | 0.8832 (2.4) | 4,4'-diaminodiphenyl ether 0.72 (3.6) | gelation | | Impossible to measure | | | |
| Ex. 6 | ↑ | 1.9872 (5.4) | bis[4-{4-(4-aminophenoxy) phenoxyl} phenyl]sulfone 0.3696 (0.6) | 97.5 | 0.508 | 258 | No | No | 10800 |
| Ex. 7 | ↑ | 1.104 (3.0) | 4,4'-bis[4-(4-amino-α, α-dimethylbenzyl)phenoxy] diphenyl sulfone 1.336 (3.0) | 97 | 0.538 | 272 | ↑ | ↑ | 40000 |
| Ex. 8 | ↑ | 1.9872 (5.4) | 4,4'-bis[4-(4-amino-α, α-dimethylbenzyl)phenoxy] diphenyl sulfone 0.4008 (0.6) | 97 | 0.510 | 259 | ↑ | ↑ | 12300 |
| Comp. Ex. 2 | Pyromellitic dianhydride 1.2426 (5.7) | 2.1896 (5.95) | 4,4'-diaminodiphenyl ether 0.010 (0.05) | 98 | 0.481 | 260 | 332 | 384 | No flow |

TABLE 2

| Example or Comparative Example | Tg (°C.) | 5% weight loss temperature (°C.) | Heat distortion temperature (°C.) | Melt viscosity (poise/ 380° C.) | Melt initiation temperature (°C.) |
|---|---|---|---|---|---|
| Ex. 1 | 259 | 555 | 244 | 14000 | 327 |
| Ex. 2 | 255 | 553 | 240 | 16000 | 322 |
| Ex. 4 | 260 | 556 | 245 | 10800 | 326 |
| Ex. 5 | 258 | 550 | 243 | 11600 | 325 |
| Ex. 6 | 258 | 546 | 243 | 10800 | 324 |
| Ex. 7 | 272 | 539 | 255 | 40000 | 335 |
| Ex. 8 | 259 | 540 | 244 | 12300 | 324 |
| Comp. Ex. 1 | 260 | 545 | 245 | No flow | 374 |
| Comp. Ex. 2 | 260 | 546 | 246 | ↑ | 372 |

EXAMPLE 9

Into the same reaction vessel as described in Example 1, 3,312 kg (9.0 moles) of 4,4'-bis(3-aminophenoxy)biphenyl, 0.2 kg (1.0 mole) of 4,4'-diaminodiphenyl ether, 2,071 kg (9.5 moles) of pyromellitic dianhydride, 0.148 kg (1.0 mole) of phthalic anhydride and 21.58 kg of cresylic acid were charged. The mixture was heated to 145° C. with stirring in

Comparative Example 4

Figure 2:
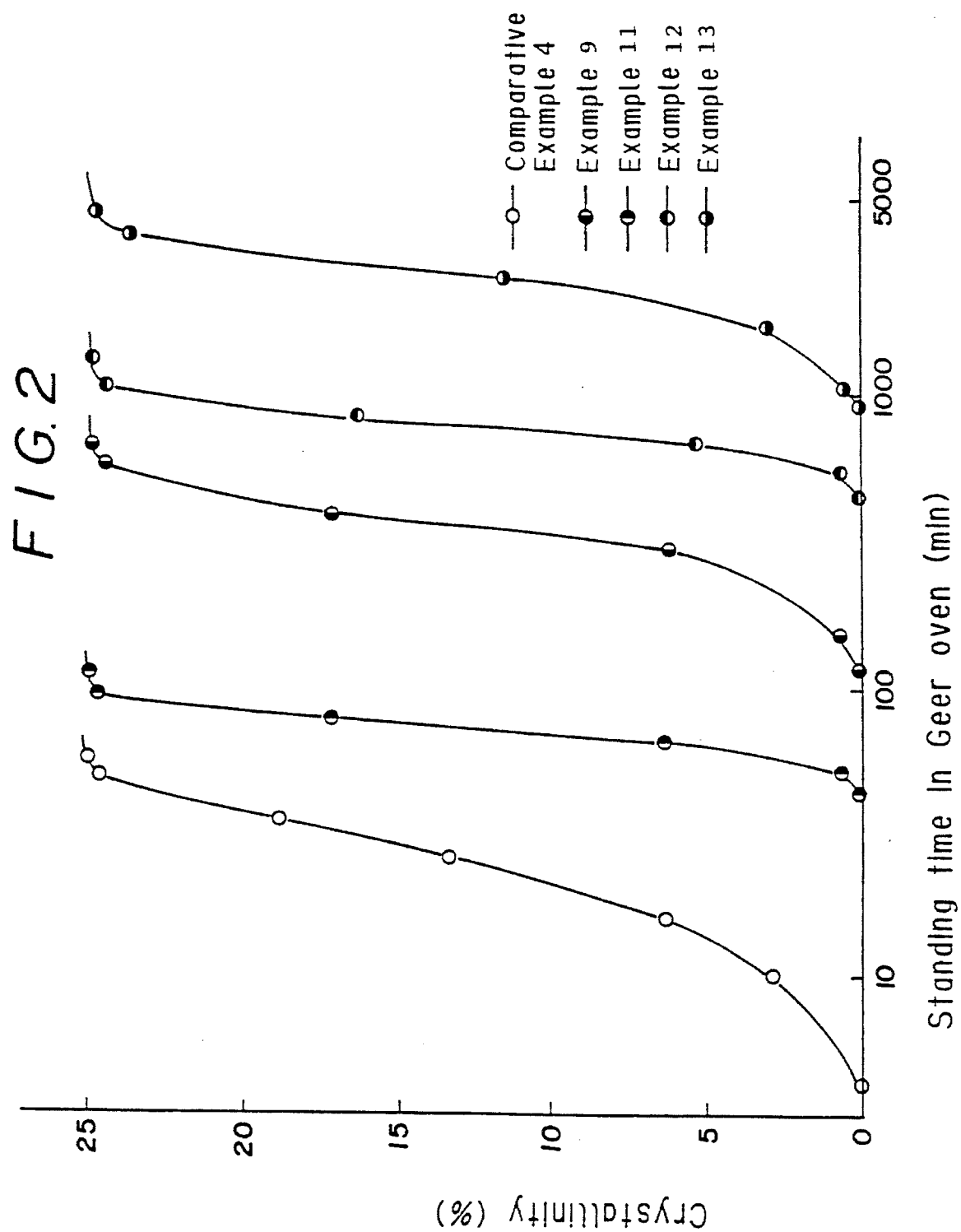
FIG. 2 illustrates the relationship of crystallinity with time in a Geer oven at 300° C. in Examples 9, 11–13 and Comparative Example 4.

Into the same reaction vessel as described in Example 1, 3.680 kg (10 moles) of 4,4'-bis(3-aminophenoxy)biphenyl, 2.071 kg (9.5 moles) of pyromellitic dianhydride, 0.148 kg (1.0 mole) of phthalic anhydride and 21.53 kg of cresylic acid were charged. The same procedures as described in Example 1 were carried out to obtain 5.46 kg of yellow polyimide powder. The yield was 98.5%. The polyimide powder had an inherent viscosity of 0.50 dl/g. An extruded film was prepared from the polyimide powder by the same procedures as described in Example 10 and the rate of crystallization was measured. Results are illustrated in FIG. 2.

Crystallization was initiated after standing for about 5 minutes in the Geer oven at 300° C. and 25% crystallinity was observed after 30 minutes.

EXAMPLE 10

Into the same reaction vessel as described in Example 1, 3.680 kg (10 moles) of 4,4'-bis(3-aminophenoxy)biphenyl, 1.864 kg (8.55 moles) of pyromellitic dianhydride, 0.279 kg (0.95 mole) of 3,3',4,4'-biphenyltetracarboxylic dianhydride, 0.148 kg (1.0 mole) of phthalic anhydride and 21.5 kg of cresylic acid were charged. The same procedures as described in Example 1 were carried out to obtain 5.51 kg of yellow polyimide powder. The yield was 98.2%. The polyimide powder had an inherent viscosity of 0.48 dl/g. An extruded film was prepared from the polyimide powder by the same procedures as described in Example 9 and the rate of crystallization was measured.

The results are illustrated in FIG. 1. Crystallization was not observed at all until 180 minutes after standing in the Geer oven at 300° C. and 25% crystallinity was observed after 500 minutes.

EXAMPLES 11 TO 13 AND COMPARATIVE EXAMPLE 5

The same reaction vessel as described in Example 1 was used and the procedures of Example 1 were repeated except that the amount of 4,4'-diaminodiphenyl ether was varied. The results are summarized in Table 3 and FIG. 2.

As understood from Table 3 and FIG. 2, addition of 4,4'-diaminodiphenyl ether in an amount of 25% by mole or less of 4,4'-bis(3-aminophenoxy)biphenyl can control the rate of crystallization. The control range is from 5 to 90 minutes in the initiation time of crystallization and from 300 to 3000 minutes in the time required for providing 25% crystallinity. Thus polyimides having a different rate of crystallization can be arbitrarily prepared.

temperature in a nitrogen atmosphere and stirred for an additional hour. Successively 0.14 kg of τ-picoline and 0.408 kg (4 moles) of acetic anhydride were added dropwise to the solution. Yellow polyimide powder started to precipitate after an hour of completing addition of the dropwise addition. After stirring further for 10 hours at room temperature, the reaction mixture was filtered, washed by dispersing in methyl ethyl ketone, filtered again and dried at 180° C. for 24 hours. Polyimide powder thus obtained was 5.26 kg. The yield was 98%. The polyimide powder had a Tg of 258° C., an inherent viscosity of 0.50 dl/g and a melt viscosity of 7000 poise at 400° C.

EXAMPLE 15

Into the same reaction vessel as described in Example 1. 1.9872 kg (5.4 moles) of 4,4'-bis(3-aminophenoxy)biphenyl, 0.12 kg (0.6 mole) of 4,4'-diaminodiphenyl ether, 1.2426 kg (5.7 moles) of pyromellitic dianhydride, 0.0888 kg (0.6 mole) of phthalic anhydride and 13.4 kg of cresylic acid were charged. The mixture were heated to 145° C. with stirring in a nitrogen atmosphere while about 200 cc of water were distilled out. The reaction was further continued for 4 hours at 145° C. After cooling the reaction mixture to room temperature, about 7 kg of methyl ethyl ketone were added to the mixture and filtered. The resulting yellow powder was washed with methyl ethyl ketone and dried at 180° C. for 24 hours under reduced pressure to obtain 3.16 kg of polyimide powder. The yield was 98%. The polyimide had an inherent viscosity of 0.50 dl/g, a Tg of 259° C., and a melt viscosity of 14000 poise at 380° C. and 7000 poise at 400° C. Tc and Tm was not observed.

Molding stability of polyimide thus obtained was mea-

TABLE 3

| Example or Comparative Example | Diamine ingredient | | | Tetracarboxylic | | | | Crystallization rate of extruded film | |
|---|---|---|---|---|---|---|---|---|---|
| | Diamine A*1 kg(mole) | Diamine B*2 kg(mole) | (Diamine B/ Diamine A) × 100 mole(%) | acid dianhydride kg(mole) | yield (5) | Inherent viscosity (dl/g) | Tg (°C.) | Initiation time (min /300° C.) | Time to 25% crystallinity (min/300° C.) |
| Ex. 9 | 3.312 (9.5) | 0.200 (1.0) | 11.1 | PMDA*3 2.71 (9.5) | 98.0 | 0.50 | 258 | 100 | 400 |
| Ex. 11 | 3.496 (9.0) | 0.100 (1.0) | 5.3 | ↑ | 98.5 | 0.51 | 258 | 50 | 100 |
| Ex. 12 | 3.202 (8.7) | 0.260 (1.3) | 14.9 | ↑ | 98.0 | 0.51 | 261 | 450 | 1000 |
| Ex. 13 | 2.944 (8.0) | 0.400 (2.0) | 25.0 | ↑ | 98.5 | 0.52 | 260 | 900 | 3000 |
| Comp. Ex. 4 | 3.680 (10.0) | 0 | 0 | ↑ | 98.5 | 0.50 | 260 | 5 | 30 |
| Comp. Ex. 5 | 2.576 (7.0) | 0.600 (3.0) | 43.0 | ↑ | 98.5 | 0.53 | 260 | Do not crysyallize after 5000 min. | |

Note: *1 4,4'-Bis(3-aminophenoxy)biphenyl
*2 4,4'-Diaminodiphenyl ether
*3 Pyromellitic dianhydride

EXAMPLE 14

Figure 3:
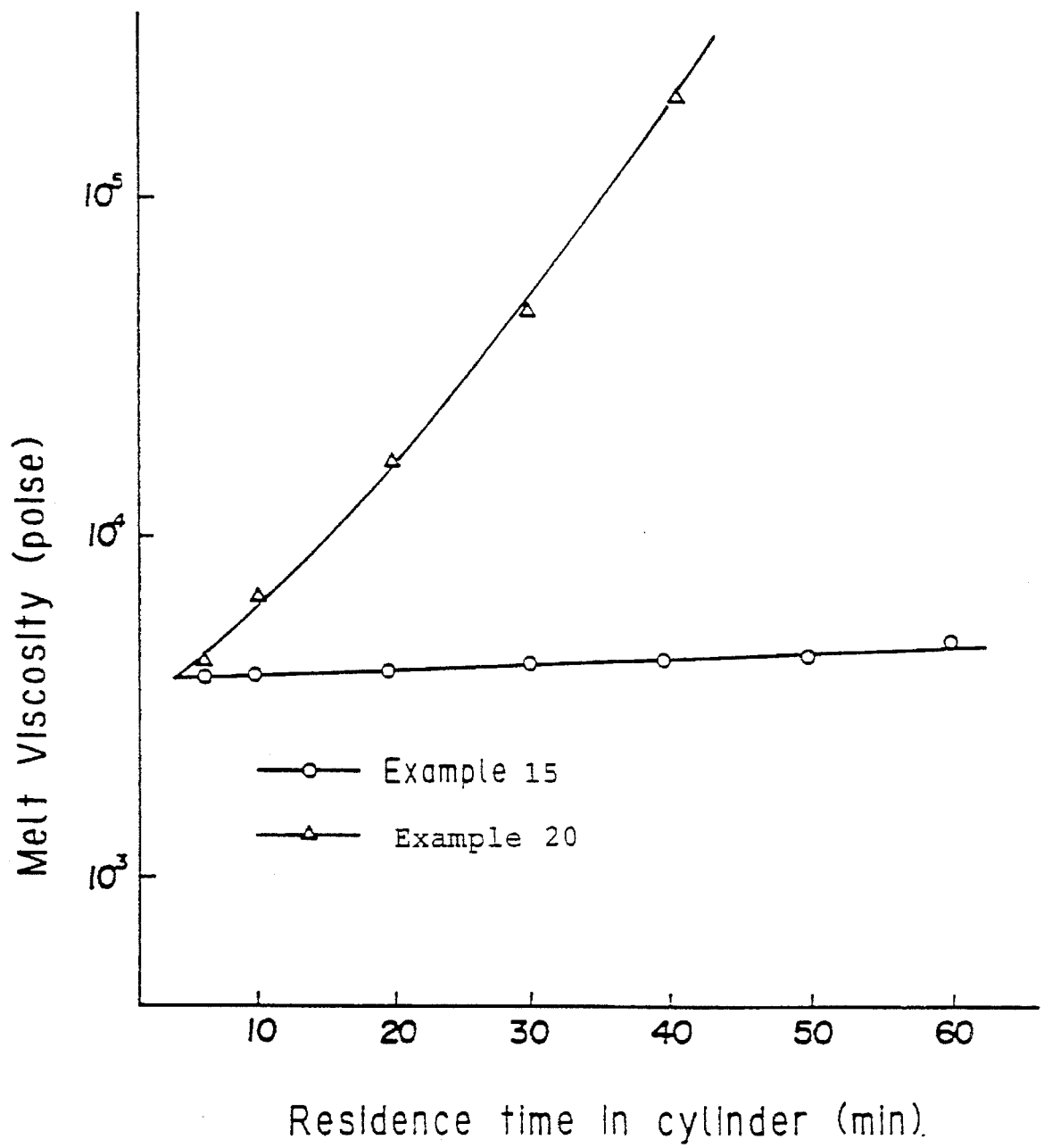
FIG. 3 illustrates the molding stability of the polyimide obtained in Example 15 and Example 20.

The same reaction vessel as described in Example 1 was charged with 3.312 kg (9 moles) of 4,4'-bis(3-aminophenoxy)biphenyl, 0.2 kg (1.0 mole) of 4,4'-diaminodiphenyl ether and 31.5 kg of N-methyl-2-pyrrolidone. To the mixture obtained, 2.071 kg (9.5 moles) of pyromellitic dianhydride were added by portions at room temperature in a nitrogen atmosphere with caution to inhibit the temperature rise of the solution. Stirring was continued for 20 hours at room temperature. To the resulting polyamic acid solution, 0.444 kg (3 moles) of phthalic anhydride were added at room sured by varying residence time in the cylinder of the flow tester at 420° C. under pressure of 100 kg/cm². Results are illustrated in FIG. 3. Longer residence time in the cylinder has almost no effect on melt viscosity, which fact indicates good thermal stability.

Comparative Example 6

Into the same reaction vessel as described in Example 1, 2.208 kg (6 moles) of 4,4'-bis(3-aminophenoxy)biphenyl, 1.2426 kg (5.7 moles) of pyromellitic dianhydride, 0.0888 kg (0.6 mole) of phthalic anhydride and 13.4 kg of cresylic acid were charged. The same procedures as described in Example 1 were carried out to obtain 3.27 kg of yellow polyimide powder. The yield was 98.5%. The polyimide powder had an inherent viscosity of 0.50 dl/g, a Tg of 260° C., a Tc of 332° C. and a melt viscosity of 7500 poise at 400° C. The polyimide powder exhibited no melt flow at 380° C.

EXAMPLES 16 TO 19 AND COMPARATIVE EXAMPLES 7 AND 8

The same reaction vessel as described in Example 1 was used, and the procedures of Example 14 were repeated except that the amount of 4,4'-diaminodiphenyl ether was varied as illustrated in Table 4. The results are summarized in Table 4.

dried at 180° C. for 24 hours under reduced pressure. The polyimide powder obtained was 3.184 kg. The yield was 97.5%. The polyimide powder had an inherent viscosity of 0.49 dl/g, a Tg of 255° C. and a melt viscosity of 10000 poise at 380° C. Tc and Tm were not observed.

Comparative Example 9

The same reaction vessel described in Example 1 was used to react the following reactants:

| primary amine | 4.5 mole (75%) |
| 4,4'diaminodiphenyl ether | 1.5 mole (25%) (33.3 mole %/primary amine) |

TABLE 4

| Example or Comparative Example | Diamine ingredient | | | Phthalic anhydride ingredient | | Yield (%) | Inherent viscosity (dl/g) | Tg (°C.) | 5% Weight loss temperature (°C.) | Melt viscosity (poise/ 380° C.) |
|---|---|---|---|---|---|---|---|---|---|---|
| | Diamine A*1 kg(mole) | Diamine B*2 kg(mole) | (Diamine B/ Diamine A) × 100 (mole %) | Amount kg(mole) | Phthalic anhydide /Diamine(A + B) (mole ratio) | | | | | |
| Ex. 14 | 3.3120 (9.0) | 0.200 (1.0) | 11.1 | 0.444 (0.6) | 0.3 | 98.0 | 0.50 | 258 | 548 | 14000 |
| Ex. 15 | 1.9872 (5.4) | 0.120 (0.6) | 11.1 | 0.0888 (0.6) | 0.1 | 98.0 | 0.50 | 259 | 555 | 14000 |
| Ex. 16 | 2.0976 (5.7) | 0.060 (0.3) | 5.3 | ↑ | ↑ | 98.0 | 0.51 | 258 | 550 | 19000 |
| Ex. 17 | 2.0424 (5.55) | 0.900 (0.45) | 8.1 | ↑ | ↑ | 97.5 | 0.50 | 260 | 552 | 15800 |
| Ex. 18 | 1.9320 (5.25) | 0.150 (0.75) | 14.3 | ↑ | ↑ | 98.0 | 0.51 | 262 | 551 | 19300 |
| Ex. 19 | 1.8768 (5.10) | 0.180 (0.9) | 17.6 | ↑ | ↑ | 98.5 | 0.52 | 262 | 549 | 22300 |
| Comp. Ex. 8 | 1.5456 (4.2) | 0.360 (1.8) | 42.9 | ↑ | ↑ | 98.5 | 0.53 | 260 | 549 | 204000 |
| Comp. Ex. 6 | 2.2080 (6) | 0 | 0 | ↑ | ↑ | 98.5 | 0.50 | 260 | 545 | No flow |
| Comp. Ex. 7 | 2.1896 (5.95) | 0.010 (0.05) | 0.84 | ↑ | ↑ | 98.0 | 0.48 | 260 | 550 | No flow |

*1 4,4'-bis(3-aminophenoxy)-biphenyl
*2 4,4'-diaminodiphenylether

EXAMPLE 20

The same procedures as described in Example 15 were carried out without using phthalic anhydride to obtain yellow polyimide powder. The polyimide powder had a Tg of 260° C. and an inherent viscosity of 0.50 dl/g.

Melt viscosity of the polyimide powder was measured by varying the residence time in the cylinder of the flow tester as carried out in Example 15. Results are illustrated in FIG. 3. Longer residence time led to higher viscosity. Thus thermal stability of the polyimide was inferior to that of Example 15.

EXAMPLE 21

The same reaction vessel as described in Example 1 was charged with 1.9872 kg (5.4 moles) of 4,4'-bis(3-aminophenoxy)biphenyl, 0.120 kg (.06 mole) of bis(4-aminophenoxy) ether, 1.1183 kg (5.13 moles) of pyromellitic dianhydride, 0.1676 kg (057 mole) of 3,3'4,4'-biphenyltetracarboxylic dianhydride and 13.4 kg of cresylic acid. The mixture was heated to 145° C. with stirring in a nitrogen atmosphere while about 200 cc of water were distilled out. The reaction was further continued for 4 hours at 145° C. After cooling the reaction mixture to room temperature, about 7 kg of methyl ethyl ketone were charged and filtered. The resulting yellow-powder was washed with methyl ethyl ketone and -continued

| Pyromellitic dianhydride | 5.7 mole |

The resulting polyimide had the following properties:

| Inherent viscosity | 0.491 dl/g |
| Tg(°C.) | 261 |
| Tc(°C.) | No |
| TM(°C.) | No |
| Crystallinity | x |
| HDT(°C.) | 245 |
| 5% Loss Temp. (°C.) | 555 |
| Melt initiation Temp. | 327 |
| Melt viscosity | 42000 (380°C.) |

EXAMPLE 22

Into the same reaction vessel as described in Example 1, 1.9872 kg (5.4 mole) of 4,4'-bis (3-aminophenoxy)biphenyl, 0.175 kg (0.6 moles) of 1,4-bis(4-aminophenoxy)benzene, 1.2426 kg (5.7 moles) of pyromellitic dianhydride, 0.0888 kg (0.6 moles) of phthalic anhydride and 13.4 kg of cresylic acid were charged. The same procedures as described in Example 1 were carried out and 3.2 kg of yellow polyimide powder were obtained. The yield was 98%. The polyimide powder had an inherent viscosity of 0.51 dl/g and a glass transition temperature of 258° C. Tc and Tm were not observed. Melt viscosity was 13,000 poise at 380° C.

EXAMPLE 23

Into the same reaction vessel as described in Example 1, 1.9872 kg (5.4 mole) of 4,4'-bis (3-aminophenoxy)biphenyl, 0.300 kg (0.06 moles) of 1,4-bis[4-(3-aminophenoxy)benzoyl] benzene, 1.2426 kg (5.7 moles) of pyromellitic dianhydride, 0.0888 kg (0.6 moles) of phthalic anhydride and 13.4 kg of cresylic acid were charged.

The same procedures as described in Example 1 were carried out and 3.35 kg of yellow polyimide powder were obtained. The yield was 98.5%. The polyimide powder had an inherent viscosity of 0.50 dl/g and a glass transition temperature of 257° C. Tc and Tm were not observed. Melt viscosity was 12,100 poise at 380° C.

Synthesis Example 1 of Polyimide of the Second Aspect of the Invention

A reaction vessel equipped with a stirrer, reflux condenser and nitrogen inlet tube was charged with 4.0 kg (10 moles) of 4,4'-bis(3-aminophenoxy)diphenyl sulfide and 34.8 kg of N,N-dimethylacetamide. To the mixture was added 2.14 kg (9.8 moles) of pyromellitic dianhydride in a nitrogen atmosphere in a manner so as to maintain the mixture at about room temperature and the mixture is stirred for about 20 hours at the room temperature.

To the polyamic acid solution obtained, 2.02 kg (20 moles) of triethylamine and 2.55 kg (25 moles) of acetic anhydride were added dropwise in a nitrogen atmosphere at the room temperature. The reaction mixture was stirred for about 20 hours to obtain a light yellow slurry. The slurry was filtered, washed with methanol, filtered again and dried at 180° C. for 8 hours under reduced pressure to obtain 5.64 kg (about 97.5% yield) of polyimide powder. The inherent viscosity of the polyimide powder was 0.85 dl/g.

The inherent viscosity was measured at 35° C. after dissolving 0.5 g of the polyimide powder in 100 ml of a solvent (a mixture of p-chlorophenol and phenol in a ratio of 90:10) at elevated temperatures.

EXAMPLES 24–27 AND COMPARATIVE EXAMPLES 10–11

The polyimide powder obtained in Synthesis Example 1 was dry blended with aromatic polyetherimide powder (Trade Mark; ULTEM 1000, a product of General Electric Co. in U.S.A.) in the ratio of Table 5 and pelletized by extruding at 370°–400° C. with a twin screw extruder. The pellets thus obtained was fed to an injection molding machine having a cylinder temperature of 360°–390° C., injection pressure of 1000 kg/cm$^2$ and mold temperature of 100°–150° C. The injection molded specimens were measured with respect to their mechanical and abrasion properties. The pellets obtained were fed to a Brabender type viscometer (Trade Mark; Laboplastomill, a product of Toyo Seiki Seisakusho Ltd.). Melt torque was measured under the conditions of 385° C. in temperature and 50 rpm in rotor revolution. Results obtained are illustrated in Table 5. Thermal properties were measured with a rectangular parallelopiped specimen having dimensions of 6×3×3 mm. The glass transition temperature Tg was measured with a thermo-mechanical analysis instrument (Trade Mark; TM-30, a product of Shimadzu Seisakusho Ltd.). Heat distortion temperature was examined with a load of 18.6 kg/cm$^2$ in accordance with ASTM D-648. As to the mechanical property, impact strength with a 1/8 inch notch was tested in accordance with ASTM D-256. As to the abrasion property, coefficient of abrasion was measured with a thrust abrader under such conditions that sliding velocity is 128 m/min and surface pressure is 0.78 kg/cm$^2$. The same testing methods as in Examples 24–27 were used in Examples (28–41 and Comparative Examples 10–11.

TABLE 5

| | Example | | | | Comparative example | |
|---|---|---|---|---|---|---|
| | 24 | 25 | 26 | 27 | 10 | 11 |
| Polymer (wt. %) | | | | | | |
| Aromatic polyetherimide (ULTEM 1000) | 10 | 50 | 70 | 90 | 100 | 98 |
| Polyimide (Polymer obtained in Synthesis Example 1) | 90 | 50 | 30 | 10 | 0 | 2 |
| Property | | | | | | |
| Glass transition temperature (°C.) | 235 | 232 | 227 | 220 | 215 | 217 |
| Heat distortion temperature (°C.) | 219 | 215 | 210 | 202 | 193 | 195 |
| Izod impact strength (notched) (kg · cm/cm) | 20.7 | 18.5 | 16.0 | 14.0 | 4.7 | 4.7 |
| Abrasion Coefficient (× 10$^{-8}$ cm$^3$/kg · m) | | | | | | |
| 23° C. | 72 | 80 | 88 | 98 | 201 | 200 |
| 250° C. | 322 | 511 | 595 | 630 | 1785 | 1800 |
| Friction coefficient | | | | | | |
| 23° C. | 0.25 | 0.25 | 0.25 | 0.25 | 0.25 | 0.25 |
| 250° C. | 0.24 | 0.26 | 0.27 | 0.30 | 0.40< | 0.40< |
| Melt torque (kg · cm) | 130 | 115 | 88 | 80 | 78 | 77 |
| | −132 | −118 | −93 | −83 | −80 | −80 |

Synthesis Examples 2–5

The same procedures as Synthesis Example 1 were carried out except that various diamines were used in place of 4,4'-bis(3-aminophenoxy)diphenyl sulfide, various tetracarboxylic acid dianhydrides were used in place of pyromellitic dianhydride, and the amounts of diamines, N,N-dimethylacetamide and tetracarboxylic acid dianhydrides were changed.

As a result, various kinds of polyimide powder were obtained. Table 6 illustrates synthetic conditions of polyimide and inherent viscosities of polyimide obtained under respective conditions of synthesis.

TABLE 6

| Synthesis example | Diamine | N,N-Dimethyl acetamide | Tetracarboxylic acid dianhydride | Polyimide inherent viscosity (dl/g) |
|---|---|---|---|---|
| 2 | 4,4'-Bis(3-aminophenoxy) biphenyl 3.68 kg (10 moles) | 38.8 kg | 3,3',4,4'-benzophenone-tetracarboxylic acid dianhydride 3.16 kg (9.85 moles) | 0.62 |
| 3 | 4,4'-Bis(3-aminophenoxy) biphenyl 3.68 kg (10 moles) | 33.0 kg | Pyromellitic dianhydride 2.125 kg (9.75 moles) | 0.70 |
| 4 | 4,4'-Bis(3-aminophenoxy) diphenyl sulfide 3.8 kg (9 moles) 4,4'-Diaminodiphenyl ether 0.202 kg (1 mole) | 33.7 kg | Pyromellitic dianhydride 2.11 kg (9.7 moles) | 0.78 |
| 5 | 4,4'-Bis(3-aminophenoxy) biphenyl 3.5 kg (9.5 moles) 4,4'-Diaminodiphenyl ether 0.101 kg (0.5 mole) | 32.3 kg | Pyromellitic dianhydride 2.10 kg (9.65 moles) | 0.72 |

EXAMPLES 28–38 AND COMPARATIVE EXAMPLES 12–14

The polyimide powder obtained in Synthesis examples 2–5 was kneaded with aromatic polyetherimide powder (Trade Mark; ULTEM 1000, a product of General Electric Co. in U.S.A.) by fusing in various mixing ratios to obtain uniformly blended pellets. The pellets obtained were molded in the same conditions as described in Example 23. Thermal, mechanical and abrasive properties were measured on the molded specimens and are illustrated in Tables 8–11 Besides the correspondence of polyimide used to examples and comparative examples is shown in Table 7.

TABLE 7

| Polyimide | Example No. | Comparative example No. | Table No. |
|---|---|---|---|
| Synthesis example 2 | 28–30 | 12 | 8 |
| Synthesis example 3 | 31–34 | 13 | 9 |
| Synthesis example 4 | 35–36 | — | 10 |
| Synthesis example 5 | 37–38 | 14 | 11 |
| Synthesis example 3 | 39–41 | — | 12 |

TABLE 8

| | Example | | | Comparative example |
|---|---|---|---|---|
| | 28 | 29 | 30 | 12 |
| Polymer (wt. %) | | | | |
| Aromatic polyetherimide (ULTEM 1000) | 50 | 70 | 90 | 97 |
| Polyamide (Polymer obtained in Synthesis Example 2) | 50 | 30 | 10 | 3 |
| Property | | | | |
| Glass transition temperature (°C.) | 231 | 227 | 221 | 218 |
| Heat distortion temperature (°C.) | 214 | 210 | 204 | 199 |
| Izod impact strength (notched) (kg · cm/cm) | 15.0 | 13.5 | 11.2 | 5.0 |
| Abrasion Coefficient ($\times 10^{-8}$ cm$^3$/kg · m) | | | | |
| 23° C. | 78 | 87 | 96 | 198 |
| 250° C. | 499 | 587 | 600 | 1790 |
| Friction coefficient | | | | |
| 23° C. | 0.24 | 0.24 | 0.25 | 0.25 |
| 250° C. | 0.24 | 0.26 | 0.31 | 0.40< |
| Melt torque (kg · cm) | 114 –118 | 87 –92 | 79 –83 | 75 –78 |

TABLE 9

| | Example | | | | Comparative example |
|---|---|---|---|---|---|
| | 31 | 32 | 33 | 34 | 13 |
| Polymer (wt. %) | | | | | |
| Aromatic polyetherimide (ULTEM 1000) | 10 | 50 | 70 | 90 | 98 |
| Polyimide (Polymer obtained in Synthesis Example 3) | 90 | 50 | 30 | 10 | 2 |
| Property | | | | | |
| Glass transition temperature (°C.) | 255 | 253 | 249 | 236 | 219 |
| Heat distortion temperature (°C.) | 238 | 235 | 231 | 216 | 199 |
| Izod impact strength (notched) (kg · cm/cm) | 18.2 | 16.1 | 14.0 | 10.0 | 4.7 |
| Abrasion Coefficient ($\times 10^{-8}$ cm$^3$/kg · m) | | | | | |

TABLE 9-continued

|  | Example | | | | Comparative example |
|---|---|---|---|---|---|
|  | 31 | 32 | 33 | 34 | 13 |
| 23° C. | 50 | 71 | 81 | 92 | 200 |
| 250° C. | 302 | 490 | 570 | 820 | 1787 |
| Friction coefficient | | | | | |
| 23° C. | 0.21 | 0.22 | 0.24 | 0.25 | 0.25 |
| 250° C. | 0.21 | 0.24 | 0.25 | 0.29 | 0.40< |
| Melt torque (kg· cm) | 132 / −135 | 115 / −117 | 89 / −91 | 81 / −83 | 76 / −78 |

TABLE 10

|  | Example | |
|---|---|---|
|  | 35 | 36 |
| Polymer (wt. %) | | |
| Aromatic polyetherimide (ULTEM 1000) | 10 | 90 |
| Polyimide (Polymer obtained in Synthesis Example 4) | 90 | 10 |
| Property | | |
| Glass transition temperature (°C.) | 285 | 247 |
| Heat distortion temperature (°C.) | 265 | 222 |
| Izod impact strength (notched) (kg · cm/cm) | 20 | 15 |
| Abrasion Coefficient (×10$^{-8}$ cm$^3$/kg · m) | | |
| 23° C. | 68 | 96 |
| 250° C. | 329 | 615 |
| Friction coefficient | | |
| 23° C. | 0.24 | 0.24 |
| 250° C. | 0.22 | 0.31 |
| Melt torque (kg · cm) | 131 / −133 | 80 / −84 |

TABLE 11

|  | Example | | Comparative example |
|---|---|---|---|
|  | 37 | 38 | 14 |
| Polymer (wt. %) | | | |
| Aromatic polyetherimide (ULTEM 1000) | 25 | 90 | 98 |
| Polyimide (Polymer obtained in Synthesis Example 5) | 75 | 10 | 2 |
| Property | | | |
| Glass transition temperature (°C.) | 290 | 255 | 220 |
| Heat distortion temperature (°C.) | 274 | 235 | 200 |
| Izod impact strength (notched) (kg · cm/cm) | 17 | 12 | 4.6 |
| Abrasion Coefficient (×10$^{-8}$ cm$^3$/kg · m) | | | |
| 23° C. | 48 | 78 | 196 |
| 250° C. | 390 | 592 | 1305 |
| Friction coefficient | | | |
| 23° C. | 0.21 | 0.23 | 0.24 |
| 250° C. | 0.22 | 0.27 | 0.40< |

TABLE 11-continued

|  | Example | | Comparative example |
|---|---|---|---|
|  | 37 | 38 | 14 |
| Melt torque (kg · cm) | 121 / −127 | 82 / −85 | 77 / −80 |

EXAMPLES 39–41

The polyimide powder obtained in Synthesis example 3 was kneaded with aromatic polyetherimide powder (Trade Mark; ULTEM 6000, a product of General Electric Co. in U.S.A.) by fusing in various mixing ratios to obtain uniformly blended pellets. The pellets obtained were molded in the same conditions as described in Example 24. Thermal and mechanical properties were measured on the molded specimens and are illustrated in Table 12.

TABLE 12

|  | Example | | |
|---|---|---|---|
|  | 39 | 40 | 41 |
| Polymer (wt. %) | | | |
| Aromatic polyetherimide (ULTEM 6000) | 10 | 50 | 90 |
| Polyimide (Polymer obtained in Synthesis Example 3) | 90 | 50 | 10 |
| Property | | | |
| Glass transition temperature (°C.) | 258 | 256 | 242 |
| Heat distortion temperature (°C.) | 238 | 236 | 221 |
| Izod impact strength (notched) (kg · cm/cm) | 18.3 | 17.0 | 12.0 |

Synthesis Example 1 of the Polyimide of the Third Aspect of the Invention

A reaction vessel equipped with a stirrer, reflux condenser and nitrogen inlet tube was charged with 4.0 kg (10 moles) of bis[4-(3-aminophenoxy)phenyl] sulfide and 34.8 kg of N,N-dimethylacetamide. To the mixture was added 2.14 kg (9.8 moles) of pyromellitic dianhydride by portions in a nitrogen atmosphere at the room temperature and at a rate to avoid a large temperature rise of the solution and stirred for 20 hours at the room temperature.

To the resultant polyamic acid solution, 2.02 kg (20 moles) of triethylamine and 2.55 kg (25 moles) of acetic anhydride were added dropwise in nitrogen atmosphere at the room temperature and stirred for 20 hours at the room temperature to obtain a light yellow slurry. The slurry was filtered to obtain light yellow polyimide powder. The polyimide powder was formed into a sludge with methanol, filtered and dried at 180° C. for 8 hours under reduced pressure to obtain 5.63 kg (about 97.5% yield) of polyimide powder. The inherent viscosity of the polyimide powder was 0.85 dl/g. The inherent viscosity was measured at 35° C. after dissolving 0.5 g of the polyimide powder in 100 ml of a solvent (a mixture of p-chlorophenol and phenol in a ratio of 90:10 by weight) at elevated temperatures and cooling the resulting solution.

Synthesis Examples 2–5

The same procedures as Synthesis Example 1 were carried out. However, raw materials were changed as follows. Various diamines were used in place of [4-(3-aminophenoxy)phenyl] sulfide and various tetracarboxylic acid dianhydrides were used in place of pyromellitic dianhydride. The amounts of diamines, N,N-dimethylacetamide and tetracarboxylic acid dianhydride were varied to obtain various polyimide powders. Table 13 illustrates conditions for the synthesis of the polyimide resins.

temperature to obtain a yellow slurry. The slurry was filtered to obtain light yellow polyimide powder. The polyimide powder was formed into a sludge with methanol, filtered and dried at 150° C. for 8 hours under reduced pressure to obtain 6.6 kg (about 97.5% yield) of polyimide as light yellow powder. The glass transition temperature Tg of the powder was 235° C. in accordance with DSC method.

Besides the inherent viscosity of the powder was 0.86 dl/g.

TABLE 13

| Synthesis example | Diamine kg (mole) | N,N-dimethyl acetamide kg (mole) | Tetracarboxylic acid dianhydride kg (mole) | Inherent viscosity (dl/g) |
|---|---|---|---|---|
| 2 | 4,4'Bis(3-aminophenoxy)biphenyl 3.68 kg (10 moles) | 38.8 kg | 3,3',4,4'-Benzophenonetetracarboxylic dianhydride 3.16 kg (9.85 moles) | 0.62 |
| 3 | 4,4'-Bis(3-aminophenoxy)biphenyl 3.68 kg (10 moles) | 33 kg | Pyromellitic dianhydride 2.125 kg (9.75 moles) | 0.70 |
| 4 | Bis[4-(3-aminophenoxy)phenyl] sulfide 3.6 kg (9 moles) Bis(4-aminophenyl) ether 0.202 kg (1 mole) | 33.7 kg | Pyromellitic dianhydride 2.11 kg (9.7 moles) | 0.78 |
| 5 | 4,4'-Bis(3-aminophenoxy)biphenyl 3.5 kg (9.5 moles) Bis(4-aminophenyl) ether 0.101 kg (0.5 mole) | 32.3 kg | Pyromellitic dianhydride 2.10 kg (9.65 moles) | 0.72 |

Synthesis Example 6

A reaction vessel equipped with a stirrer, reflux condenser and nitrogen inlet tube was charged with 5 kg (10 moles) of 1,3-bis[4-(3-aminophenoxy)benzoyl]benzene and 40.5 kg of N,N-dimethylacetamide. The mixture was cooled to about 0° C. and 2.147 kg (9.85 moles) of pyromellitic dianhydride was added in five portions in a nitrogen atmosphere at a rate to avoid a large temperature rise of the solution. Then the temperature of the reaction mixture was raised to the room temperature and the mixture was stirred for 20 hours at the room temperature.

To the resultant polyamic acid solution, 2.02 kg (20 moles) of triethylamine and 2.55 kg (25 moles) of acetic anhydride were added dropwise in a nitrogen atmosphere at the room temperature and stirred for 20 hours at the room

Synthesis Examples 7–10

The same procedures as Synthesis example 6 were carried out by using various combinations of diamines and tetracarboxylic acid dianhydrides to obtain a variety of polyimides. Table 14 illustrates synthesis conditions, inherent viscosities and glass transition temperatures of the polyimide powders.

TABLE 14

| Synthesis example | Diamine kg (mole) | Tetracarboxylic acid dianhydride kg (mole) | Inherent viscosity (dl/g) | Tg (°C.) |
|---|---|---|---|---|
| 7 | 1,3-bis[4-(3-aminophenoxy)benzoyl]benzene 4.75 kg (9.5 moles) Bis(4-aminophenyl) ether 0.101 kg (0.5 mole) | 3,3',4,4'-Benzophenonetetracarboxylic dianhydride 3.16 kg (9.85 moles) | 0.82 | 227 |
| 8 | 1,4-Bis[4-(3-aminophenoxy)benzoyl]benzene 5.0 kg (10 moles) | 3,3',4,4'-Biphenyltetracarboxylic dianhydride 2.90 kg (9.85 moles) | 0.84 | 230 |
| 9 | 1,4-Bis[4-(3-aminophenoxy)benzoyl]benzene 2.5 kg (5 moles) 4,4'-Bis(3-aminophenoxy)biphenyl 1.84 kg (5 moles) | Pyromellitic dianhydride 2.14 kg (9.8 moles) | 0.80 | 248 |
| 10 | 1,4-Bis[4-(3-aminophenoxy)benzoyl]benzene 4.25 kg (8.5 moles) Bis(4-aminophenyl) ether 0.303 kg (1.5 moles) | Bis(3,4-dicarboxyphenyl) ether dianhydride 3.038 kg (9.8 moles) | 0.78 | 220 |

EXAMPLES 42–45

The polyimide powder obtained in Synthesis Example 1 was dry blended with polyphenylene sulfide powder RYTON P-4 (Trade Mark; a product of Phillips Petroleum Co.) in various compositions as illustrated in Table 15. The mixture was kneaded by fusing at 320°–340° C. in an extruder having 40 mm aperture and a screw of 3.0/1 compression ratio, and extruded to obtain uniform pellets. The pellets thus obtained was injection molded at an injection temperature of 350°–390° C. and a mold temperature of 150° C. The physical and thermal properties of the molded product were measured and the results are illustrated in Table 15. In Table 15, tensile strength and elongation at break, flexural strength and flexural modulus, izod impact strength, and heat distortion temperature were respectively measured in accordance with ASTM D-638, D-790, D- 256 and D-648.

Besides Table 15 also illustrates minimum injection pressure which indicates melt flowability. Lower minimum injection pressure results from better melt flowability.

Comparative Example 15

The same procedures as Examples 42–45 were carried out by using a composition outside the scope of this invention. The physical and thermal properties of molded specimens were measured and the results are illustrated in Table 15.

TABLE 15

| Example or Comparative example | Polyimide Synthesis example | Polyimide (wt. parts) | Polyphenylene sulfide RYTON P-4 (wt. parts) | Minimum injection pressure (kg/cm$^2$) | Tensile strength (kg/cm$^2$) | Elongation (%) | Flexural strength (kg/cm$^2$) | Flexural modulus (kg/cm$^2$) | Izod impact strength (notched) (kg cm/cm) | Heat distortion temperature (°C.) (18.6 kg/cm$^2$) |
|---|---|---|---|---|---|---|---|---|---|---|
| Ex. 42 | 1 | 98 | 2 | 480 | 1,650 | 60 | 2,800 | 36,300 | 21.0 | 215 |
| Ex. 43 | 1 | 85 | 15 | 260 | 1,640 | 55 | 2,800 | 38,000 | 20.6 | 214 |
| Ex. 44 | 1 | 75 | 25 | 190 | 1,600 | 45 | 2,740 | 40,000 | 19.9 | 212 |
| Ex. 45 | 1 | 50 | 50 | * | 1,520 | 33 | 2,560 | 41,200 | 18.4 | 200 |
| Comp. 15 | 1 | 100 | 0 | 550 | 1,650 | 60 | 2,800 | 36,300 | 21.0 | 215 |

*Lower than detection limit of 40 kg/cm$^2$.

EXAMPLES 46–55 AND COMPARATIVE EXAMPLES 16–19

The procedures of Examples 42–45 were repeated by using the polyimide powder obtained in Synthesis Examples 2–5 to give uniformly blended pellets. The pellets were injection molded. Physical and thermal properties were measured on the molded specimens. The results on both within and outside the scope of this invention are illustrated in Tables 16–17 as Examples 46–55 and Comparative Examples 16–19, respectively.

TABLE 16

| Example or Comparative example | Polyimide Synthesis example | Polyimide (wt. parts) | Polyphenylene sulfide RYTON P-4 (wt. parts) | Minimum injection pressure (kg/cm$^2$) | Tensile strength (kg/cm$^2$) | Elongation (%) | Flexural strength (kg/cm$^2$) | Flexural modulus (kg/cm$^2$) | Izod impact strength (notched) (kg cm/cm) | Heat distortion temperature (°C.) (18.6 kg/cm$^2$) |
|---|---|---|---|---|---|---|---|---|---|---|
| Ex. 46 | 2 | 95 | 5 | 420 | 1,350 | 39 | 1,800 | 36,500 | 15.7 | 210 |
| Ex. 47 | 2 | 75 | 25 | 160 | 1,340 | 38 | 1,800 | 39,800 | 15.6 | 209 |
| Ex. 48 | 2 | 50 | 50 | * | 1,270 | 35 | 1,740 | 41,100 | 15.0 | 208 |
| Comp. 16 | 2 | 100 | 0 | 580 | 1,350 | 40 | 1,800 | 36,000 | 16.0 | 210 |
| Ex. 49 | 3 | 95 | 5 | 560 | 1,150 | 100 | 1,530 | 34,000 | 18.0 | 233 |
| Ex. 50 | 3 | 75 | 25 | 230 | 1,100 | 85 | 1,500 | 38,600 | 17.8 | 228 |
| Ex. 51 | 3 | 50 | 50 | * | 990 | 60 | 1,500 | 41,200 | 16.2 | 216 |
| Comp. 17 | 3 | 100 | 0 | 650 | 1,150 | 100 | 1,530 | 32,400 | 18.3 | 235 |

*Lower than detection limit of 40 kg/cm$^2$.

TABLE 17

| Example or Comparative example | Polyimide Synthesis example | (wt. parts) | Polyphenylene sulfide RYTON P-4 (wt. parts) | Minimum injection pressure (kg/cm$^2$) | Tensile strength (kg/cm$^2$) | Elongation (%) | Flexural strength (kg/cm$^2$) | Flexural modulus (kg/cm$^2$) | Izod impact strength (notched) (kg cm/cm) | Heat distortion temperature (°C.) (18.6 kg/cm$^2$) |
|---|---|---|---|---|---|---|---|---|---|---|
| Ex. 52 | 4 | 95 | 5 | 570 | 2,100 | 78 | 3,000 | 36,500 | 16.8 | 257 |
| Ex. 53 | 4 | 75 | 25 | 230 | 2,000 | 65 | 2,950 | 40,000 | 16 | 252 |
| Comp. 18 | 4 | 100 | 0 | 650 | 2,100 | 80 | 3,000 | 35,000 | 17.0 | 260 |
| Ex. 54 | 5 | 95 | 5 | 750 | 1,650 | 85 | 1,800 | 34,500 | 13.8 | 272 |
| Ex. 55 | 5 | 50 | 50 | 140 | 1,530 | 60 | 1,750 | 41,300 | 11.5 | 256 |
| Comp. 19 | 5 | 100 | 0 | 850 | 1,700 | 90 | 1,800 | 33,000 | 14.0 | 275 |

EXAMPLES 56–58

The polyimide powder obtained in Synthesis Example 6 was dry blended with polyphenylene sulfide RYTON P-4 in various compositions as illustrated in Table 18. The mixture was pelletized by extruding at 270°–310° C. with a twin screw extruder.

The pellets obtained were injection molded at the injection temperature of 280°–320° C. and mold temperature of 150° C. Physical and thermal properties of molded specimens were measured. Results are illustrated in Table 18.

Comparative Example 20

The same procedures as Examples 42–44 were carried out by using a composition outside the scope of this invention. The physical and thermal properties of molded specimens were measured and the results are illustrated in Table 18.

EXAMPLES 59–67 AND COMPARATIVE EXAMPLES 21–24

The procedures of Examples 56–58 were repeated by using the polyimide powder obtained in Synthesis Examples 7–10 to give uniformly blended pellets. The pellets were injection molded. Physical and thermal properties were measured on the molded specimens. The results on both within and outside the scope of this invention are illustrated in Tables 19–20 as Examples 59–67 and Comparative examples 21–24 respectively.

TABLE 18

| Example or Comparative example | Polyimide Synthesis example | (wt. parts) | Polyphenylene sulfide RYTON P-4 (wt. parts) | Minimum injection pressure (kg/cm$^2$) | Tensile strength (kg/cm$^2$) | Elongation (%) | Flexural strength (kg/cm$^2$) | Flexural modulus (kg/cm$^2$) | Izod impact strength (notched) (kg cm/cm) | Heat distortion temperature (°C.) (18.6 kg/cm$^2$) |
|---|---|---|---|---|---|---|---|---|---|---|
| Ex. 56 | 6 | 95 | 5 | 320 | 1,590 | 70 | 1,960 | 38,000 | 16.4 | 220 |
| Ex. 57 | 6 | 75 | 25 | 200 | 1,560 | 65 | 1,900 | 40,200 | 15.5 | 217 |
| Ex. 58 | 6 | 50 | 50 | * | 1,450 | 50 | 1,820 | 41,800 | 13.5 | 209 |
| Comp. 20 | 6 | 100 | 0 | 520 | 1,600 | 70 | 1,960 | 37,500 | 16.5 | 220 |

*Lower than detection limit of 40 kg/cm$^2$.

TABLE 19

| Example or Comparative example | Polyimide Synthesis example | (wt. parts) | Polyphenylene sulfide RYTON P-4 (wt. parts) | Minimum injection pressure (kg/cm$^2$) | Tensile strength (kg/cm$^2$) | Elongation (%) | Flexural strength (kg/cm$^2$) | Flexural modulus (kg/cm$^2$) | Izod impact strength (notched) (kg cm/cm) | Heat distortion temperature (°C.) (18.6 kg/cm$^2$) |
|---|---|---|---|---|---|---|---|---|---|---|
| Ex. 59 | 7 | 95 | 5 | 340 | 1,850 | 68 | 1,980 | 38,000 | 15.5 | 204 |
| Ex. 60 | 7 | 50 | 50 | * | 1,770 | 62 | 1,930 | 41,800 | 13.0 | 195 |
| Comp. 21 | 7 | 100 | 0 | 560 | 1,850 | 68 | 1,980 | 38,000 | 15.5 | 204 |
| Ex. 61 | 8 | 95 | 5 | 300 | 1,390 | 60 | 1,700 | 35,800 | 12.3 | 210 |
| Ex. 62 | 8 | 50 | 50 | * | 1,300 | 50 | 1,650 | 41,400 | 10.5 | 198 |
| Comp. 22 | 8 | 100 | 0 | 510 | 1,400 | 60 | 1,700 | 34,500 | 12.5 | 210 |
| Ex. 63 | 9 | 90 | 10 | 360 | 1,490 | 83 | 1,750 | 36,100 | 17.0 | 231 |
| Ex. 64 | 9 | 50 | 50 | * | 1,400 | 60 | 1,690 | 41,000 | 13.5 | 222 |
| Comp. 23 | 9 | 100 | 0 | 620 | 1,500 | 85 | 1,750 | 35,200 | 17.5 | 231 |

TABLE 19-continued

| Example or Comparative example | Polyimide Synthesis example | (wt. parts) | Polyphenylene sulfide RYTON P-4 (wt. parts) | Minimum injection pressure (kg/cm$^2$) | Tensile strength (kg/cm$^2$) | Elongation (%) | Flexural strength (kg/cm$^2$) | Flexural modulus (kg/cm$^2$) | Izod impact strength (notched) (kg cm/cm) | Heat distortion temperature (°C.) (18.6 kg/cm$^2$) |
|---|---|---|---|---|---|---|---|---|---|---|

*Lower than detection limit of 40 kg/cm$^2$.

TABLE 20

| Example or Comparative example | Polyimide Synthesis example | (wt. parts) | Polyphenylene sulfide RYTON P-4 (wt. parts) | Minimum injection pressure (kg/cm$^2$) | Tensile strength (kg/cm$^2$) | Elongation (%) | Flexural strength (kg/cm$^2$) | Flexural modulus (kg/cm$^2$) | Izod impact strength (notched) (kg cm/cm) | Heat distortion temperature (°C.) (18.6 kg/cm$^2$) |
|---|---|---|---|---|---|---|---|---|---|---|
| Ex. 65 | 10 | 95 | 5 | 360 | 1,350 | 64 | 1,460 | 31,400 | 11.5 | 201 |
| Ex. 66 | 10 | 85 | 15 | 240 | 1,340 | 62 | 1,460 | 34,000 | 11.0 | 199 |
| Ex. 67 | 10 | 75 | 25 | 150 | 1,330 | 59 | 1,440 | 36,000 | 10.0 | 195 |
| Comp. 24 | 10 | 100 | 0 | 580 | 1,350 | 65 | 1,460 | 30,000 | 11.5 | 201 |

EXAMPLES 68-71

The polyimide powder obtained in Synthesis Example 1 was dry blended with aromatic polysulfone powder VICTREX PES 3600P (Trade Mark; a product of Imperial Chemical Industry) in various compositions as illustrated in Table 21. The mixture was kneaded by fusing at 330°-360° C. in an extruder having 40 mm aperture and a screw of 3.0/1 compression ratio, and extruded to obtain uniform pellets. The pellets thus obtained were injection molded at an injection temperature of 360° C. and a mold temperature of 180° C. The physical and thermal properties of the molded product were measured and the results are illustrated in Table 21.

In Table 21, the glass transition temperature Tg which was measured in accordance with TMA penetration method is also illustrated.

Comparative Example 25

The same procedures as Examples 68-71 were carried out by using a composition outside the scope of this invention. The physical and thermal properties of molded specimens were measured and the results are illustrated in Table 21.

EXAMPLES 72-74 AND COMPARATIVE EXAMPLE 26

The polyimide powder obtained in Synthesis Example 2 was dry blended with aromatic polysulfone VICTREX PES 3600P in the compositions illustrated in Table 22 and pelletized by the same procedures as Examples 67-70 at 320°-360° C. The pellets obtained were injection molded at 380° C. with a mold temperature of 190° C. Physical and thermal properties of molded specimens were measured. Results are illustrated in Table 22.

TABLE 21

| Example or Comparative example | Polyimide Synthesis example | (wt. parts) | Aromatic Polysulfone VICTREX PES 3600P (wt. parts) | Minimum injection pressure (kg/cm$^2$) | Tensile strength (kg/cm$^2$) | Elongation (%) | Flexural strength (kg/cm$^2$) | Flexural modulus (kg/cm$^2$) | Izod impact strength (notched) (kg cm/cm) | Heat distortion temperature (°C.) (18.6 kg/cm$^2$) | Tg (°C.) |
|---|---|---|---|---|---|---|---|---|---|---|---|
| Ex. 68 | 1 | 95 | 5 | 500 | 1,650 | 60 | 2,800 | 36,300 | 21.0 | 215 | 235 |
| Ex. 69 | 1 | 85 | 15 | 450 | 1,650 | 60 | 2,800 | 36,300 | 21.0 | 215 | 235 |
| Ex. 70 | 1 | 75 | 25 | 380 | 1,600 | 60 | 2,750 | 36,000 | 20.2 | 213 | 234 |
| Ex. 71 | 1 | 50 | 50 | 320 | 1,480 | 60 | 2,550 | 34,500 | 19.0 | 211 | 231 |
| Comp. 25 | 1 | 100 | 0 | 550 | 1,650 | 60 | 2,800 | 36,300 | 21.0 | 215 | 235 |

TABLE 22

| Example or Comparative example | Polyimide Synthesis example | Polyimide (wt. parts) | Aromatic Polysulfone VICTREX PES 3600P (wt. parts) | Minimum injection pressure (kg/cm²) | Tensile strength (kg/cm²) | Elongation (%) | Flexural strength (kg/cm²) | Flexural modulus (kg/cm²) | Izod impact strength (notched) (kg cm/cm) | Heat distortion temperature (°C.) (18.6 kg/cm²) | Tg (°C.) |
|---|---|---|---|---|---|---|---|---|---|---|---|
| Ex. 72 | 2 | 95 | 5 | 465 | 1,350 | 40 | 1,800 | 36,000 | 16.0 | 210 | 235 |
| Ex. 73 | 2 | 75 | 25 | 395 | 1,300 | 45 | 1,800 | 35,000 | 15.0 | 207 | 233 |
| Ex. 74 | 2 | 50 | 50 | 335 | 1,200 | 50 | 1,750 | 33,500 | 13.5 | 205 | 230 |
| Comp. 26 | 2 | 100 | 0 | 580 | 1,350 | 40 | 1,800 | 36,000 | 16.0 | 210 | 235 |

EXAMPLES 75–77 AND COMPARATIVE EXAMPLE 27

The polyimide powder obtained in Synthesis Example 3 was dry blended with aromatic polysulfone powder UDEL POLYSULFONE P-1700 (Trade Mark; a product of Union Carbide Corp.) in various compositions as illustrated in Table 23. The mixture was kneaded by fusing at 360°–390° C. in an extruder having 40 mm aperture and a screw of 3.0/1 compression ratio, and extruded to obtain uniform pellets. The pellets thus obtained was injection molded at an injection temperature of 390° C. and a mold temperature of 190° C. The physical and thermal properties of the molded product were measured and the results are illustrated in Table 23.

TABLE 23

| Example or Comparative example | Polyimide Synthesis example | Polyimide (wt. parts) | Aromatic Polysulfone UDEL POLY-SULFONE P-1700 (wt. parts) | Minimum injection pressure (kg/cm²) | Tensile strength (kg/cm²) | Elongation (%) | Flexural strength (kg/cm²) | Flexural modulus (kg/cm²) | Izod impact strength (notched) (kg cm/cm) | Heat distortion temperature (°C.) (18.6 kg/cm²) | Tg (°C.) |
|---|---|---|---|---|---|---|---|---|---|---|---|
| Ex. 75 | 3 | 95 | 5 | 520 | 1,120 | 100 | 1,520 | 32,400 | 18.3 | 235 | 253 |
| Ex. 76 | 3 | 85 | 15 | 440 | 1,100 | 100 | 1,520 | 32,400 | 17.9 | 233 | 250 |
| Ex. 77 | 3 | 50 | 50 | 350 | 1,000 | 100 | 1,460 | 32,000 | 16.5 | 202 | 223 |
| Comp. 27 | 3 | 100 | 0 | 650 | 1,150 | 100 | 1,530 | 32,400 | 18.3 | 235 | 255 |

EXAMPLES 78–80 AND COMPARATIVE EXAMPLE 28

The same procedures as Examples 68–71 were carried out to obtain uniformly blended pellets except that the polyimide powder obtained in Synthesis Example 4 and UDEL POLYSULFONE P-1700 were treated at 370°–390° C.

The pellets obtained were injection molded at 390° C. with a mold temperature of 180° C. Physical and thermal properties of molded specimens were measured. Results are illustrated in Table 24.

TABLE 24

| Example or Comparative example | Polyimide Synthesis example | Polyimide (wt. parts) | Aromatic Polysulfone UDEL POLY-SULFONE P-1700 (wt. parts) | Minimum injection pressure (kg/cm²) | Tensile strength (kg/cm²) | Elongation (%) | Flexural strength (kg/cm²) | Flexural modulus (kg/cm²) | Izod impact strength (notched) (kg cm/cm) | Heat distortion temperature (°C.) (18.6 kg/cm²) | Tg (°C.) |
|---|---|---|---|---|---|---|---|---|---|---|---|
| Ex. 78 | 4 | 95 | 5 | 600 | 2,080 | 80 | 3,000 | 35,000 | 17.0 | 260 | 285 |
| Ex. 79 | 4 | 75 | 25 | 480 | 2,000 | 80 | 3,000 | 35,000 | 16.5 | 255 | 280 |
| Ex. 80 | 4 | 50 | 50 | 330 | 1,850 | 80 | 2,800 | 34,200 | 15.5 | 252 | 275 |
| Comp. 28 | 4 | 100 | 0 | 650 | 2,100 | 80 | 3,000 | 35,000 | 17.0 | 260 | 285 |

EXAMPLES 81–83 AND COMPARATIVE EXAMPLE 29

The same procedures as Examples 68–71 were carried out to obtain uniformly blended pellets except that the polyimide powder obtained in Synthesis Example 5 and aromatic polysulfone VICTREX PES 3600P were treated at 370°–390° C.

The pellets obtained were injection molded at 390° C. with a mold temperature of 180° C. Physical and thermal properties of molded specimens were measured. Results are illustrated in Table 25.

The pellets above obtained were injection molded with the same conditions as Examples 84–86. The molded specimens were measured their physical and thermal properties. The results obtained are illustrated in Tables 27–29.

TABLE 25

| Example or Comparative example | Polyimide Synthesis example | Polyimide (wt. parts) | Aromatic Polysulfone VICTREX PES 3600P (wt. parts) | Minimum injection pressure (kg/cm²) | Tensile strength (kg/cm²) | Elongation (%) | Flexural strength (kg/cm²) | Flexural modulus (kg/cm²) | Izod impact strength (notched) (kg cm/cm) | Heat distortion temperature (°C.) (18.6 kg/cm²) | Tg (°C.) |
|---|---|---|---|---|---|---|---|---|---|---|---|
| Ex. 81 | 5 | 95 | 5 | 800 | 1,700 | 90 | 1,800 | 33,000 | 14.0 | 274 | 293 |
| Ex. 82 | 5 | 75 | 25 | 600 | 1,660 | 90 | 1,780 | 33,000 | 12.0 | 270 | 289 |
| Ex. 83 | 5 | 50 | 50 | 450 | 1,580 | 90 | 1,700 | 31,000 | 10.0 | 261 | 282 |
| Comp. 29 | 5 | 100 | 0 | 850 | 1,700 | 90 | 1,800 | 33,000 | 14.0 | 275 | 295 |

EXAMPLES 84–86

The polyimide powder obtained in Synthesis Example 6 was dry blended with aromatic polysulfone powder UDEL POLYSULFONE P-1700 in various compositions as illustrated in Table 26. The mixture was pelletized by extruding at 300°–330° C. with a twin screw extruder.

The pellets obtained were injection molded at the cylinder temperature of 330°–360° C. and mold temperature of 150° C. Physical and thermal properties of molded specimens were measured. Results are illustrated in Table 26.

Comparative Example 30

The sample procedures as Examples 84–86 were carried out by using a composition outside the scope of this invention. The physical and thermal properties of molded specimens were measured and the results are illustrated in Table 26.

TABLE 26

| Example or Comparative example | Polyimide Synthesis example | Polyimide (wt. parts) | Aromatic Polysulfone UDEL POLY-SULFONE P-1700 (wt. parts) | Minimum injection pressure (kg/cm²) | Tensile strength (kg/cm²) | Elongation (%) | Flexural strength (kg/cm²) | Flexural modulus (kg/cm²) | Izod impact strength (notched) (kg cm/cm) | Heat distortion temperature (°C.) (18.6 kg/cm²) | Tg (°C.) |
|---|---|---|---|---|---|---|---|---|---|---|---|
| Ex. 84 | 6 | 95 | 5 | 420 | 1,600 | 72 | 1,960 | 37,500 | 16.5 | 219 | 238 |
| Ex. 85 | 6 | 75 | 25 | 310 | 1,580 | 90 | 1,950 | 37,200 | 16.0 | 216 | 236 |
| Ex. 86 | 6 | 50 | 50 | 275 | 1,500 | 98 | 1,880 | 36,100 | 14.8 | 210 | 230 |
| Comp. 30 | 6 | 100 | 0 | 520 | 1,600 | 70 | 1,960 | 37,500 | 16.5 | 220 | 238 |

EXAMPLES 87–94 AND COMPARATIVE EXAMPLES 31–34

The polyimide powder obtained in Synthesis Examples 7–10 was mixed with aromatic polysulfone. VICTREX PES 3600P and UDEL POLYSULFONE P-1700 are used as aromatic polysulfone. The resulting mixtures having compositions illustrated in Tables 27–29 were kneaded by fusing in an extruder to obtain uniformly blended pellets.

TABLE 27

| Example or Comparative example | Polyimide Synthesis example | Polyimide (wt. parts) | Aromatic Polysulfone UDEL POLY-SULFONE P-1700 (wt. parts) | Minimum injection pressure (kg/cm$^2$) | Tensile strength (kg/cm$^2$) | Elongation (%) | Flexural strength (kg/cm$^2$) | Flexural modulus (kg/cm$^2$) | Izod impact strength (notched) (kg cm/cm) | Heat distortion temperature (°C.) (18.6 kg/cm$^2$) | Tg (°C.) |
|---|---|---|---|---|---|---|---|---|---|---|---|
| Ex. 87 | 7 | 95 | 5 | 470 | 1,850 | 72 | 1,980 | 38,000 | 15.0 | 204 | 228 |
| Ex. 88 | 7 | 50 | 50 | 290 | 1,730 | 95 | 1,850 | 36,800 | 14.2 | 202 | 226 |
| Comp. 31 | 7 | 100 | 0 | 560 | 1,850 | 68 | 1,980 | 38,000 | 15.5 | 204 | 228 |

TABLE 28

| Example or Comparative example | Polyimide Synthesis example | Polyimide (wt. parts) | Aromatic Polysulfone VICTREX PES 3600P (wt. parts) | Minimum injection pressure (kg/cm$^2$) | Tensile strength (kg/cm$^2$) | Elongation (%) | Flexural strength (kg/cm$^2$) | Flexural modulus (kg/cm$^2$) | Izod impact strength (notched) (kg cm/cm) | Heat distortion temperature (°C.) (18.6 kg/cm$^2$) | Tg (°C.) |
|---|---|---|---|---|---|---|---|---|---|---|---|
| Ex. 89 | 8 | 90 | 10 | 410 | 1,390 | 61 | 1,700 | 34,300 | 12.5 | 210 | 230 |
| Ex. 90 | 8 | 50 | 50 | 300 | 1,370 | 64 | 1,650 | 33,500 | 11.5 | 207 | 228 |
| Comp. 32 | 8 | 100 | 0 | 510 | 1,400 | 60 | 1,700 | 34,500 | 12.5 | 210 | 230 |
| Ex. 91 | 9 | 95 | 5 | 480 | 1,500 | 85 | 1,740 | 35,200 | 17.0 | 231 | 250 |
| Ex. 92 | 9 | 50 | 50 | 310 | 1,420 | 80 | 1,710 | 34,100 | 16.0 | 227 | 247 |
| Comp. 33 | 9 | 100 | 0 | 620 | 1,500 | 85 | 1,750 | 35,200 | 17.5 | 231 | 250 |

TABLE 29

| Example or Comparative example | Polyimide Synthesis example | Polyimide (wt. parts) | Aromatic Polysulfone UDEL POLY-SULFONE P-1700 (wt. parts) | Minimum injection pressure (kg/cm$^2$) | Tensile strength (kg/cm$^2$) | Elongation (%) | Flexural strength (kg/cm$^2$) | Flexural modulus (kg/cm$^2$) | Izod impact strength (notched) (kg cm/cm) | Heat distortion temperature (°C.) (18.6 kg/cm$^2$) | Tg (°C.) |
|---|---|---|---|---|---|---|---|---|---|---|---|
| Ex. 93 | 10 | 95 | 5 | 435 | 1,350 | 68 | 1,460 | 30,000 | 11.5 | 201 | 220 |
| Ex. 94 | 10 | 50 | 50 | 260 | 1,250 | 90 | 1,410 | 28,000 | 10.0 | 197 | 214 |
| Comp. 34 | 10 | 100 | 0 | 580 | 1,350 | 65 | 1,460 | 30,000 | 11.5 | 201 | 220 |

EXAMPLES 95–106

The polyimide powder obtained in Synthesis Examples 6–10 was dry blended with the commercially available aromatic polyetherimide ULTEM 1000 (Trade Mark; a product of General Electric Co. in U.S.A.) in various compositions as illustrated in Tables 30–32. The mixture was pelletized by extruding at 370°–400° C. with a twin screw extruder.

The pellets obtained were injection molded at the cylinder temperature of 360°–390° C. and mold temperature of 150° C. Physical and thermal properties of molded specimens were measured. Results are illustrated in Tables 30–32.

Comparative Examples 35–39

The same procedures as Examples 95–106 were carried out by using a composition outside the scope of this invention. The physical and thermal properties of molded specimens were measured and the results are illustrated in Tables 30–32.

TABLE 30

| Example or Comparative example | Polyimide Synthesis example | Polyimide (wt. parts) | Aromatic polyether-imide ULTEM-1000 (wt. parts) | Minimum injection pressure (kg/cm$^2$) | Tensile strength (kg/cm$^2$) | Elongation (%) | Flexural strength (kg/cm$^2$) | Flexural modulus (kg/cm$^2$) | Izod impact strength (notched) (kg cm/cm) | Heat distortion temperature (°C.) (18.6 kg/cm$^2$) |
|---|---|---|---|---|---|---|---|---|---|---|
| Ex. 95 | 6 | 95 | 5 | 510 | 1,580 | 70 | 1,950 | 37,300 | 16.2 | 219 |
| Ex. 96 | 6 | 85 | 15 | 480 | 1,560 | 68 | 1,930 | 37,100 | 15.7 | 218 |
| Ex. 97 | 6 | 75 | 25 | 455 | 1,530 | 67 | 1,900 | 36,800 | 15.0 | 217 |
| Ex. 98 | 6 | 50 | 50 | 410 | 1,430 | 65 | 1,800 | 36,100 | 12.7 | 212 |
| Comp. 35 | 6 | 100 | 0 | 520 | 1,600 | 70 | 1,960 | 37,500 | 16.5 | 220 |

TABLE 31

| Example or Comparative example | Polyimide Synthesis example | Polyimide (wt. parts) | Aromatic polyether-imide ULTEM-1000 (wt. parts) | Minimum injection pressure (kg/cm$^2$) | Tensile strength (kg/cm$^2$) | Elongation (%) | Flexural strength (kg/cm$^2$) | Flexural modulus (kg/cm$^2$) | Izod impact strength (notched) (kg cm/cm) | Heat distortion temperature (°C.) (18.6 kg/cm$^2$) |
|---|---|---|---|---|---|---|---|---|---|---|
| Ex. 99 | 7 | 90 | 10 | 510 | 1,810 | 67 | 1,960 | 37,700 | 15.0 | 203 |
| Ex. 100 | 7 | 50 | 50 | 415 | 1,600 | 63 | 1,820 | 36,500 | 12.0 | 201 |
| Comp. 36 | 7 | 100 | 0 | 560 | 1,850 | 68 | 1,980 | 38,000 | 15.5 | 204 |
| Ex. 101 | 8 | 70 | 30 | 435 | 1,350 | 60 | 1,670 | 34,300 | 11.0 | 208 |
| Ex. 102 | 8 | 50 | 50 | 405 | 1,300 | 60 | 1,630 | 34,000 | 9.5 | 206 |
| Comp. 37 | 8 | 100 | 0 | 510 | 1,400 | 60 | 1,700 | 34,500 | 12.5 | 210 |

TABLE 32

| Example or Comparative example | Polyimide Synthesis example | Polyimide (wt. parts) | Aromatic polyether-imide ULTEM-1000 (wt. parts) | Minimum injection pressure (kg/cm$^2$) | Tensile strength (kg/cm$^2$) | Elongation (%) | Flexural strength (kg/cm$^2$) | Flexural modulus (kg/cm$^2$) | Izod impact strength (notched) (kg cm/cm) | Heat distortion temperature (°C.) (18.6 kg/cm$^2$) |
|---|---|---|---|---|---|---|---|---|---|---|
| Ex. 103 | 9 | 95 | 5 | 570 | 1,490 | 84 | 1,750 | 35,200 | 17.2 | 231 |
| Ex. 104 | 9 | 75 | 25 | 505 | 1,450 | 82 | 1,710 | 35,000 | 16.0 | 226 |
| Comp. 38 | 9 | 100 | 0 | 620 | 1,500 | 85 | 1,750 | 35,200 | 17.5 | 231 |
| Ex. 105 | 10 | 75 | 25 | 465 | 1,310 | 64 | 1,470 | 30,600 | 10.3 | 200 |
| Ex. 106 | 10 | 50 | 50 | 415 | 1,270 | 62 | 1,470 | 31,400 | 9.0 | 200 |
| Comp. 39 | 10 | 100 | 0 | 580 | 1,350 | 65 | 1,460 | 30,000 | 11.5 | 201 |

Synthesis Example 1 of the Polyimide of the Fourth Aspect of the Invention

In a reaction flask filled with a stirrer, a reflux condenser and a nitrogen introducing tube were placed 3.66 kg (10 moles) of 4,4,-bis(3-aminophenoxy)biphenyl and 52.15 kg of N,N-dimethylacetamide, followed by addition of 2.11 kg (9.7 mols) of pyromellitic dianhydride at room temperature in nitrogen atmosphere with attention paid to elevation of the temperature of the solution. Then stirring was continued at room temperature for about 20 hours.

To this polyamide acid solution, 2.20 kg (20 mols) of triethylamine and 3.06 kg (30 mols) of acetic anhydride were dropped at room temperature in nitrogen atmosphere. After 20 hours of stirring, there was produced a yellow slurry, which was filtered off to yield a light yellow polyimide powder. To the resultant powder, methanol was added to produce a sludge, which was filtered off and dried at 180° C. under reduced pressure for 8 hours to yield 5.36 kg of polyimide powder.

The thus-obtained polyimide powder had a inherent viscosity of 0.50 dl/g, as determined in the procedure: polyimide powder (0.5 g) was dissolved in 100 ml of solvent with heating, then allowed to cool to 35° C. and measured with a mixture of p-chlorophenol and phenol (90:10 parts/parts by weight) as solvent.

The glass transition temperature of the powder was 256° C. as measured according to DSC and the thermal decomposition temperature 5% at 560° C. as measured according to DTA-TG.

Synthesis Examples 2 to 4

With different diamines and different tetracarboxylic dianhydrides in varying combination powders of various polyimides were obtained in the same process as described in Synthesis Example 1.

Table 33 gives a summary of Synthesis Examples 1 through 4 which includes synthesis conditions of polyimide resins, and inherent viscosities of the produced polyimide powders. It includes the conditions for preparation in Synthesis Example 1 and the physical properties of the produced polyimide powder.

TABLE 33

| | Diamine<br>Name, kg (mol) | Tetracarboxylic<br>dianhydride<br>Name, kg (mol) | Inherent<br>viscosity<br>(dl/g) |
|---|---|---|---|
| Synthesis 1 | 4,4'-bis(3-amino-<br>phenoxy)biphenyl<br>3,68 kg (10 mol) | Pyromellitic dianhydride<br>2.11 kg (9.7 mol) | 0.50 |
| Synthesis 2 | 4,4'-bis(3-amino-<br>phenoxy)biphenyl<br>3.68 kg (10 mol) | 4,4'-(p-phenylene-<br>dioxy)diphthalic<br>dianhydride<br>3.92 kg (9.75 mol) | 0.52 |
| Synthesis 3 | Bis[4-(3-amino-<br>phenoxy)phenyl]sulfide<br>4.0 kg (10 mol) | Pyromellitic dianhydride<br>2.11 kg (9.7 mol) | 0.49 |
| Synthesis 4 | Bis[4-(3-amino-<br>phenoxy)phenyl]sulfide<br>4.0 kg (10 mol) | 3,3',4,4'-biphenyl<br>tetracarboxylic<br>dianhydride<br>2.87 kg (9.7 mol) | 0.50 |

Synthesis Example 5

In a reaction flask, which is similar to that used in Synthesis Example 1, were placed 5 kg (10 mols) of 1,3-bis[4-(3-aminophenoxy)benzoyl]benzene and 40.1 kg of N,N-dimethylacetoamide, and cooled to about 0° C., to which 5 portions (a total of 2,082 kg (9.55 mols)) of pyromellitic dianhydride were added in sequence in nitrogen atmosphere with attention paid to elevation of the temperature of the solution. Stirring was continued for about 2 hours. Subsequently the solution was cooled to room temperature, followed by about 20 hours' further stirring in nitrogen atmosphere.

To this polyamide acid solution 2,20 kg (20 mols) of triethylamine and 2.55 kg (25 mols) acetic anhydride were dripped at room temperature in nitrogen atmosphere. After 20 hours' stirring, there was produced a yellow slurry, which was filtered off to yield a light yellow polyimide powder. To the resultant powder, methanol was added to produce a sludge, which was filtered off and dried at 150° C. under reduced pressure for 8 hours to obtain 6.5 kg (yield: about 97.5%) of light yellow polyimide powder. The glass transition temperature of this powder was 235° C. as measured according DSC, and the inherent viscosity was 0.53 dl/g.

Synthesis Examples 6 to 9

With different diamines and different tetracarboxylic acid dianhydrides in varying combinations, powders of various polyimides were obtained in the same process as described in Synthesis Example 5. Table 34 gives a summary of Synthesis Examples 5 through 9 which includes synthesis conditions and inherent viscosities of the obtained polyimide powders.

TABLE 34

| | Diamine<br>Name, kg (mol) | Tetracarboxylic<br>dianhydride<br>Name, kg (mol) | Inherent<br>viscosity<br>(dl/g) |
|---|---|---|---|
| Synthesis 5 | 1,3-bis[4-(3-amino-<br>phenoxy)benzoyl]benzene<br>5 kg (10 mol) | Pyromellitic dianhydrid<br>2.082 kg (9.55 mol) | 0.53 |
| Synthesis 6 | 1,3-bis[4-(3-amino-<br>phenoxy)benzoyl]benzene<br>4.75 kg (9.5 mol)<br>Bis(4-aminophenyl)ether<br>0.101 kg (0.5 mol) | 3,3',4,4'-benzophenon-<br>tetracarboxylic<br>3,05 kg (9.52 mol) | 0.51 |
| Synthesis 7 | 1,4-bis[4-(3-amino-<br>phenoxy)benzoyl]benzene<br>5.0 kg (10 mol) | 3,3',4,4'-biphenyl-<br>tetracarboxylic<br>dianhydride<br>2.81 kg (9.55 mol) | 0.52 |
| Synthesis 8 | 1,4-bis[4-(3-amino-<br>phenoxy)benzoyl]benzene<br>2.5 kg (5 mol)<br>4,4'-bis(3-amino-<br>phenoxy) biphenyl<br>1.84 kg (5 mol) | Pyromellitic dianhydride<br>2.07 kg (9.5 mol) | 0.49 |
| Synthesis 9 | 1,4-bis[4-(3-amino-<br>phenoxy)benzoyl]benzene<br>4.25 kg (8.5 mol)<br>Bis(4-aminophenyl)ether<br>0.303 kg (1.5 mol) | Bis(3,4-dicarboxy-<br>phenyl)ether dianhydride<br>2.93 kg (9.45 mol) | 0.45 |

EXAMPLES 107 THROUGH 131

Dry-blends of a polyimide powder obtained in any of Synthesis Examples 1 through 9 with an aromatic polyamideimide powder TORLON 4203L® (Amoco Chemicals Corp., USA) commercially available in varying compositions summarized in Tables 34 through 36 were extruded, simultaneously with melting, mixing and kneading, to form uniformly-mixed pellets.

Subsequently in thus-obtained uniformly-mixed pellet was molded in an injection molding machine (Arburg All-Round A- 20) under conditions of melt-mold temperature 220° C. and barrel temperature 380° to 400° C. The molded test pieces were measured for their physical and thermal properties.

The obtained results are given in Tables 35 through 40.

The individual Tables include minimum injection molding pressures as well.

Data in the Tables were obtained as follows: tensile strength and elongation at break according to ASTM D-638, flexural strength and flexural modulus according to ASTM D-790, Izod impact strength according to D-256, glass transition temperature according to the TMA needle-insertion method, and heat distortion temperature according to ASTM D-648.

Comparative Examples 40 Through 49

With other compositions out of the scope of the fourth aspect of the invention and in the same way as in Examples 107 through 131, molded products were obtained and the measured results of their physical and thermal properties are given Tables 35 through 40.

TABLE 35

|  | Polyimide | | Aromatic polyamide-imide TORLON 4203L Amount | Minimum injection pressure (kg/cm$^2$)* | Tensile strength (kg/cm$^2$) | Elongation at break (%) | Flexural strength (kg/cm$^2$) | Flexural modulus (kg/cm$^2$) | Notched impact strength (kg-cm/cm) | Heat distortion temperature (°C.) (18.6 kg/cm$^2$) |
|---|---|---|---|---|---|---|---|---|---|---|
|  | Product | Amount | | | | | | | | |
| Example 107 | Product of | 95 | 5 | 460 | 1250 | 98 | 1620 | 34500 | 18.3 | 240 |
| Example 108 | Synthesis | 85 | 15 | 465 | 1440 | 95 | 1770 | 37400 | 17.9 | 250 |
| Example 109 | 1 | 75 | 25 | 480 | 1530 | 93 | 1860 | 40000 | 17.6 | 258 |
| Example 110 |  | 50 | 50 | 500 | 1730 | 81 | 2050 | 44000 | 17.0 | 268 |
| Comparative example 40 |  | 100 | 0 | 460 | 1100 | 100 | 1530 | 32400 | 18.3 | 235 |
| Example 111 | Product of | 90 | 10 | 380 | 1390 | 10 | 1610 | 35400 | 12.5 | 198 |
| Example 112 | Synthesis | 50 | 50 | 440 | 1710 | 10 | 2000 | 43600 | 13.0 | 254 |
| Comparative example 41 | 2 | 100 | 0 | 380 | 1230 | 10 | 1450 | 32100 | 12.5 | 181 |

*Lower melt viscosity, lower minimum injection pressure. The rest is the same.

TABLE 36

|  | Polyimide | | Aromatic polyamide-imide TORLON 4203L Amount | Minimum injection pressure (kg/cm$^2$)* | Tensile strength (kg/cm$^2$) | Elongation at break (%) | Flexural strength (kg/cm$^2$) | Flexural modulus (kg/cm$^2$) | Notched impact strength (kg-cm/cm) | Heat distortion temperature (°C.) (18.6 kg/cm$^2$) |
|---|---|---|---|---|---|---|---|---|---|---|
|  | Product | Amount | | | | | | | | |
| Example 113 | Product of | 90 | 10 | 430 | 1600 | 57 | 1700 | 28400 | 20.4 | 225 |
| Example 114 | Synthesis | 75 | 25 | 445 | 1670 | 53 | 1820 | 32400 | 19.8 | 236 |
| Example 115 | 3 | 50 | 50 | 485 | 1780 | 43 | 1970 | 38900 | 18.3 | 251 |
| Comparative example 42 |  | 100 | 0 | 420 | 1550 | 60 | 1600 | 25500 | 21.0 | 215 |

TABLE 37

|  | Polyimide | | Aromatic polyamide-imide TORLON 4203L Amount | Minimum injection pressure (kg/cm$^2$)* | Tensile strength (kg/cm$^2$) | Elongation at break (%) | Flexural strength (kg/cm$^2$) | Flexural modulus (kg/cm$^2$) | Notched impact strength (kg-cm/cm) | Heat distortion temperature (°C.) (18.6 kg/cm$^2$) |
|---|---|---|---|---|---|---|---|---|---|---|
|  | Product | Amount | | | | | | | | |
| Example 116 | Product of | 85 | 15 | 420 | 1320 | 34 | 1500 | 26800 | 11.5 | 202 |
| Example 117 | Synthesis | 50 | 50 | 450 | 1570 | 28 | 1800 | 37000 | 12.1 | 241 |
| Comparative example 43 | 4 | 100 | 0 | 410 | 1150 | 35 | 1350 | 22000 | 11.0 | 185 |

TABLE 38

| | Polyimide | | Aromatic polyamide-imide TORLON 4203L | Minimum injection pressure | Tensile strength | Elongation at break | Flexural strength | Flexural modulus | Notched impact strength | Heat distortion temperature (°C.) (18.6 |
|---|---|---|---|---|---|---|---|---|---|---|
| | Product | Amount | Amount | (kg/cm²)* | (kg/cm²) | (%) | (kg/cm²) | (kg/cm²) | (kg-cm/cm) | kg/cm²) |
| Example 118 | Product of | 95 | 5 | 310 | 1650 | 68 | 1990 | 38800 | 16.5 | 230 |
| Example 119 | Synthesis | 85 | 15 | 320 | 1730 | 65 | 2030 | 41200 | 16.4 | 244 |
| Example 120 | 5 | 75 | 25 | 330 | 1790 | 61 | 2070 | 42800 | 16.4 | 254 |
| Example 121 | | 50 | 50 | 360 | 1880 | 48 | 2120 | 45200 | 16.0 | 267 |
| Comparative example 44 | | 100 | 0 | 310 | 1600 | 70 | 1960 | 37500 | 16.5 | 220 |
| Comparative example 45 | | 0 | 100 | 610 | 1920 | 13 | 2150 | 47000 | 14.0 | 275 |

*Lower melt viscosity, lower minimum injection pressure. The rest is the same.

TABLE 39

| | Polyimide | | Aromatic polyamide-imide TORLON 4203L | Minimum injection pressure | Tensile strength | Elongation at break | Flexural strength | Flexural modulus | Notched impact strength | Heat distortion temperature (°C.) (18.6 |
|---|---|---|---|---|---|---|---|---|---|---|
| | Product | Amount | Amount | (kg/cm²)* | (kg/cm²) | (%) | (kg/cm²) | (kg/cm²) | (kg-cm/cm) | kg/cm²) |
| Example 122 | Product of | 90 | 10 | 365 | 1870 | 66 | 2020 | 40800 | 15.5 | 226 |
| Example 123 | Synthesis | 75 | 25 | 380 | 1900 | 60 | 2070 | 41800 | 15.5 | 248 |
| Example 124 | 6 | 50 | 50 | 405 | 1920 | 46 | 2130 | 45800 | 15.3 | 264 |
| Comparative example 46 | | 100 | 0 | 360 | 1850 | 68 | 1980 | 38000 | 15.5 | 204 |
| Example 125 | Product of | 85 | 15 | 335 | 1610 | 59 | 1870 | 41700 | 13.0 | 237 |
| Example 126 | Synthesis | 50 | 50 | 380 | 1830 | 48 | 2070 | 44700 | 13.8 | 263 |
| Comparative example 47 | 7 | 100 | 0 | 320 | 1400 | 60 | 1700 | 34500 | 12.5 | 210 |

TABLE 40

| | Polyimide | | Aromatic polyamide-imide TORLON 4203L | Minimum injection pressure | Tensile strength | Elongation at break | Flexural strength | Flexural modulus | Notched impact strength | Heat distortion temperature (°C.) (18.6 |
|---|---|---|---|---|---|---|---|---|---|---|
| | Product | Amount | Amount | (kg/cm²)* | (kg/cm²) | (%) | (kg/cm²) | (kg/cm²) | (kg-cm/cm) | kg/cm²) |
| Example 127 | Product of | 90 | 10 | 425 | 1620 | 83 | 1870 | 39000 | 17.4 | 242 |
| Example 128 | Synthesis | 75 | 25 | 435 | 1730 | 80 | 1980 | 42400 | 17.2 | 254 |
| Example 129 | 8 | 50 | 50 | 460 | 1860 | 67 | 2090 | 45400 | 16.6 | 266 |
| Comparative example 48 | | 100 | 0 | 420 | 1500 | 85 | 1750 | 35200 | 17.5 | 231 |
| Example 130 | Product of | 85 | 15 | 360 | 1560 | 64 | 1730 | 37000 | 12.5 | 230 |
| Example 131 | Synthesis | 50 | 50 | 400 | 1820 | 53 | 2020 | 43800 | 13.7 | 260 |
| Comparative example 49 | 9 | 100 | 0 | 350 | 1350 | 65 | 1460 | 30000 | 11.5 | 201 |

Other embodiments of the various aspects of the invention will be apparent to those skilled in the art from consideration of the specification and practice of the aspects of the invention disclosed herein. It is intended that the specification and examples be considered as exemplary only, with the true scope and spirit of the aspects of the invention being indicated by the claims.

What is claimed is:

1. A polyimide prepared by the process comprising carrying out condensation of 4,4'-bis(3-aminophenoxy)biphenyl of the formula:

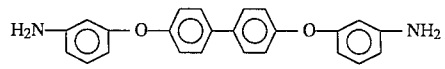

with pyromellitic dianhydride of the formula:

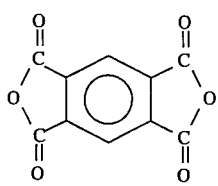

in the presence of at least one tetracarboxylic acid dianhydride of the formula:

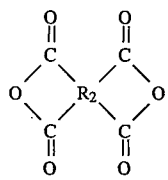

wherein $R_2$ is a tetravalent group selected from the group consisting of an aliphatic group, an alicyclic group, a monocyclic aromatic group, a fused polycyclic aromatic group and a polycyclic aromatic group combined with a member selected from the group consisting of a direct bond and a bridge member with the proviso that the tetracarboxylic acid dianhydride is not pyromellitic dianhydride wherein said condensation is conducted under reaction conditions sufficient to form the polyimide.

2. The polyimide of claim 1 further comprising a dicarboxylic acid anhydride.

3. The polyimide of claim 2 wherein said dicarboxylic acid anhydride is present in an amount of from 0.001 to 1.0 by mole per total moles of said 4,4'-bis(3-aminophenoxy)biphenyl and said diamine compound.

4. The polyimide of claim 3 wherein said dicarboxylic acid anhydride is phthalic anhydride.

5. A polyimide prepared by the process comprising carrying out condensation of 4,4'-bis(3-aminophenoxy)biphenyl of the formula:

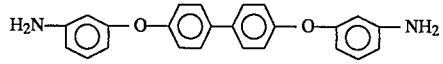

with pyromellitic dianhydride of the formula:

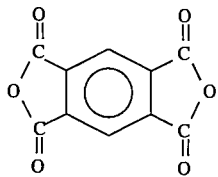

in the presence of at least one diamine compound in an amount of from about 1 to 100% by mole of said 4,4'-bis(3-aminophenoxy)biphenyl, said at least one diamine compound being selected from:

(a) aminobenzylamine, phenylenediamine, diaminocyclohexane and ethylene diamine;

(b) 4,4'-diaminobiphenyl, 3,4'-diaminobiphenyl, 3,3'-diaminobiphenyl, 4,4'-diaminobenzophenone, 3,3'-diaminobenzophenone, 3,4'-diaminobenzophenone, bis(3-aminophenyl)ether, (3-aminophenyl)(4-aminophenyl)ether, bis(3-aminophenyl)sulfide, (3-aminophenyl)( 4-aminophenyl)sulfoxide, (3-aminophenyl)(4-aminophenyl)sulfoxide, bis(4-aminophenyl)sulfoxide, bis(3-aminophenyl)sulfone, (3-aminophenyl)(4-aminophenyl)sulfone, bis(4-aminophenyl)sulfone, 3,3'-diaminodiphenylmethane, 3,4'-diaminodiphenylmethane, 4,4'-diaminodiphenylmethane and diaminonphthalene;

(c) 1,3-bis(3-aminophenoxy)benzene, 1,3-bis(4-aminophenoxy)benzene, 1,4-bis(3-aminophenoxy)benzene and 1,4-bis(4-aminophenoxy)benzene;

(d) bis[4-(4-aminophenoxy)phenyl]methane, 1,1-bis[4-(4-aminophenoxy)phenyl] ethane, 1,2-bis[4-(4-aminophenoxy)phenyl]ethane, 2,2-bis[4-(4-aminophenoxy)phenyl] propane, 2,2-bis[4-(4-aminophenoxy)phenyl]butane, 2,2-bis[4-(4-aminophenoxy)phenyl] -1,1,1,3,3,3-hexafluoropropane, bis[4-(4aminophenoxy)phenyl] ketone, bis[4-(4-aminophenoxy)phenyl]sulfide, bis[4-(4-aminophenoxy)phenyl] sulfoxide, bis[4-(4-aminophenoxy)phenyl]sulfone and bis[4-(4-aminophenoxy)phenyl ether;

(e) 1,4-bis[4-(3-aminophenoxy)benzoyl]benzene, 1,3-bis [4-(3-aminophenoxy)benzoyl] benzene, 4,4'-bis[3-(4-aminophenoxy)benzoyl]diphenyl ether, 4,4'-bis[ 3-(3-aminophenoxy)benzoyl]diphenyl ether, 4,4'-bis[4-(4-amino-α,α-dimethylbenzyl)phenoxy] benzophenone, 4,4'-bis[4-(4-amino-α,α-dimethylbenzyl)phenoxy] diphenyl sulfone and bis[4-{4-(4-aminophenoxy)-phenoxy}phenyl]sulfone, said condensation being carried out further in the presence of a tetracarboxylic acid dianhydride of the formula:

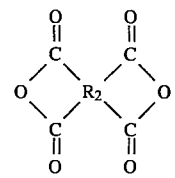

wherein $R_2$ is a tetravalent group selected from the group consisting of an aliphatic group, an alicyclic group, a monocyclic aromatic group, a fused polycyclic aromatic group and a polycyclic aromatic group combined with a member selected from the group consisting of a direct bond and a bridge member with the proviso that the tetracarboxylic acid dianhydride is not pyromellitic dianhydride, said process further including a dicarboxylic anhydride wherein said condensation is conducted under reaction conditions sufficient to form the polyimide.

6. The polyimide of claim 5 further comprising a dicarboxylic acid anhydride.

7. The polyimide of claim 6 wherein said dicarboxylic acid anhydride is present in an amount of from 0.001 to 1.0 by mole per total moles of said 4,4'-bis(3-aminophenoxy)biphenyl and said diamine compound.

8. The polyimide of claim 7 wherein said dicarboxylic acid anhydride is phthalic anhydride.

9. A polyimide prepared by the process comprising carrying out condensation of 4,4'-bis(3-aminophenoxy)biphenyl of the formula:

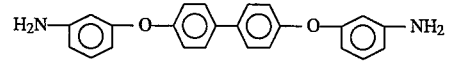

with pyromellitic dianhydride of the formula:

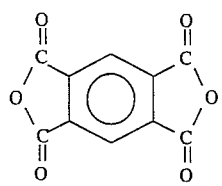

in the presence of 4,4'-diaminodiphenyl ether in an amount of form about 2 to 30% by mole of said 4,4'-bis(3-aminophenoxy)-biphenyl, said condensation being carried out further in the presence of a tetracarboxylic acid dianhydride of the formula:

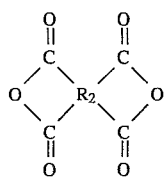

wherein $R_2$ is a tetravalent group selected from the group consisting of an aliphatic group, an alicyclic group, a monocyclic aromatic group, a fused polycyclic aromatic group and a polycyclic aromatic group combined with a member selected from the group consisting of a direct bond and a bridge member with the proviso that the tetracarboxylic acid dianhydride is not pyromellitic dianhydride, said process further including a dicarboxylic anhydride wherein said condensation is conducted under reaction conditions sufficient to form the polyimide.

10. The process polyimide claim 9 wherein said dicarboxylic acid anhydride is present in an amount of from 0.001 to 1.0 by mole per mole total moles of said 4,4'-bis(3-aminophenoxy)biphenyl and said diamine compound.

11. The polyimide of claim 10 wherein said dicarboxylic acid anhydride is phthalic anhydride.

* * * * *